(12) United States Patent
Ota

(10) Patent No.: US 8,355,200 B2
(45) Date of Patent: Jan. 15, 2013

(54) OPTICAL FIBER TRANSPORT DEVICES AND OPTICAL COMMUNICATION NETWORKS

(75) Inventor: Takeshi Ota, Tokyo (JP)

(73) Assignee: Canare Electric Co., Ltd., Aichi (JP)

( * ) Notice: Subject to any disclaimer, the term of this patent is extended or adjusted under 35 U.S.C. 154(b) by 643 days.

(21) Appl. No.: 12/527,154

(22) PCT Filed: Jan. 25, 2008

(86) PCT No.: PCT/JP2008/051033
§ 371 (c)(1),
(2), (4) Date: Aug. 13, 2009

(87) PCT Pub. No.: WO2008/105202
PCT Pub. Date: Sep. 4, 2008

(65) Prior Publication Data
US 2010/0091355 A1    Apr. 15, 2010

(30) Foreign Application Priority Data

Feb. 26, 2007 (JP) ................................. 2007-045191
Dec. 5, 2007 (JP) ................................. 2007-314737

(51) Int. Cl.
*H01S 3/00* (2006.01)
(52) U.S. Cl. ..................................... 359/341.41; 398/33
(58) Field of Classification Search ............. 359/341.41; 398/31, 33, 6, 15
See application file for complete search history.

(56) References Cited

U.S. PATENT DOCUMENTS 7,251,072 B2 * 7/2007 Ohtani et al. ............... 359/341.3
7,437,069 B2 * 10/2008 Deguchi et al. ................. 398/31

* cited by examiner

*Primary Examiner* — Mark Hellner
(74) *Attorney, Agent, or Firm* — Notaro, Michalos & Zaccaria P.C.

(57) ABSTRACT

PROBLEMS
To enable a single optical amplifier to function as a boost amplifier and a preamplifier.
MEANS FOR SOLVING PROBLEMS
By using a wavelength routing, a single optical amplifier can have the function of a boost amplifier and the function of a preamplifier. Moreover, by attenuating a transmission signal in advance, it is possible to adjust a gain difference required in the boost amplifier and the preamplifier.

11 Claims, 32 Drawing Sheets

Optical Transport Device of First Embodiment

Optical Communication Network of First Embodiment

Optical Transport Device of Second Embodiment

Optical Transport Device of Third Embodiment

Optical Transport Device of Fourth Embodiment

Transport System of Fourth Embodiment

Optical Transport Device of Fifth Embodiment

Optical Communication Network of Sixth Embodiment

Optical Receiver Device of Eighth Embodiment

Spectrum of Light outputted from Optical Amplifier 82

Optical Receiver Device of Ninth Embodiment

Optical Amplifier Module of Tenth Embodiment

Optical Amplifier Module of Eleventh Embodiment

Relationship of Optical Signal Levels of Thirteenth Embodiment

FIG. 19

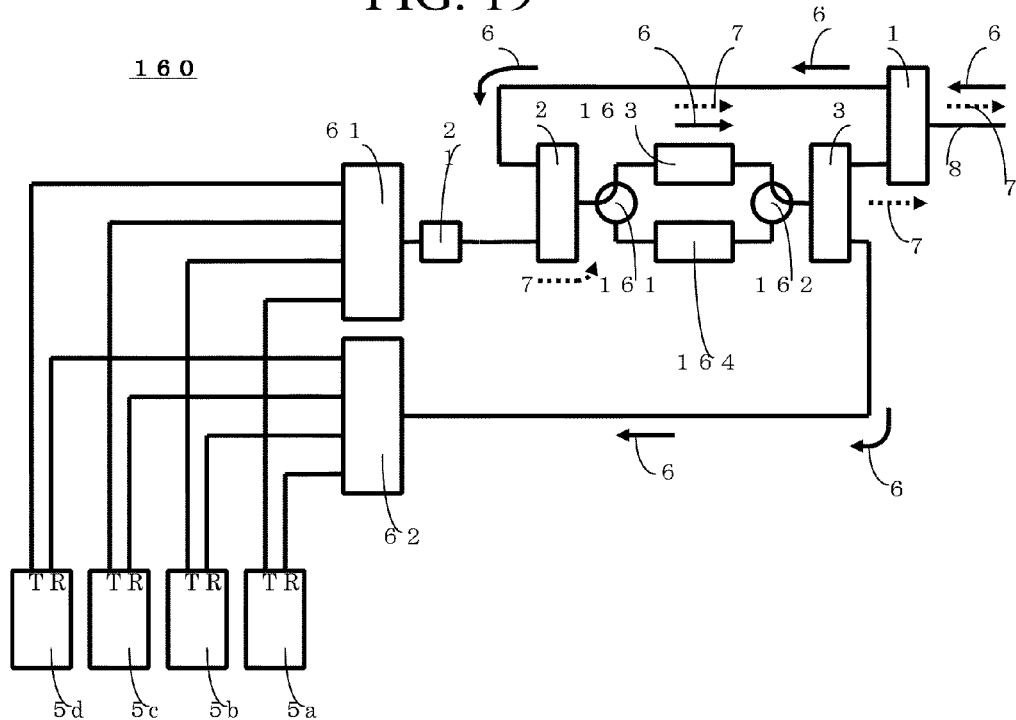

FIG. 20

| Ref No.<br>Combination | 1 | 2 | 3 |
|---|---|---|---|
| A-1 | Wavelength Divisional Mux | Wavelength Divisional Mux | Wavelength Divisional Mux |
| A-2 | Optical Circulator | Wavelength Divisional Mux | Wavelength Divisional Mux |
| A-3 | Wavelength Divisional Mux | Optical Fiber coupler | Wavelength Divisional Mux |
| A-4 | Optical Circulator | Optical Fiber coupler | Wavelength Divisional Mux |
| A-5 | Interleaver | Interleaver | Interleaver |
| A-6 | Optical Circulator | Interleaver | Interleaver |
| A-7 | Interleaver | Optical Fiber coupler | Interleaver |
| A-8 | Optical Circulator | Optical Fiber coupler | Interleaver |

FIG. 23

| Ref. No.<br>Combination | 1 8 1 | 1 8 2 | 1 8 3 | 1 8 4 |
|---|---|---|---|---|
| B-1 | Wavelength Div. Mux | Wavelength Div. Mux | Wavelength Div. Mux | Wavelength Div. Mux |
| B-2 | Optical Circulator | Wavelength Div. Mux | Wavelength Div. Mux | Optical Circulator |
| B-3 | Wavelength Div. Mux | Optical Fiber Coupler | Wavelength Div. Mux | Wavelength Div. Mux |
| B-4 | Optical Circulator | Optical Fiber Coupler | Wavelength Div. Mux | Optical Circulator |
| B-5 | Interleaver | Interleaver | Interleaver | Interleaver |
| B-6 | Optical Circulator | Interleaver | Interleaver | Optical Circulator |
| B-7 | Interleaver | Optical Fiber Coupler | Interleaver | Interleaver |
| B-8 | Optical Circulator | Optical Fiber Coupler | Interleaver | Optical Circulator |

FIG. 24

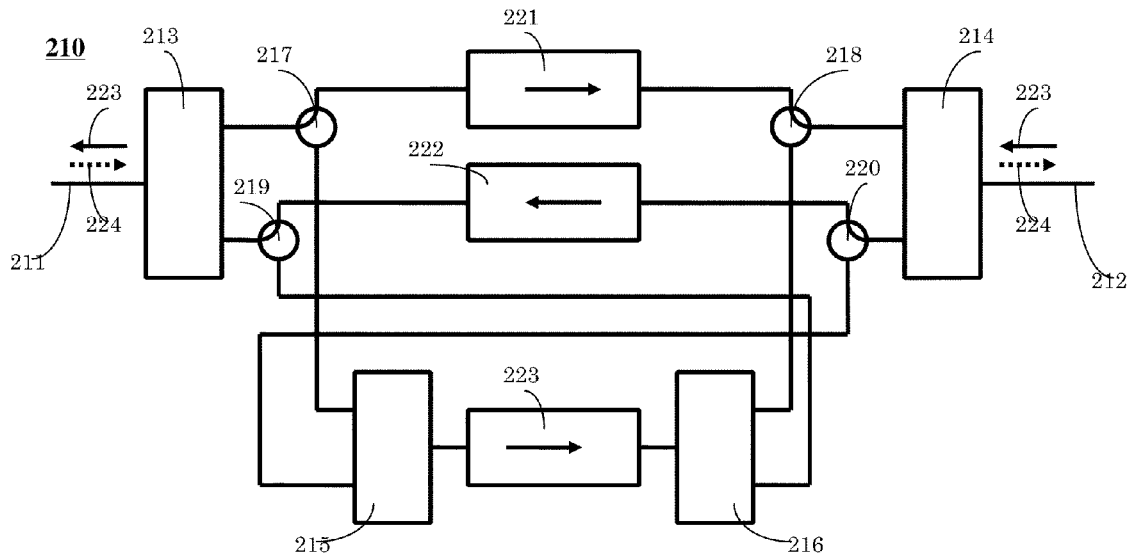

9.95G PRBS=$2^{23}$-1

Prior Art Optical Transport Device

OPTICAL FIBER TRANSPORT DEVICES AND OPTICAL COMMUNICATION NETWORKS

TECHNICAL FIELD

The present invention relates to optical signal transport devices. The present invention relates to optical amplifiers. The present invention relates to Passive Optical Networks (PONs) using passive optical branch circuits and Time Division Multiplexing (TDM). The present invention relates triple play services combining PON and video broadcasting services.

BACKGROUND ART

Traditional optical fiber transport devices 200a and 200b are shown in FIG. 53. A pair of the optical transport devices 200a and 200b are connected by an optical fiber 204 each another. The optical transport device 200a transmits an optical signal 205 of wavelength λ1, where the optical transport device 200b transmits an optical signal 206 of wavelength λ2. The wavelengths of upstream and downstream optical signals comprise different wavelengths so that a full-duplex optical communication channel is established over a single fiber.

An optical transport device 200a comprises an optical transceiver 201a, an optical amplifier 202a, and a wavelength division multiplexer 203a. The optical transceiver 201a transmits an optical signal 205 of wavelength λ1. The wavelength multiplexer 203a multiplexes optical signals of wavelengths λ1 and λ2.

An optical transport device 200b comprises an optical transceiver 201b, an optical amplifier 202b, and a wavelength division multiplexer 203b. The optical transceiver 201b transmits an optical signal 206 of wavelength λ2. The wavelength multiplexer 203b multiplexes optical signals of wavelengths λ1 and λ2.

The optical amplifiers 202a and 202b are boost amplifiers that amplify transmission signals. There is another application, an optical pre-amplifier that amplifies an optical receiving signal, is less popular than the boost amplifier. There is the other application that uses both of the boost amplifier and pre-amplifier. This application is not popular.

DISCLOSURE OF INVENTION

Problems to be Solved by the Invention

The present invention aims to an optical amplifier that works as both of the boost amplifier and pre-amplifier function simultaneously. The present invention also aims to realize stable operation of optical pre-amplifier.

Means to Solve the Problems

The present invention comprises optical wavelength routing to let single optical amplifier works both of the boost amplifier and pre-amplifier function simultaneously. The present invention comprises pre-attenuation of transmission signal to compensate required gain difference between the boost amplifier and the pre-amplifier.

Advantages of the Invention

According to the present invention, single optical amplifier works as both of the boost amplifier and the pre-amplifier functions simultaneously. As a result, high loss budget of optical transport is realized with reduced cost.

BRIEF DESCRIPTION OF THE DRAWINGS

FIG. 19 is a schematic diagram of the 15th embodiment of the optical transport device 160.

FIG. 20 shows table of available device combination of the reference number 1, 2, and 3 describing in the optical transport device 160.

FIG. 23 shows table of available device combination of the reference number 181, 182, 183, and 184 describing in the optical transport device 180.

FIG. 24 is a schematic diagram of the 18th embodiment of the optical relay amplifier 210.

DESCRIPTION OF REFERENCE SYMBOLS

Figure 1:
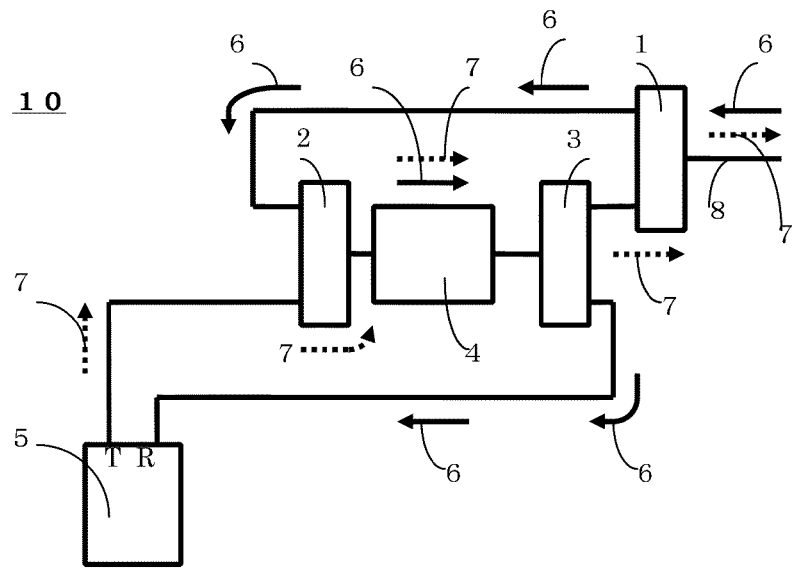
FIG. 1 is a schematic diagram of the 1st embodiment of the optical transport device.

1 Wavelength division multiplexer
2 Wavelength division multiplexer
3 Wavelength division multiplexer
4 Optical amplifier
5 Optical transport device
10 Optical transport device
11 Optical transport device
12 Optical fiber for signal transmission
20 Optical transport device
21 Optical attenuator
30 Optical transport device
32 Optical attenuator
40 Optical transport device
40a Optical transport device
40b Optical transport device
41 Gain control mechanism for optical amplifier
42 Control port
50 Optical transport device
51 Gain control mechanism
52 Control port
53 Variable optical attenuator
60 Optical transport device
61 Wavelength division multiplexer
62 Wavelength division multiplexer
70 Optical transport device
71 Wavelength division multiplexer
72 Gain flattening filter
73 Dispersion compensation fiber
74 Wavelength division multiplexer
80 Optical receiver device
81 Optical signal input port
82 Optical amplifier
83 Wavelength division multiplexer (Filter)
84 Receiver of the optical transceiver
85 Amplified optical signal
86 ASE (Amplifier Spontaneous Emission)
90 Optical fiber receiver
91 Optical transceiver
92 Optical amplifier
93 Control port
100 Optical amplifier module
101 Optical fiber coupler
102 Filter
104 Gain control mechanism for optical amplifier
110 Optical amplifier module
111 Optical fiber coupler
112 Optical detector
113 Gain control mechanism for optical amplifier
114 Communication port
120 Optical amplifier module
121 Ether switch
130 10G-PON (Passive Optical Network) OLT (Optical Line Terminal)
131 Splitter
132 ONU (Optical Network Unit)
141 Transmission power of OLT 130
142 Minimum receiver sensitivity of OLT 130
143 Transmission power of ONU 132
144 Minimum receiver sensitivity of ONU 132
150 10G-PON-OLT for triple play service
151 Optical transmitter for video signal
152 Optical attenuator
153 Wavelength division multiplexer
154 Video optical signal (wavelength λ3)
157 Wavelength division multiplexed transmission signal
160 Optical transport device
161 Optical switch
162 Optical switch
163 Optical amplifier
164 Optical amplifier
170 Optical amplifier module
171 Optical switch
172 Optical amplifier
173 Optical amplifier 174 Optical fiber coupler
175 Control mechanism for optical amplifier
180 Optical add/drop multiplexer transport device
181 Wavelength division multiplexer
182 Wavelength division multiplexer
183 Wavelength division multiplexer
184 Wavelength division multiplexer
185 Variable optical attenuator
186 Variable optical attenuator
187 Optical add/drop multiplexer
188 Dispersion compensation device
189a Optical amplifier (2 stages EDFA)
189b Optical amplifier (2 stages EDFA)
190a $1^{st}$ stage of EDFA
190b $1^{st}$ stage of EDFA
191a $2^{nd}$ stage of EDFA
191b $2^{nd}$ stage of EDFA
192a Optical switch
192b Optical switch
192c Optical switch
192d Optical switch
195 Input/output port for optical signals
196 Input/output port for optical signals
200a Optical transport device (Prior Art)
200b Optical transport device (Prior Art)
201a Optical transceiver
201b Optical transceiver
202a Optical amplifier
202b Optical amplifier
203a Wavelength division multiplexer
203b Wavelength division multiplexer
204 Optical fiber for transmission
205 Optical signal of wavelength λ1
206 Optical signal of wavelength λ2
210 Optical relay amplifier
211 Input/output port for optical signals
212 Input/output port for optical signals
213 Wavelength division multiplexer
214 Wavelength division multiplexer
215 Wavelength division multiplexer
216 Wavelength division multiplexer
217 Optical switch
218 Optical switch
219 Optical switch
220 Optical switch
221 Optical amplifier
222 Optical amplifier
223 Optical amplifier
223 Optical signal of wavelength λ2
224 Optical signal of wavelength λ1
230 Optical receiver
231 Dummy signal source
232 Dummy signal mixing means
233 Dummy signal removing means
234 Dummy optical signal
235 Optical signal
236 FEC (Forward Error Correction)
250 Optical amplifier
251 Optical amplifier module
252 Dielectric thin film filter three-port device
253 Dielectric thin film filter three-port device
254 Optical attenuator
255 Optical isolator
256 Pump light combiner
257 Erbium doped fiber
258 Optical isolator
259 Pump light source
261 Input optical signal
262 Optical output signal
263 Dummy optical signal
271 Lens
272 Dielectric thin film filter
273 Lens
300 Optical amplifier
301 Dielectric thin film filter three-port device
302 $1^{st}$ Power monitor tap
303 $1^{st}$ Power monitor
304 Optical attenuator
305 $2^{nd}$ Power monitor tap
306 $2^{nd}$ Power monitor
307 Control mechanism
308 Control port
309 Dielectric thin film filter three-port device
310 Optical signal transmission filter
311 Gain clamped optical amplifier
312 Gain flattening filter
320 Optical amplifier
321 $1^{st}$ Erbium doped fiber
322 $2^{nd}$ Erbium doped fiber
323 Pump light source
324 Optical isolator
325 Optical isolator
326 Optical isolator
327 Optical fiber coupler
328 WDM Optical fiber coupler
329 WDM Optical fiber coupler
330 Optical signal
331 Pump light
332 Input port
333 Output port
340 Optical amplifier
341 Dielectric thin film filter three-port device
342 Dielectric thin film filter three-port device
343 Optical attenuator
344 Dielectric thin film filter three-port device
345 Dielectric thin film filter three-port device
346 Optical attenuator
351 Input port
352 Output port
353 $1^{st}$ Optical isolator
354 WDM Optical fiber coupler
355 Pump light source
356 $1^{st}$ FBG
357 Erbium doped fiber
358 Optical fiber coupler
359 $2^{nd}$ Optical Isolator
360 Optical attenuator
361 $2^{nd}$ FBG
370 Optical amplifier
380 Optical relay amplifier
381 Input port
382 Output port
383 Optical pre-amplifier
384 Filter
385 Optical post-amplifier
390 Optical Add/Drop Multiplexer (ROADM)
391 Input port
392 Output port
393 Optical pre-amplifier
394 Wavelength selective switch (WSS)
395 Tunable line card
396 Optical signal mixing means
397 Optical post-amplifier
400 Optical amplifier 401 Optical fiber coupler
410 Optical amplifier
411 Input optical signal
412 Output optical signal
421 Optical fiber coupler
422 Input optical signal power monitor
423 Optical isolator
424 Pump light combiner
425 Erbium doped fiber
426 Optical isolator
427 Pump light source
428 Pump light source driver
429 Variable optical attenuator driver
430 Variable optical attenuator
431 Optical fiber coupler
432 Output optical signal power monitor

BEST MODE FOR CARRYING OUT THE INVENTION

Embodiments of the invention are described below.

The First Embodiment

FIG. 1 shows an optical transport device 10 as a $1^{st}$ embodiment of present invention. The optical transport device 10 comprises wavelength division multiplexers 1, 2, 3, an optical amplifier 4, and an optical transceiver 5. The optical amplifier 4 plays rolls of both of boost amplifier and pre-amplifier.

The wavelength division multiplexers 1, 2, and 3 comprise dielectric thin film filters. The optical amplifier 4 is a C-band EDFA (Erbium Doped Fiber Amplifier). The C-band is defined as the wavelength region between 1530 nm and 1565 nm by ITU-T. The optical transceiver 5 is SFP (Small Form factor Pluggable) transceiver.

A signal of wavelength $\lambda 1$ is received from an input/output port 8, and a signal of wavelength $\lambda 2$ is transmitted to the input/output port 8. The received signal 6 of wavelength $\lambda 1$ is de-combined by the wavelength division multiplexer 1 and directed to the wavelength division multiplexer 2. The transmitted single 7 of wavelength $\lambda 2$ from the optical transceiver 5 is directed to the wavelength division multiplexer 2. The signal 6 of wavelength $\lambda 1$ and the signal 7 of wavelength $\lambda 2$ are multiplexed and sent to the optical amplifier 4. The optical amplifier 4 amplifies both of the signal 6 of wavelength $\lambda 1$ and the signal 7 of wavelength $\lambda 2$, simultaneously. The amplified optical signals 6 and 7 are directed to the wavelength division multiplexer 3. The wavelength division multiplexer 3 de-combines the signals of 6 and 7. The de-combined signal 7 is directed to the input/output port 8 via the wavelength division multiplexer 1. On the other hand, the de-combined signal 6 is directed to the receiver port of the optical transceiver 5.

Figure 2:
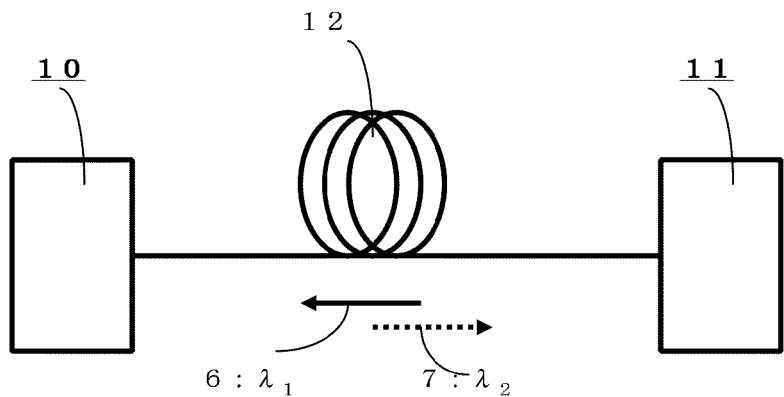
FIG. 2 is a schematic diagram of the optical communication network comprising the optical transport device 10.

The optical transport device 10 is used as shown in FIG. 2. An optical transport device 11 is connected to the optical transport device 10 via an optical fiber 12 for signal transmission. The optical transport device 11 has the same structure of the transport device 10 except wavelength alignment. The optical transport device 11 transmits a signal of wavelength $\lambda 1$ and receives a signal of wavelength $\lambda 2$. Accordingly, bidirectional optical communication is realized by using the single optical fiber 12.

The wavelength $\lambda 1$ of the signal 6 is 1530 nm which belongs to CWDM grid defined by ITU-T. The wavelength $\lambda 2$ of the signal 7 is 1550 nm which belongs to CWDM grid defined by ITU-T. The wavelength division multiplexers 1, 2, and 3 are dielectric thin film filter devices which combine and de-combine the wavelengths of 1530 nm and 1550 nm.

The optical transceiver 5 is a SFP transceiver which comprises direct modulation type DFB (Distributed Feed Back) Laser as a light source and a PIN photodiode as a receiving device. The signal rate of the optical signals is 1.25 Gbit/s compliant to Gigabit Ethernet. A transmission optical power is 0 dBm (1 mW) and a receiving sensitivity is −24 dBm (4 µW). As the transceiver 5, CT-125SSP-CB8L (1550 nm) of Coretek Corporation of Taiwan is applied.

The optical amplifier 4 is C-band EDFA. As optical amplifier 4, POP1021 (Single pump source) of Dowslake Corporation of USA is applied. The optical amplifier 4 adopts 980 nm Laser as a pump light source. It adopts backward and forward pumping configuration. The backward and forward pumping configuration denotes that pump lights are applied for both directions of backward and forward against the optical signal to be amplified. The optical amplifier 4 is an intelligent optical amplifier module which has various operation modes. In this embodiment, AGC (Auto Gain Control) mode is applied.

Functional behavior of the optical transport device 10 is described below ignoring insertion loss of wavelength division multiplexers 1, 2, and 3. The optical signal 7 from the optical transceiver 5 is amplified from 0 dBm to +13 dBm where gain of the optical amplifier 4 is set at 13 dB, and transmitted from the input/output port 8. On the other hand, the receiving signal 7 is amplified from −37 dBm to −24 dBm, and received by the optical transceiver 5. Accordingly, transmission power of the optical transport device 10 is +13 dBm, and its receiving power is −37 dBm. As a result total loss budget is 49 dB.

Pre-amplifier performance of the optical amplifier 4 is measured as a stand-alone amplifier. The measured minimum receiving sensitivities are −36.5 dBm (1.25 Gbit/s) with no filter, −37.5 dBm (1.25 Gbit/s) with CWDM filter, and −39.5 dBm (1.25 Gbtib/s) with DWDM 100 GHz filter, respectively. These results exceed typical minimum receiving sensitivity −31 dBm of APD (Avalanche Photo Diode) at 1.25 Gbit/s.

There was a concern that pre-amplifier performance could be degraded if the single optical amplifier simultaneously amplify two signals, signal 6 and 7, with big level difference. However, the experimental results reject this concern.

As an optical transceiver 5, instead of SFP transceiver, a XFP transceiver of data rate 10 Gbit/s may be applied. FTRX3611 of Finisar Corp. of USA is applied. Channel 32 (1551.72 nm) and channel 34 (1550.12 nm) of ITU-T 100 GHz grid used as the wavelength $\lambda 1$ and $\lambda 2$, respectively. The receiving device of the optical transceiver (FTRX3611) is a PIN photodiode with minimum receiving sensitivity −16 dBm.

The minimum receiving sensitivities of optical pre-amplified XFP are −30.5 dBm with no filter, −30.5 dBm with CWDM filter, and −33.5 dBm with DWDM 100 GHz filter, respectively. These results exceed typical minimum receiving sensitivity −24 dBm of APD (Avalanche Photo Diode) at 10 Gbit/s.

As mentioned previously, these experimental numerical results ignored insertion losses of passive optical devices as a matter of convenience. In real experiment, passive component insertion losses are compensated in calculations.

In this embodiment, C-band EDFA is adopted as the optical amplifier, however, the other types of optical amplifiers such as L-band EDFA (1565 nm-1610 nm), Raman amplifier, and Semiconductor optical amplifier also may be adopted. Any wavelength region may be adopted. In this embodiment 100 GHz grid of DWDM is adopted, however the other grids such as 25 GHz, 50 GHz, and 200 GHz may be adopted. Even CWDM grid may be adopted. Wavelengths of 1530 nm and 1550 nm of CWDM grid, for example, may be adopted with C-band EDFA.

As described above, according to this embodiment, single optical amplifier 4 can amplifies both of transmission signal and receiving signal, simultaneously. Therefore the cost of the optical transport device is reduced. This simultaneous operation does not degrade any performances.

The Second Embodiment

Figure 3:
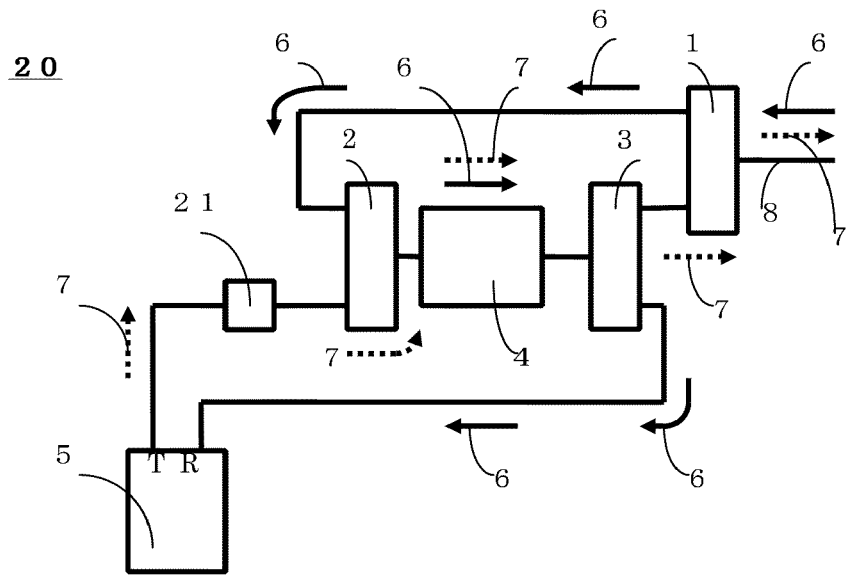
FIG. 3 is a schematic diagram of the 2nd embodiment of the optical transport device 20.

FIG. 3 shows an optical transport device 20 as the second embodiment of present invention. The major difference from the first embodiment shown FIG. 1 is that present embodiment comprises an optical attenuator 21 between the transmitter of optical transceiver 5 and the wavelength division multiplexer 2. The optical attenuator 21 may be fixed or variable type optical attenuator.

A DWDM XFP transceiver (e.g. FTRX3611 of Finisar Corp.) as the optical transceiver 5 transmits optical power around 0 dBm. The gain of the optical amplifier should be 10 dB to achieve +10 dBm final transmission power. On the other hand, receiving signal 7 is only pre-amplified to −20 dBm against original receiving power of −30 dBm. The optical amplifier 4 is common so that the gain of the optical amplifier is common too. However the DWDM XFP transceiver's minimum sensitivity is as low as −16 dBm. If the gain of the optical amplifier is set at higher than 10 dB, then it contradicts the required gain 10 dB for boost amplifier.

Accordingly, as shown in FIG. 3, the present embodiment comprises the optical attenuator 21 which attenuates transmission signal to −10 dBm from 0 dBm. At the same moment, the gain of the optical amplifier 4 is set at 20 dB. Thus the optical amplifier 4 as the boost amplifier amplifies signal 7 to +10 dBm from −10 dBm. Also the optical amplifier 4 as the pre-amplifier amplifies signal 6 to −10 dBm form −30 dBm in order to comply the receiving sensitivity of the optical transceiver 5.

It is experimentally verified that the optical transport device 20 shown in FIG. 3 can simultaneously realize +10 dBm boost amplifier operation and the −30 dBm sensitivity with optical pre-amplified receiver. The total loss budget is 40 dB. DWDM filters of 100 GHz are adopted as the wavelength multiplexers 1, 2, and 3.

As described above, the optical attenuator 21 pre-attenuates the transmission signal so that the optical amplifier can be set at an appropriate gain for optical pre-amplifier. In other words, the optical attenuator 21 can adjust required gain difference between the boost amplifier and pre-amplifier.

The Third Embodiment

Figure 4:
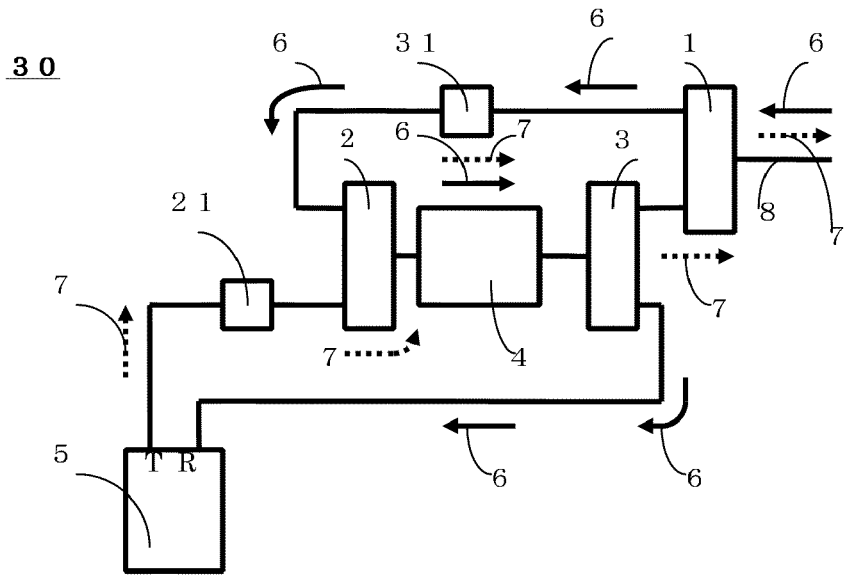
FIG. 4 is a schematic diagram of the 3rd embodiment of the optical transport device 30.

FIG. 4 shows an optical transport device 30 as the third embodiment of present invention. The major difference from the second embodiment is that an optical attenuator 31 is disposed between the wavelength multiplexers 1 and 2.

In case of the second embodiment, the receiving signal 7 is amplified to −10 dBm from −30 dBm and fed to the optical transceiver 5. However the receiving signal level changes according to deployment. Sometimes the receiving signal level is relatively high. If the receiving signal level was −18 dBm input level of the optical transceiver will be +2 dBm. The maximum input level of PIN photodiode is typically 0 dBm. Error rate might increase if the input power exceeds this level. Despite this situation, the optical pre-amplifier is necessary because minimum receiving sensitivity of the PIN photodiode is as low as −16 dBm.

Thus there is no way to receive the signal 6 appropriately between −20 dBm and −16 dBm. In addition, it is not practical to switch on/off the optical pre-amplifier according to the receiving signal level. To solve this problem, the present embodiment comprises the optical attenuator 31. The optical attenuator 31 may be variable type or pluggable fixed type disposed between the wavelength multiplexers 1 and 2.

The optical attenuator set at 10 dB attenuation provides the optical transceiver appropriate input signal, where the level of the receiving signal 6 is between −20 dBm and −10 dBm. In case of much stronger receiving signal 6, the optical attenuator may set at more attenuation.

The transmission power level of +10 dBm and the minimum receiving sensitivity of −30 dBm provides the total loss budget of 40 dB (corresponding to 160 km transmission length against 0.25 dB/km fiber loss). Between 30 dB (120 km) and 40 dB (160 km) of the loss budget is achievable where the optical attenuator 31 is set at 0 dB attenuation. Between 20 dB (80 km) and 30 dB (120 km) of the loss budget is achievable where the optical attenuator 31 is set at 10 dB attenuation. Between 10 dB (40 km) and 20 dB (80 km) of the loss budget is achievable where the optical attenuator 31 is set at 20 dB attenuation.

An attenuation step of the optical attenuator 31 may be set arbitrary such as 5 dB step or less. By adopting variable attenuator it may provide continuous optical attenuation.

Accordingly, the present embodiment comprises the optical attenuator 31 can adjust receiving signal level of the optical transceiver appropriately against various loss budgets.

The Fourth Embodiment

Figure 5:
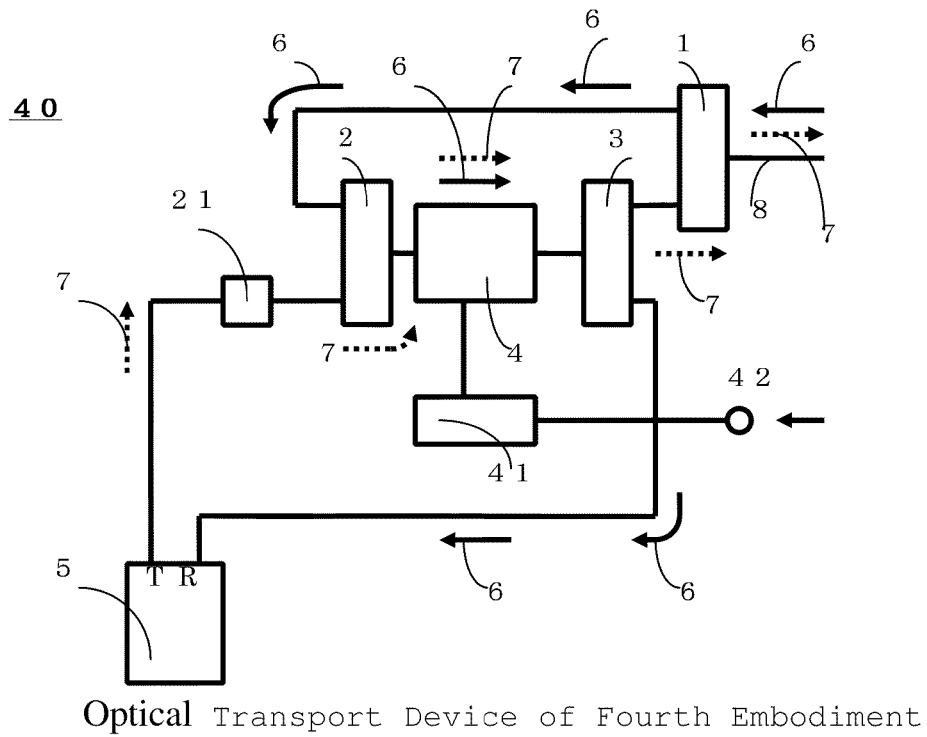
FIG. 5 is a schematic diagram of the 4th embodiment of the optical transport device 40.

FIG. 5 shows an optical transport device 40 as the $4^{th}$ embodiment present invention. The major difference from the $2^{nd}$ embodiment is that this embodiment further comprises a gain control mechanism 41. The gain control mechanism 41 controls the gain of the optical amplifier 4 according to the signal from a control port 42.

Figure 6:
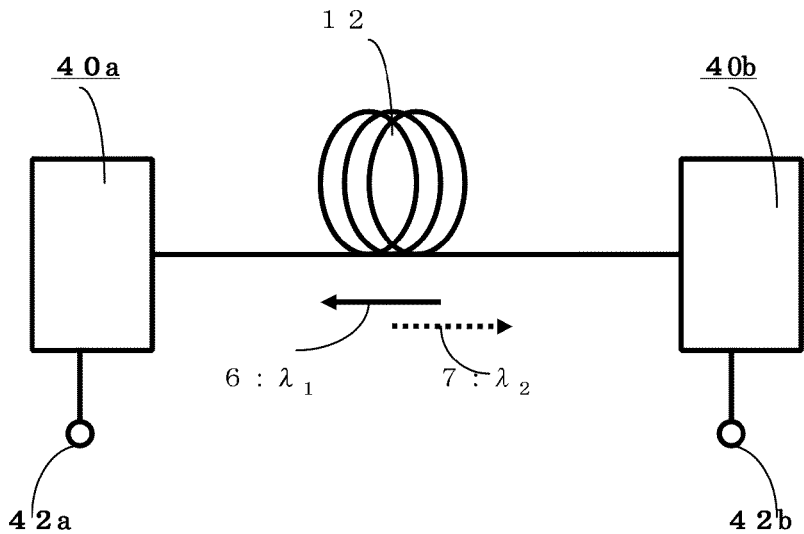
FIG. 6 is a schematic diagram of the transport system comprising optical transport device described as the 4th embodiment of the optical transport device.

FIG. 6 shows an optical transmission system comprises the optical transport devices of the $4^{th}$ embodiment. FIG. 6 corresponds to FIG. 2 of the $1^{st}$ embodiment. Two optical transport devices 40a and 40b has opposite wavelength alignment of transmission wavelength and receiving wavelength.

A loss budget of FIG. 6 corresponds to the difference between transmission power of the optical transport devices 40a and minimum receiving sensitivity of the optical transport devices 40b. Another loss budget of FIG. 6 corresponds to the difference between transmission power of the optical transport devices 40b and minimum receiving sensitivity of the optical transport devices 40a. Typically, the transmission powers of the optical transport devices 40a and 40b are almost same. Also the minimum receiving sensitivities of he optical transport devices 40a and 40b are almost same. By using control ports 42a or 42b, the gain of the optical amplifier 4 may change so that the receiving power is set at appropriate level.

Let us consider a loss of the optical fiber 12 is 30 dB. The optical attenuator should be set at 10 dB, and the transmission power from the optical transceiver is 0 dB. If the gain of the optical amplifier 4 is set at 15 dB for both of the optical transport devices 40a and 40b, the power of the transmission signals are 5 dBm, and the power of the receiving signals are −25 dBm, respectively. The receiving signals of −25 dBm are pre-amplified to −10 dBm and fed to the optical transceivers 5.

Both of the gain of the boost amplification and pre-amplification are changed due to the gain change of the optical amplifier. Therefore loss budget increase 2 dB where the gain of the amplifier increase 1 dB.

The gain control mechanism 41 is implemented into SNMP (Simple Network Management Protocol) system. The function of reading receiving power of the optical transceiver is also implemented into the SNMP system. Thus the optical transport devices 40a and 40b are controllable from remote site so that their transmission power and/or receiving powers are controllable. Some of the pluggable transceivers such as SFP or XFP adopts DDM (Digital Diagnostic Mechanism) which the SNMP system handles for remote sensing. Some of optical amplifier module also adopts similar mechanism. By combining these optical modules, remote control mechanism over networks is available.

Control mechanisms for the optical amplifiers or the optical attenuators may be a variety of fashion, for example, automatic adjusting mechanism, manual adjusting mechanism, and/or simple alarm mechanism.

The 5$^{th}$ Embodiment

Figure 7:
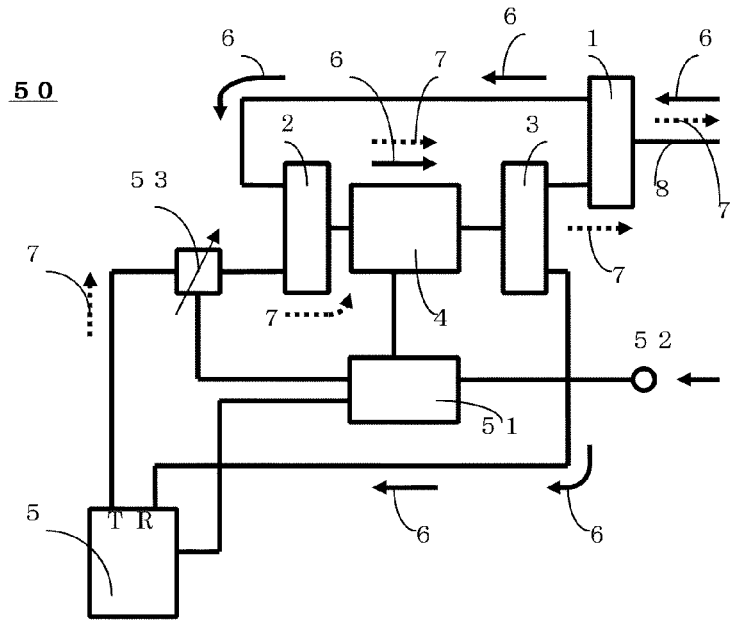
FIG. 7 is a schematic diagram of the 5th embodiment of the optical transport device 50.

FIG. 7 shows an optical transport device 50 as a 5$^{th}$ embodiment of the present invention. The major difference from the 4$^{th}$ embodiment is that this embodiment comprises a variable optical attenuator 53 instead of the optical attenuator 21 and further comprises a control mechanism 51. The control mechanism 51 controls the optical amplifier 4 and the variable optical attenuator 53. The control mechanism 51 can read statuses of the optical transceiver 5 and the optical amplifier module. The control port 52 is an interface for networking so that remote sensing and control are available.

According to the present embodiment, the variable optical attenuator is controllable so that the transmission power and the gain of pre-amplification are controlled independently.

The 6$^{th}$ Embodiment

Figure 8:
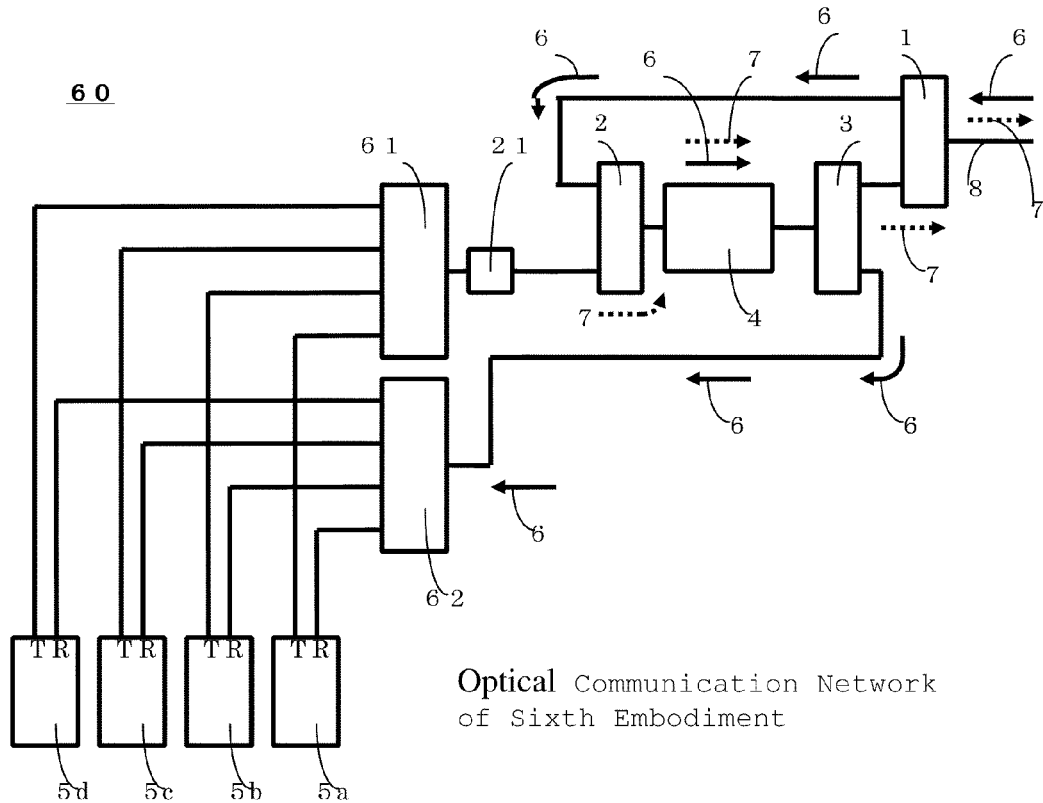
FIG. 8 is a schematic diagram of the 6th embodiment of the optical transport device 60.

FIG. 8 shows an optical transport device 60 as a 6$^{th}$ embodiment of the present invention. The major difference from the 2$^{nd}$ embodiment is that this embodiment comprises wavelength division multiplexing to realize multiple channel operation.

The optical transport device 60 comprises optical transceivers 5a and 5b. The wavelengths of these optical transceivers are different each another, thus transmission optical signals are combined by the wavelength division multiplexer 61, and receiving signals are de-combined by wavelength division multiplexer 62. The wavelength division multiplexers 61 and 62 are based on dielectric thin film filter technology. The wavelength division multiplexers 61 and 62 may be based on AWG (Arrayed Wave Guide) technology.

In this embodiment, the wavelength division multiplexers 1, 2, and 3 passes multiple channels of DWDM gird wavelengths, simultaneously. More specifically, a Blue-band filter which passes short wavelength region of C-band and a Red-band filter which passes long wavelength region of C-band, are adopted.

Instead of the Blue-band filter and Red-ban filter, s 4-skip-1 filter or a 8-skip-1 filter is applicable as the wavelength division multiplexers 1, 2, and 3. The 4-skip-1 filter passes 4 DWDM grids and skips 1 DWDM grid. The 8-skip-1 filter passes 8 DWDM grids and skips 1 DWDM gird.

The optical attenuator 21 is disposed between the wavelength division multiplexers 1 and 2. By adjusting this optical attenuator, the transmission power and the gain of pre-amplification are controlled independently as described in the 2$^{nd}$ embodiment. As same as the 4$^{th}$ embodiment, a gain control mechanism may be adopted to the optical amplifier 4. Instead of the optical attenuator 21, as same as the 5$^{th}$ embodiment, a variable optical attenuator may be adopted.

Instead of the wavelength division multiplexer 61, a 1×N tree coupler based on fiber coupler or planar waveguide technology is applicable. The 1×N tree coupler provide insertion loss according to split ratio. 2-port, 4-port, and 8-port provide 3 dB, 6 dB, and 9 dB, respectively. In addition excess loss is added to this insertion loss. Therefore, typical wavelength division multiplexing optical transport device does not comprise tree-coupler as a combiner. However, according to this embodiment, it is required to attenuate transmission signal by the optical attenuator 21. Thus some certain part of required attenuation may be substituted by the tree-coupler. The tree-coupler device is less expensive than wavelength division multiplexers based on thin film filter or AWG technologies so that it provides benefit of cost reduction. However, the tree-coupler device cannot distinguish wavelengths so that it is not able to apply for wavelength division multiplexer 61 as a de-combiner for receivers.

The 7$^{th}$ Embodiment

Figure 9:
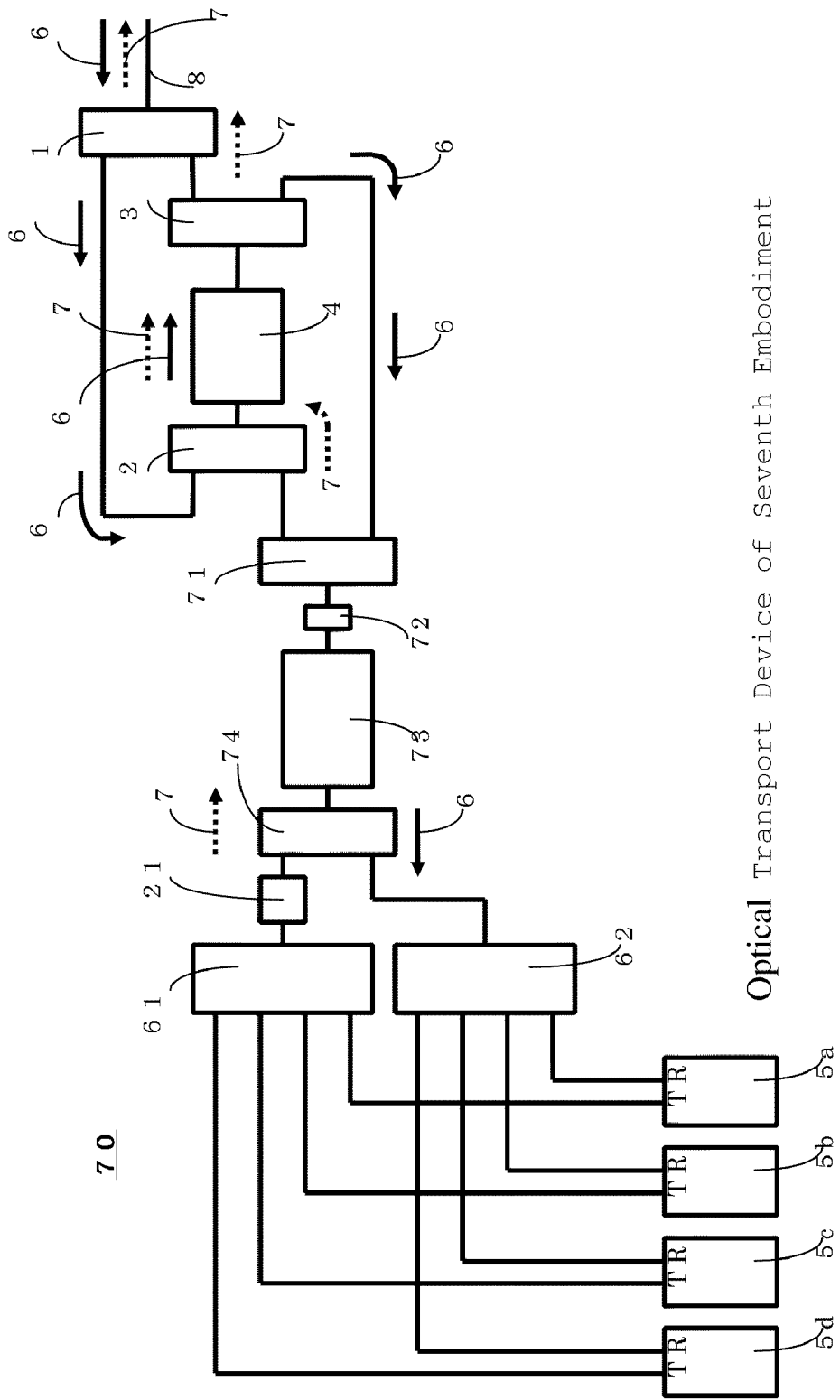
FIG. 9 is as schematic diagram of the 7th embodiment of the optical transport device 70.

FIG. 9 shows an optical transport device 70 as a 7$^{th}$ embodiment of the present invention. The major difference from the 6$^{th}$ embodiment is that this embodiment further comprises a gain flattening filter 72 and a dispersion compensation fiber 73. The gain flattening filter 72 and the dispersion compensation fiber 73 are disposed between wavelength division multiplexers 71 and 74. The wavelength division multiplexers 71 and 74 may be, as same as the wavelength division multiplexers 1, 2, and 3 of the 6$^{th}$ embodiment, Red-band filters, 4-skip-1 filter, or 8-skip-1 filters.

The gain flattening filter 72 compensates gain dependence on wavelength. The gain flattening filter 72 has a reciprocal loss curve against the gain curve of the optical amplifier 4. By connecting the gain flattening filter 72 and the optical amplifier 4, a composite gain curve becomes flat. Due to the gain flattening filter brings some loss; the gain flattening filter should be disposed after pre-amplification. If the gain flattening filter is disposed before pre-amplification, it will bring degradation of a receiving sensitivity. On the other hand, the gain flattening filter should be disposed before boost-amplification to avoid decrease of output power.

According to the configuration shown in FIG. 9, the gain flattening filter 72 locates before the amplifier 4 for the transmission signal 7. In contrast, for the receiving signal 6, the gain flattening filter 72 locates after the optical amplifier 4. Therefore there are no performance degradations for both of boost-amplification and pre-amplification.

The dispersion compensation fiber 73 compensates wavelength dispersion, that is, velocity of light in optical fiber changes depending on wavelength. Combination of the wavelength dispersion and wavelength spread of output light of an optical transceiver brings distortion on time-domain. The dispersion compensation fiber has a reciprocal dispersion property of the optical fiber for transmission, thus it compensates optical signals' distortions on time-domain occurred in an optical fiber for transmission. Other dispersion compensation means may substitute the dispersion compensation fiber 72.

According to FIG. 9, both of the gain flattening filter 72 and the dispersion compensation fiber 73 are disposed. It may be available that only one of them is disposed depending on application.

As described above, the wavelength multiplexed optical signals, by the wavelength division multiplexers 71 and 74, pass through the gain flattening filter 72 and the dispersion compensation fiber 73. The gain flattening filter 72 and the dispersion compensation fiber 73 are located before the optical amplifier 4 for the transmission signal 7, and after the optical amplifier 4 for the receiving single 6. Thus the insertion losses of the gain flattening filter 72 and the dispersion compensation fiber 73 do not degrade system performance.

The $8^{th}$ Embodiment

Figure 10:
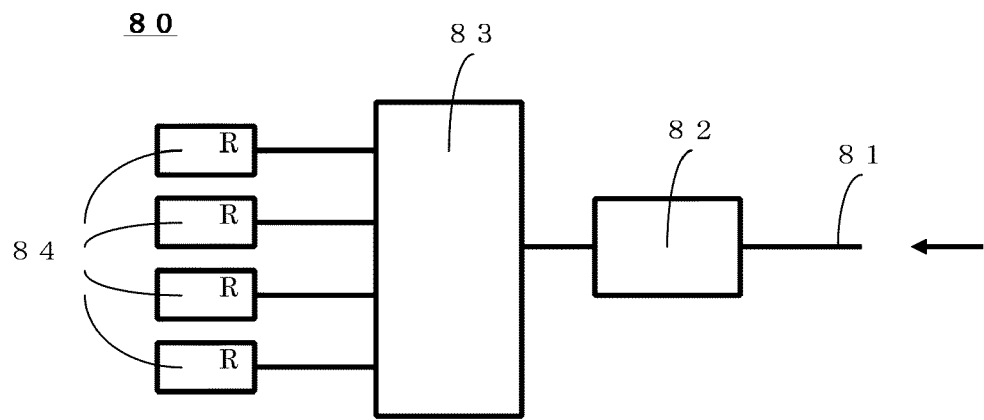
FIG. 10 is a schematic diagram of the 8th embodiment of the optical transport device 80.

FIG. 10 shows an optical receiver device 80 as a $8^{th}$ embodiment of the present invention. The optical receiver is an element of the optical transport device. Among the $1^{st}$ and $7^{th}$ embodiments, the optical transport devices comprise optical receivers. In optical receiver 80, Optical signals from an optical signal input port 81 are transmitted to receivers 84 of optical transceivers through an optical amplifier 82 and a wavelength division multiplexer (filter) 83. In FIG. 10, the optical receivers 84 are shown as 4 pieces of optical receivers. The number of the optical receivers may be arbitrary number of at least one. The wavelength multiplexer 83 has a function to de-combine the optical signals into individual wavelength as same as filter function. When multiple wavelengths are de-combined the function is called as wavelength multiplexing or de-multiplexing. When one wavelength is selected, the function is called as a filter. In case of pre-amplification, for the elimination of ASE (Amplified Spontaneous Emission) light, a technical term of narrow band filter is assigned as describes later.

As the optical receiver 84 of the optical transceiver, PIN photodiode and APD (Avalanche Photo Diode) are known. The PIN photodiode is less expensive but its sensitivity is low. The APD is expensive but has higher sensitivity. For example, for data rate between 622 Mbit/s and 2.67 Gbit/s, the PIN photodiode can receive the power range between −24 dBm and 0 dBm, and the APD can receive the power range between −30 dBm to −8 dBm. For higher data region such as 10 Gbit/s, between 9.95 Gbit/s and 11.5 Gbit/s, the PIN photodiode can receive −16 dBm to 0 dBm and the APD can receive −24 dBm to −8 dBm. The above sensitivity typically defined at the error rate of $10^{-12}$.

According to experimental results of the inventor, the sensitivities of −39.5 dBm (1.25 Gbit/s) and −33.5 dBm (9.95 Gbit/s) are obtained where 980 nm forward/backward pump EDFA with 100 GHz (0.8 nm) filter. The receiving sensitivities −37.5 dBm (1.25 Gbit/s) and −32.0 dBm (9.95 Gbit/s) are obtained with CWDM filter (13 nm). The receiving sensitivities −37.5 dBm (1.25 Gbit/s) and −30.5 dBm (9.95 Gbit/s) are obtained with no filter.

Figure 11:
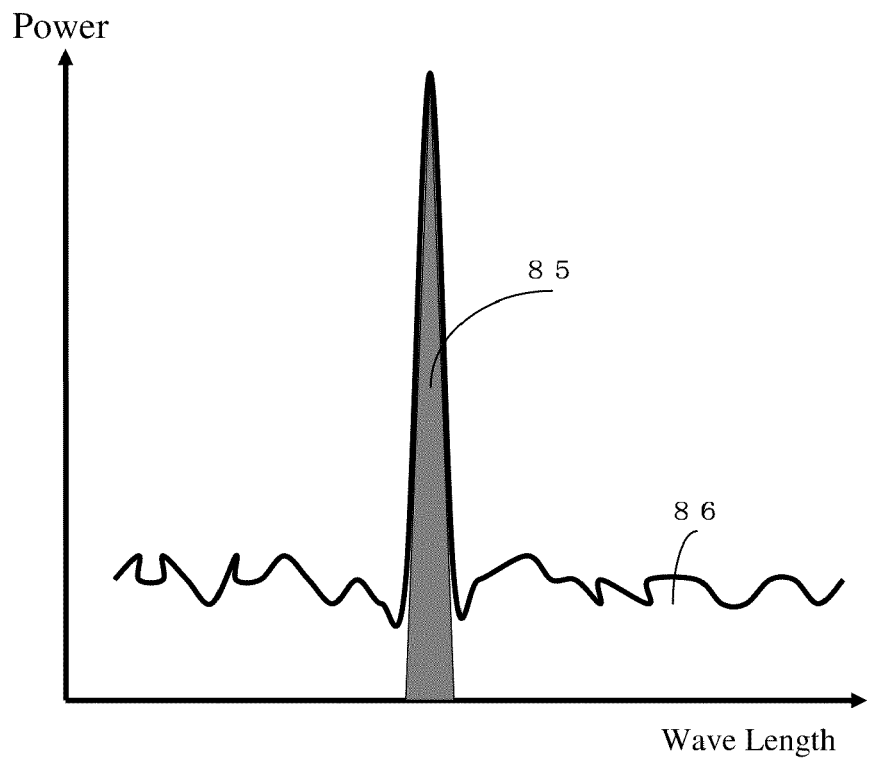
FIG. 11 shows optical spectrum of the output light from the optical amplifier 82.

The output light from the optical amplifier 82 has a spectrum shown in FIG. 11. The amplified optical signal 85 and the ASE (Amplified Spontaneous Emission) 86 are mixed. The X-axis and Y-axis of FIG. 11 show wavelength and power per wavelength, respectively. In the high sensitivity region which exceeds APD sensitivity, ASE power is stronger than the optical signal power. According to measurement, ASE light 86 is 6 dB (4 times) stronger than the amplified optical signal 85 where input optical signal is −32 dBm at input port of the optical amplifier for 10 Gbit/s pre-amplifier operation.

A ratio of the ASE 86 and the input optical signal changes depending signal level and number of signals, that is, number of wavelength multiplexed signals. The ratio is largest where the input optical signal is around minimum sensitivity and the number of signal is one. An amount of ASE depends on property of the optical amplifier. In a high sensitivity region than conventional APDs', the ratio of the ASE 86 and the input optical signal is between 2 and 8 dB.

The high sensitivity region than conventional APDs' denotes between −30 dBm and −40 dBm where the data rate between 622 Mbit/s and 2.67 Gbit/s. Also The high sensitivity region than conventional APDs' denotes between −24 dBm and −34 dBm where the data rate between 9.95 Gbit/s and 11.5 Gbit/s.

The fact that the ASE 86 is grater than the optical single 85 impacts gain control mechanism for the optical amplifier 82. Inside the optical amplifier 82, there are two photo detectors. One of them is to detect input optical power and another is to detect output power. The gain is maintained constant according to measurement results form these two detectors at so-called gain constant mode. However these detector does not comprise any filter so that the detector for output power detects summation of the ASE and the optical signal. As a result, real gain is controlled to smaller gain than the target gain due to the ASE 86 in case of the gain constant mode. In case of another operation mode, constant output power mode, the output power is controlled to lower power than the target output power.

Let us consider the case that an input optical signal of −33 dBm at data rate of 9.95 Gbit/s is pre-amplified to −10 dBm, and fed to a PIN photodiode. The required gain is 23 dB. However the real gain is 6 dB lower than it due to ASE light. Therefore the gain of the pre-amplifier needs to be set at 29 dB for achieving the −10 dBm input power at the PIN photodiode.

Thus in this embodiment, the optical amplifier 82 is set at the gain derived from a correction table which shows relation among input optical signal power level, number of signals, and the real gain. The operation mode of the optical amplifier 82 may be both of constant gain mode and constant output power mode. Even in the constant output power mode, the correction against ASE is required. This correction may be done by automatically or manually.

A range of an input optical power of the optical receiver 84 has constraint as shown below. Let us consider an optical signal of −33 dBm at the optical signal input port 81 is amplified to −16 dBm. And the optical receiver 84 comprising PIN photodiode at the data rate of 10 Gbit/s, may produce relatively big error rate if the optical receiver 84 receives the optical signal of −16 dBm. If the optical signal of −33 dBm at the optical signal input port 81 is amplified to −12 dBm and fed to the optical receiver 84, the error rate is decreased drastically. Thus the gain of the optical amplifier 82 is necessary to adjust to provide 4 dB higher than the minimum receiving sensitivity of the optical receiver 84.

In contrast, if the optical signal grater than 0 dB is fed to the optical receiver 84, an error rate increases.

The same situation is observed in APD based optical receiver. The optical receiver 84 comprising APD must receive the optical signal between 4 dB higher than its minimum sensitivity and maximum receiving level, that is −8 dB for APD.

The above results can summarize below.

For an optical receiver comprising PIN photodiode with data rate between 622 Mbit/s and 2.67 Gbit/s, input optical signal range between −20 dBm and 0 dBm should be fed to the optical receiver where the optical signal level at the optical input port 81 is between −30 dBm and −40 dBm.

For an optical receiver comprising PIN photodiode with data rate between 9.95 Gbit/s and 11.5 Gbit/s, input optical signal range between −12 dBm and 0 dBm should be fed to the optical receiver where the optical signal level at the optical input port 81 is between −24 dBm and −34 dBm.

For an optical receiver comprising APD photodiode with data rate between 622 Mbit/s and 2.67 Gbit/s, input optical signal range between −24 dBm and −8 dBm should be fed to the optical receiver where the optical signal level at the optical input port 81 is between −30 dBm and −40 dBm.

For an optical receiver comprising APD photodiode with data rate between 9.95 Gbit/s and 11.5 Gbit/s, input optical signal range between −20 dBm and −8 dBm should be fed to the optical receiver where the optical signal level at the optical input port 81 is between −24 dBm and −34 dBm.

As described above, input single range of the optical receiver, that is a difference of maximum input level and minimum input level, is around 12 dB. The error around 2-8 dB produced by ASE light is not negligible. The input power level of the optical receiver is the value after filtering. In reality, the gain should be adjusted considering with insertion losses of the filters and wavelength division multiplexers.

In configuration shown in FIG. 10, the minimum receiving sensitivity of the optical receiver device 80 is determined by the optical amplifier, and the sensitivity is not affected by the optical receiver 84 comprising no matter PIN photodiode or APD. Thus PIN photodiode is preferred due to cost.

By maintaining optical input signal for the optical receiver appropriately, depending on data rate, higher sensitivity than conventional APD receivers is obtained.

The 9th Embodiment

Figure 12:
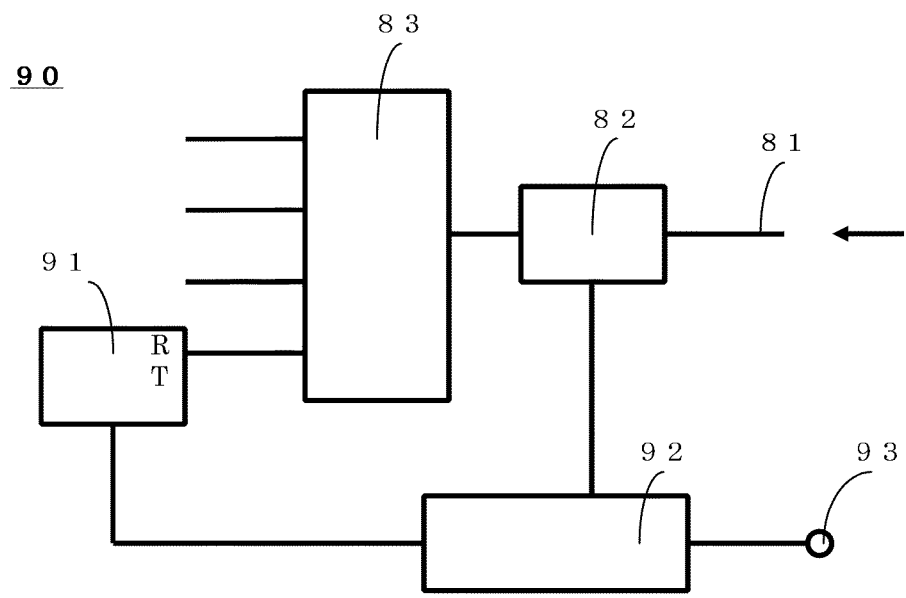
FIG. 12 is a schematic diagram of the 9th embodiment of the optical receiver device 90.

FIG. 12 shows an optical receiver device 90 as a 9th embodiment of the present invention. The optical receiver device 90 comprises an optical transceiver 91 instead of the optical receiver 84 in the 8th embodiment, and further comprises gain control mechanism 92, and a control port 93.

The optical transceiver 91 comprises DDM (Digital Diagnostic Mode) such as SFP or XFP transceivers. The SFP or XFP comprises OPM (Optical Power Monitor) which enables to measure input optical signal level and inform to outside through DDM mechanism.

As described in the 8th embodiment, the ASE from the optical amplifier 82 affects the gain control mechanism, especially in high gain region. The optical signal passing through wavelength division multiplexer 83, which is a filter, is fed to the optical transceiver 91. Thus the optical signal level informed by OPM is a value in which ASE effect is eliminated. If the OPM information is applied for the gain control mechanism 92 to control the gain of the optical amplifier 82, appropriate operation condition described in the 8th embodiment is achieved.

According to the technical standard of the SFP or XFP, an error of the OPM is allowed within 3 dB. Most of real products show this error within 0.5 dB, however, system designer must take into account the 3 dB error.

In the configuration shown in FIG. 12, taking into account the error, an operation condition should be determined as described below.

For an optical receiver comprising PIN photodiode with data rate between 622 Mbit/s and 2.67 Gbit/s, input optical signal range between −17 dBm and −3 dBm should be fed to the optical receiver where the optical signal level at the optical input port 81 is between −30 dBm and −40 dBm.

For an optical receiver comprising PIN photodiode with data rate between 9.95 Gbit/s and 11.5 Gbit/s, input optical signal range between −9 dBm and −3 dBm should be fed to the optical receiver where the optical signal level at the optical input port 81 is between −24 dBm and −34 dBm.

For an optical receiver comprising APD photodiode with data rate between 622 Mbit/s and 2.67 Gbit/s, input optical signal range between −21 dBm and −11 dBm should be fed to the optical receiver where the optical signal level at the optical input port 81 is between −30 dBm and −40 dBm.

For an optical receiver comprising APD photodiode with data rate between 9.95 Gbit/s and 11.5 Gbit/s, input optical signal range between −17 dBm and −11 dBm should be fed to the optical receiver where the optical signal level at the optical input port 81 is between −24 dBm and −34 dBm.

According to present embodiment, by using OPM information from the optical transceivers, the gain of the optical amplifier is controlled so that higher sensitivity than the conventional APD receiver is realized.

The 10th Embodiment

Figure 13:
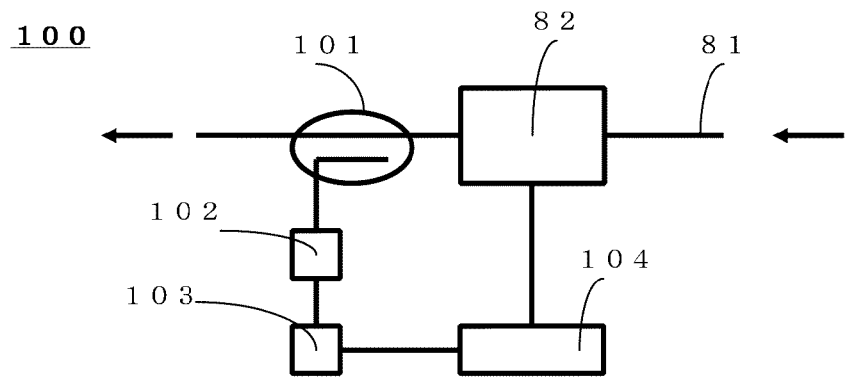
FIG. 13 is a schematic diagram of the 10th embodiment of the optical amplifier module 100.

FIG. 13 shows an optical amplifier module 100 as a 10th embodiment of the present invention. An optical fiber coupler 101 is disposed at the output port of the optical amplifier 82. The branched optical signal from the optical fiber coupler 101 is filtered by a filter 102, and fed to an optical receiver 103. The optical signal is transformed to output signal information and fed to a gain control mechanism 104. The filter 102 is, for example, DWDM 100 GHz gird filter therefore an optical signal with same wavelength bandwidth is detected.

In case of using the OPM of SFPs or XFPs, due to the error of 3 dB, input power range of the optical transceiver is limited relatively narrow range. Whereas this embodiment enables to adopt more accurate optical detector, as a result the range of the optical transceiver may widen.

As the OPM of SFPs and XFPs, there are two types of method, so-called internal calibration and external calibration. Also real implementations of these calibration methods are diverse. Thus the gain control sometimes lack of precision. In contrast, this embodiment comprises an exclusive detector therefore more precise gain control is enabled.

The 11th Embodiment

Figure 14:
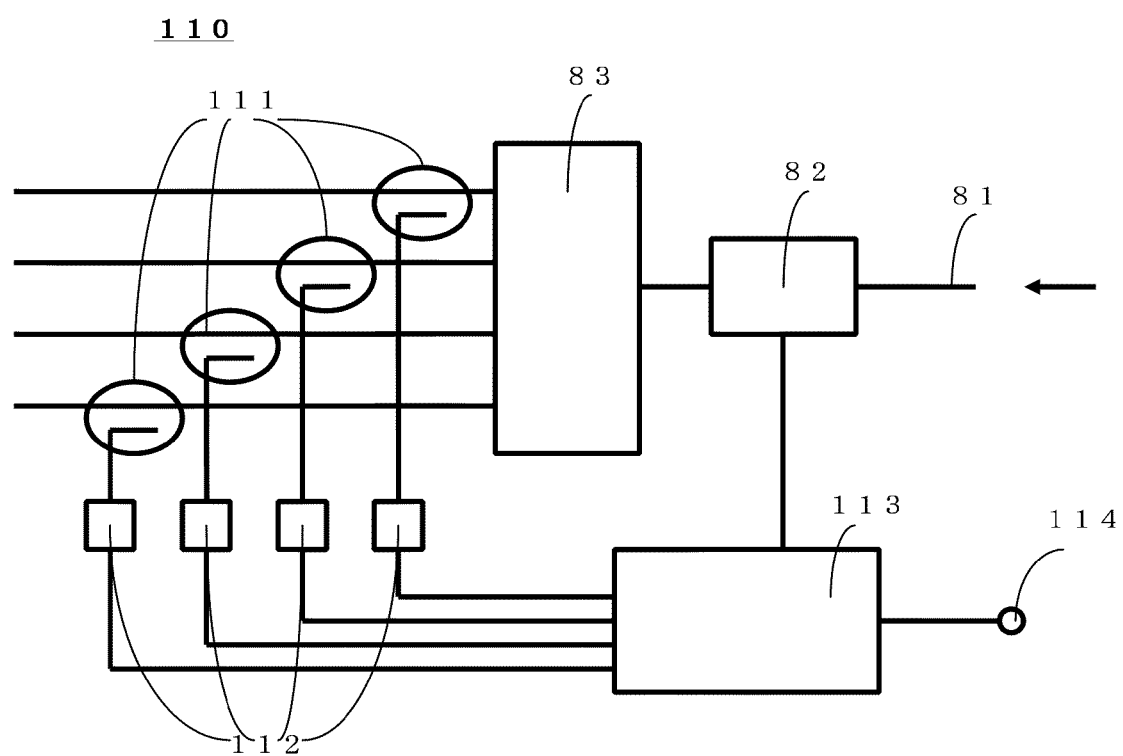
FIG. 14 is a schematic diagram of the 11th embodiment of the optical amplifier module 110.

FIG. 14 shows an optical amplifier module 110 as a 10th embodiment of the present invention. An output port of the optical amplifier 82 is connected to the wavelength division multiplexer 83, optical fiber couplers 111 are connected to each output port of the wavelength division multiplexer. An optical detector 112 detects a branched optical signal and informs its value to a gain control mechanism 113. The gain control mechanism 113 comprises a communication port 114.

The wavelength multiplexer 82 is based on DWDM 100 GHz grid as described previously. Thus the wavelength division multiplexer has the same function of the filter 102 of the 10th embodiment. Another branch of the optical fiber coupler is connected to an optical transceiver which is not shown in FIG. 14.

In the present embodiment, the wavelength division multiplexer 83 also works as a filter. Plural channels' signal level may be monitored and the optical amplifier may be controlled according to the monitoring.

The gain control mechanism 113 may be implemented as a part of SNMP agent system, and connected with network through the communication port 114. The SNMP agent system enables remote sensing of the receiving optical power and/or remote control of the optical amplifier. It is possible to set alarm for warn to deviate from appropriate range of the receiving optical power.

The 12th Embodiment

Figure 15:
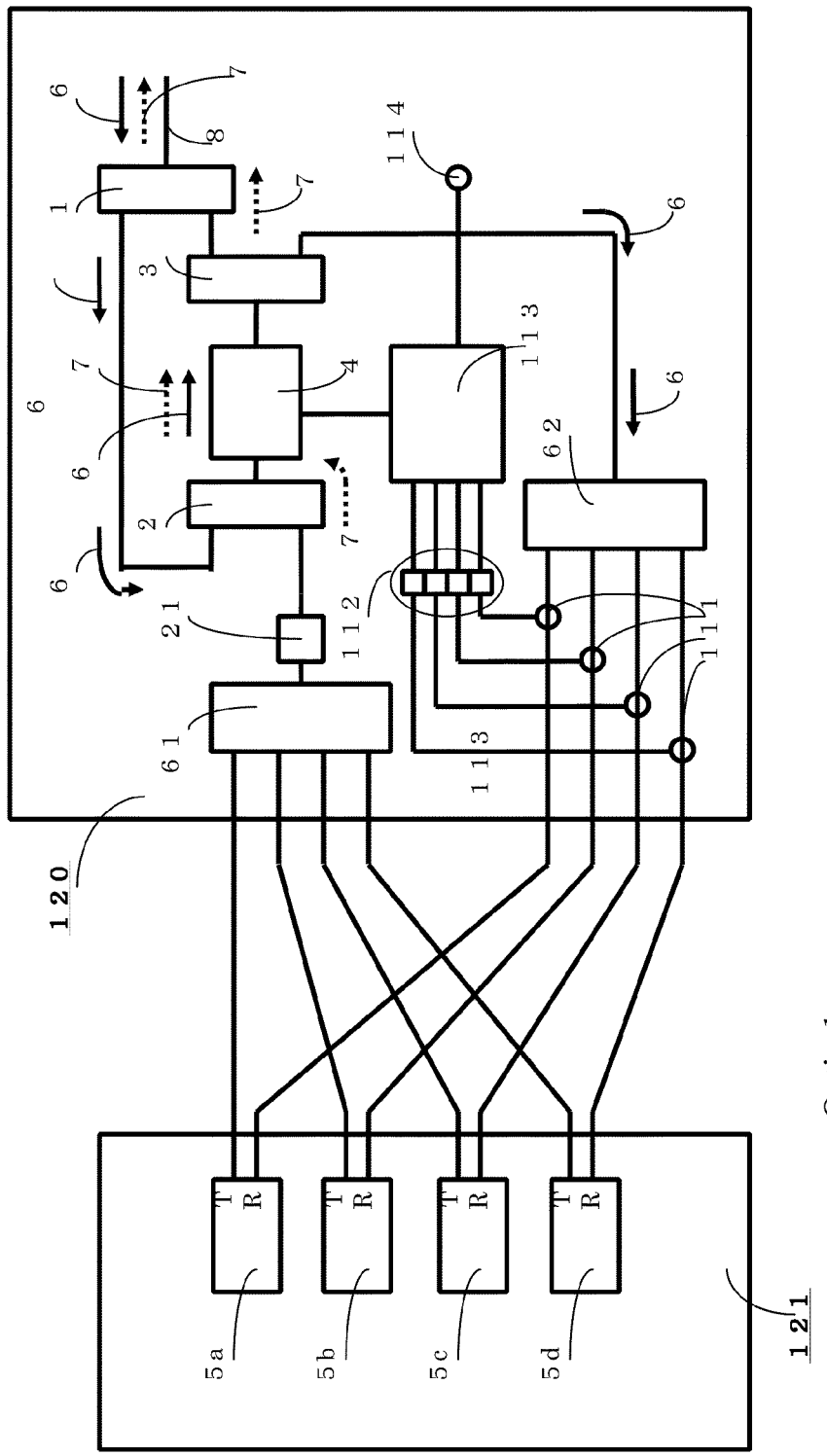
FIG. 15 is a schematic diagram of the 12th embodiment of the optical amplifier module 120.

FIG. 15 shows an optical amplifier unit 120 as a 12th embodiment of the present invention. In the present embodiment, optical transceivers 5a, 5b, 5c, and 5d are connected to an Ethernet switch 121. The optical amplifier unit 120 is a derivative of the 6th embodiment shown in FIG. 8 with combination of the 11th embodiment shown in FIG. 14.

Recently, many Ethernet switches and routers adopts pluggable interfaces such as SFPs or XFPs. Wavelength division multiplexed pluggable transceivers may be plugged into such the interfaces. In such a case, the optical amplifier unit 120 combined with wavelength division multiplexer and optical amplifier is useful.

In the implementation shown in FIG. 14, a chassis with optical transceivers and a chassis with an optical amplifier are independent each another. Therefore it is complicated to control the optical amplifier by using OPM information from the optical transceivers. The 11th embodiment is advantageous in such a configuration.

The 13th Embodiment

Figure 16:
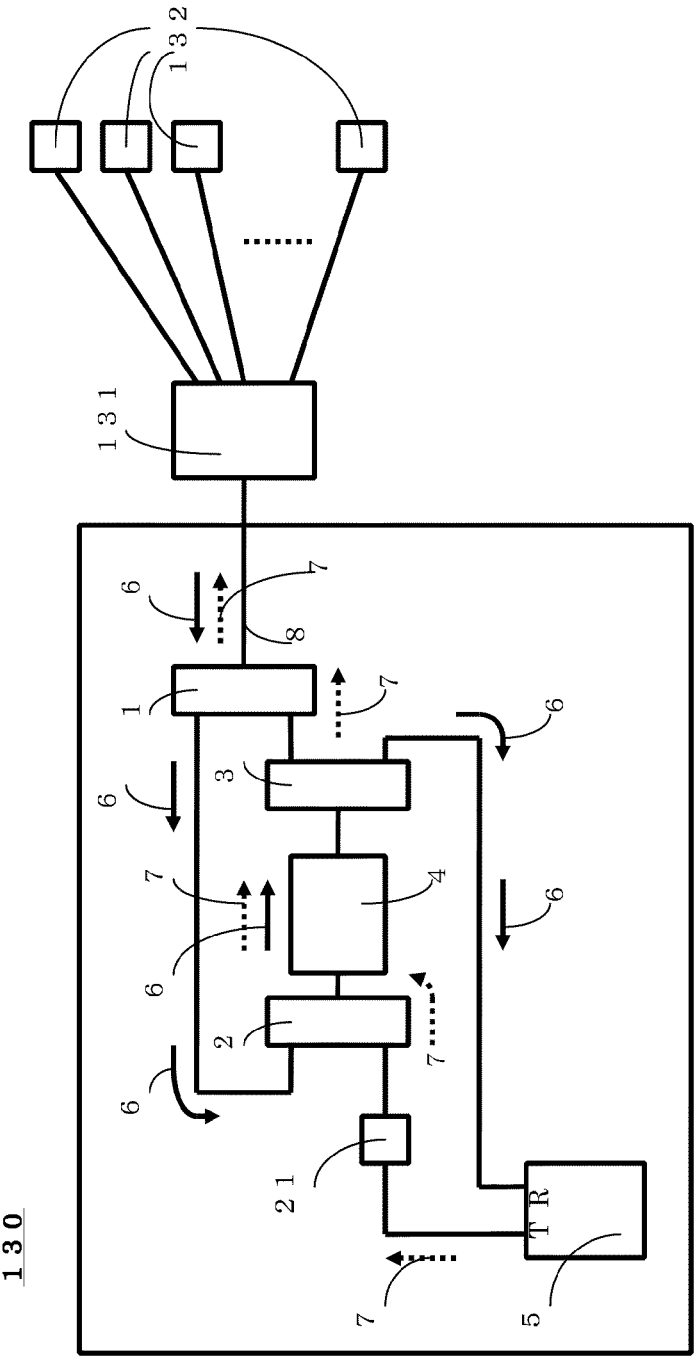
FIG. 16 is a schematic diagram of the 13th embodiment of the OLT (Optical Line Terminal) 130 of 10G-PON (Passive Optical Network).

FIG. 16 shows an OLT (Optical Line Terminal) 130 for a 10G-PON (Passive Optical Network) as a 13th embodiment of the present invention. The OLT 130 has basically a same structure of the optical transport device 20 shown in FIG. 3. An input/output port 8 of the OLT 130 and a splitter 131 are connected each another. The opposite ends of the splitter 131 are connected to ONUs (Optical Network Units) 132. The splitter 131 is a tree-coupler which is based on optical fiber coupler or planar waveguide technology. A number of branches are typically 32. The insertion loss of the splitter is around 18 dB. The maximum distance between the OLT 130 and the ONU 132 is 15 km which brings 7.5 dB loss (0.5 dB/km). Thus the loss budget between the OLT 130 and the ONU 132 is around 26 dB.

The OLT 130 comprises an optical amplifier 4 which is C-band EDFA. Wavelength division multiplexers 1, 2, and 3 are CWDM based filter of 1530 nm and 1550 nm. A down-stream signal 7 and up-stream signal 6 wavelengths of the OLT 130, are 1530 nm and 1550 nm, respectively. An optical transceiver 5 disposed in the OLT 130 comprises a PIN photodiode as a receiver and a direct modulated DFB (Distributed Feed Back) laser as a transmitter.

The ONU 132 comprises a direct modulated DFB laser as a transmitter and a PIN photodiode as a receiver. A transmission power of the ONU 132 is −5 dBm. A minimum receiving sensitivity of the receiver of the ONU 132 is −16 dBm. In contrast, a transmission power and a minimum sensitivity of the OLT 130 are +12 dBm and −33 dBm, respectively. As a result, both of the down-stream pass and the up-stream pass have 28 dB loss budgets. These values are 2 dB higher than 26 dB of the requisite value.

Figure 17:
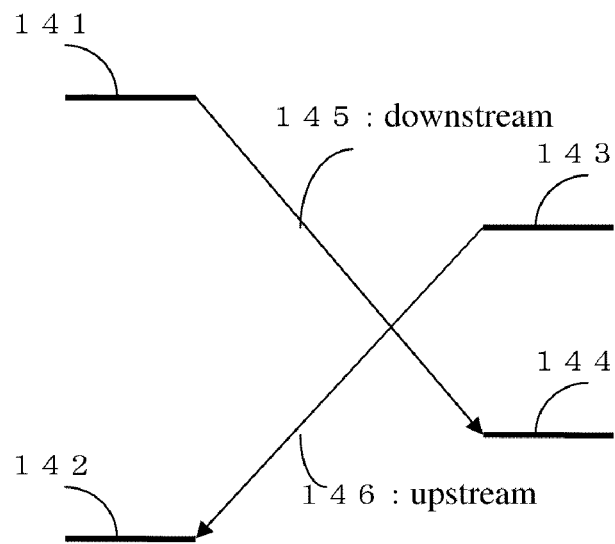
FIG. 17 shows the relationship among levels of optical signals describing in FIG. 16.

FIG. 17 shows relationship among optical signals. Reference numbers 141, 142, 143, and 144 denote the transmission power of the OLT 130, the minimum receiving sensitivity of the OLT 130, the transmission power of the ONU 132, and the minimum receiving sensitivity of the ONU 132, respectively. Reference numbers 145 and 146 denote loss budgets of the down-stream and up-stream, respectively. The OLT 130 has high power transmitter and high sensitivity receiver. In contrast ONU 132 has low power transmitter and low sensitivity receiver. This configuration reduces the cost of ONU 132.

So-called SMFs (Single Mode Fibers) with 1310 nm zero-dispersion wavelength have dispersion around 20 ps/nm/km at 1550 nm. Thus the transmission length of 15 km brings a dispersion of 300 ps/nm. The direct modulated DFB laser has wavelength spread between 0.2 and 0.3 nm. Therefore time-domain distortion around 90 ps may happen. A digital transmission of 10 Gbit/s corresponds to 5 GHz analog band width. Because 2 bit digital data corresponds to one analog cycle. One cycle of 5 GHz frequency corresponds to time duration of 200 ps. Thus the direct modulated DFB laser can transmit over 15 km SMF.

According to the present embodiment, single optical amplifier acts both of boost amplification and pre-amplification so that cost-reduced OLT is realized. Also the OLT may adopt low-cost PIN photodiode as a receiver.

The present invention is not limited by C-band EDFA or wavelengths. Any type of optical amplifier and/or any wavelengths may be adopted.

The 14th Embodiment

Figure 18:
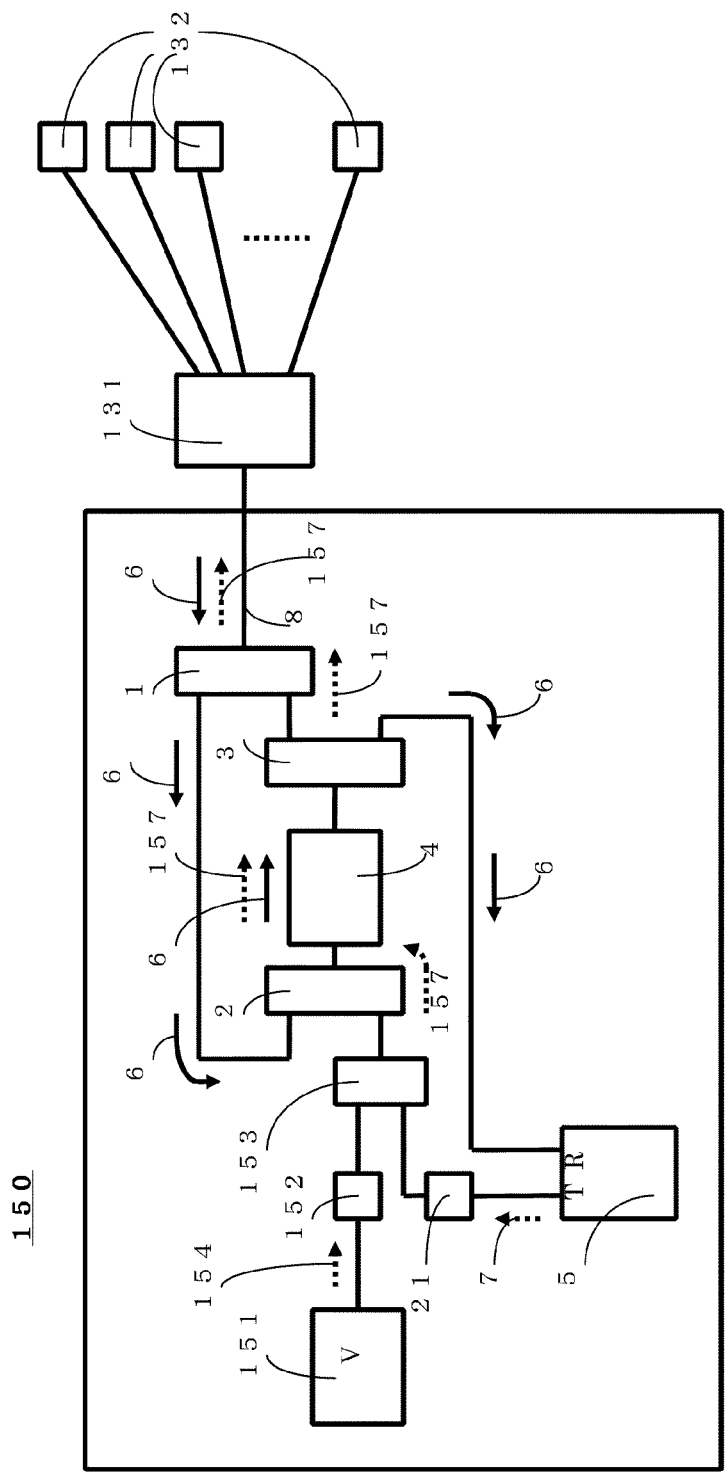
FIG. 18 is a schematic diagram of 14th embodiment of the OLT (Optical Line Terminal) 140 of 10G-PON (Passive Optical Network).

FIG. 18 shows an OLT (Optical Line Terminal) 150 for a 10G-PON (Passive Optical Network) as a 14th embodiment of the present invention. The OLT 150 is based on the OLT 130 and further comprises a video optical signal transmitter 151. The OLT 150 is applicable for so-called triple play services.

A transmission signal 154 of wavelength $\lambda 3$ transmitted from the video optical signal transmitter 151, is fed to a wavelength multiplexer 153 through an optical attenuator 152. The wavelength division multiplexer 153 combines the transmission signal 154 and a transmission signal 7 of wavelength $\lambda 1$ from an optical transceiver 5 into a signal 157. The signal 157 is fed to a wavelength division multiplexer 2. Rest of behaviors follows in a manner of the 2nd embodiment.

In the present embodiment, semiconductor lasers with TEC (Thermo Electric Cooler) are applied as transmitter devices for the optical transceiver 5 and the video optical signal transmitter 151. The wavelengths of these semiconductor lasers adopt DWDM grids within 1530 nm CWDM grid. The preferable grid interval is 400 GHz (3.2 nm) or 800 GHz (6.4 nm).

According to the present embodiment, an OLT for triple play service is realized with the configuration of the 13th embodiment. Thus cost reduced triple play service OLT is achievable.

As described above, according to the present embodiment, single optical amplifier acts both of the boost amplification and pre-amplification. As a result, high loss budget is realized with reduced cost.

The 15th Embodiment

FIG. 19 shows an optical transport device 160 as a 15th embodiment of the present invention. The optical transport device 160 is based on the optical transport device 60 shown in FIG. 8, and further comprises redundant structure.

The major difference from the configuration shown in FIG. 8 is that the optical transport device 160 further comprises optical switches 161, 162, optical amplifiers 163 and 164. In normal case, the optical switches 161 and 162 select the optical amplifier 163. When the optical amplifier 163 failed, the optical switches 161 and 162 will select the optical amplifier 164. Other elements are same in the optical transport device 60.

In the optical transport device 60 shown in FIG. 8, transport function fails if the optical amplifier 4 fails. In contrast, the optical transport device 160 is backed up by the optical amplifier 164 when the optical amplifier 163 fails. Thus the optical transport device 160 has high reliability.

An optical circulator may substitute for the wavelength division multiplexer 1. The optical circulator is a device which routes the optical signal depending on its direction. Thus the optical circulator routes a receiving signal 6 from an input/output port 8 to a wavelength division multiplexer 2. Also the optical circulator routes a transmission signal 5 from a wavelength division multiplexer 3 to the input/output port 8.

An optical fiber coupler may substitute for the wavelength division multiplexer 2. The optical fiber coupler is less expensive than the wavelength division multiplexers. However, the optical fiber coupler will bring relatively large insertion loss around 3 dB.

Inter-leavers may substitute the wavelength division multiplexers 1, 2, and 3. The inter-leavers are three port devices which combine/de-combine odd grids and even girds of the wavelengths.

FIG. 20 shows possible device combinations for the devices 1, 2, and 3. Combinations among A-1 and A-8 enable to work an optical system shown in FIG. 19. The configurations shown in FIG. 1, FIG. 3, FIG. 4, FIG. 5, FIG. 7, FIG. 8, FIG. 9, and FIG. 15 may adopt the combinations shown in FIG. 20.

The 16$^{th}$ Embodiment

Figure 21:
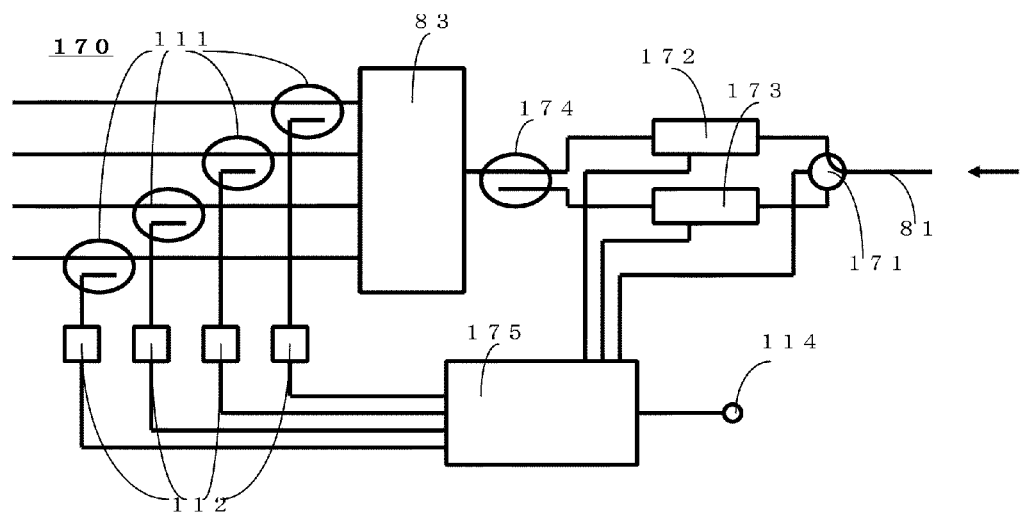
FIG. 21 is a schematic diagram of the 16th embodiment of the optical amplifier module 170.

FIG. 21 shows an optical amplifier module 170 as a 16$^{th}$ embodiment of the present invention. The optical amplifier module 170 is based on the optical amplifier module 110 shown in FIG. 14, and further comprises redundant structure.

The optical amplifier module 170 is based on the optical amplifier module 110, and further comprises an optical switch 171, two optical amplifiers 172 and 173, optical fiber coupler 174, and gain control mechanism 175. The gain control mechanism 175 is based on the gain control mechanism 113 of the optical amplifier module 110 and further comprises switching mechanism of the two amplifiers.

The optical switch 171 selects the optical amplifier 172 in normal case. An optical input signal from an optical input port 82 is fed to the wavelength division multiplexer 83 through the optical switch 171, the optical amplifier 172, and the optical fiber coupler 174.

When the optical amplifier 172 fails, the optical switch 171 will select the optical amplifier 173, thus back up operation is realized. The control mechanism 175 detects statuses of the optical amplifiers 172 and 173, receives external control signal from a communication port 114, and determines to switch the optical switch 171.

The optical fiber coupler 174 brings 3 dB insertion loss, whereas it provides high reliability due to lack of moving parts. In addition, the optical fiber coupler 174 is less expensive. An optical signal amplified by the optical amplifier 172 or 173 is fed to the wavelength division multiplexer 83 through the optical fiber coupler so that the 3 dB loss does not impact to receiver sensitivity.

The control mechanism 175 comprises power shut off function of the optical amplifiers 172 and 173. This function is for to eliminate ASE from the optical amplifier of off-duty.

An optical switch may substitute the optical fiber coupler 174. In such a configuration, two optical switches select the optical amplifiers 172 or 173 in a same manner shown in the 15$^{th}$ embodiment. This configuration eliminates insertion loss of the optical fiber coupler with some additional cost. Other optical splitting means such as planar waveguides are applicable instead of the optical fiber coupler 174.

The redundant configuration shown in FIG. 20 with the optical switch 171, two optical amplifiers 172, 173, and the optical fiber coupler 174, is applicable to the devices shown in FIG. 10, FIG. 12 and FIG. 13. The configuration replacing the optical fiber coupler 174 to an optical switch is also applicable to the devices shown in FIG. 10, FIG. 12 and FIG. 13.

The 17$^{th}$ Embodiment

Figure 22:
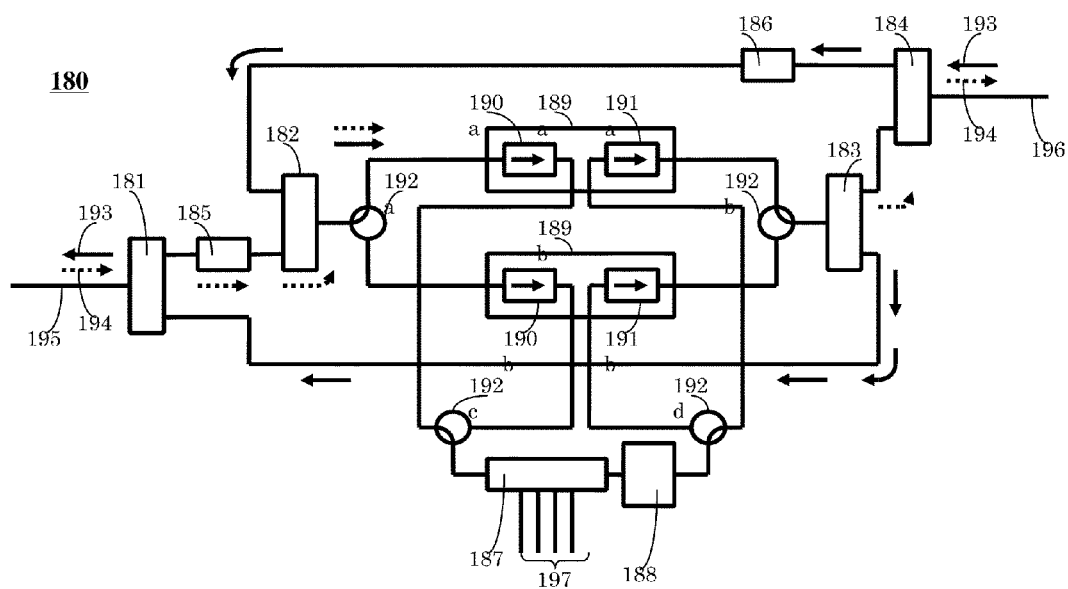
FIG. 22 is a schematic diagram of the 17th embodiment of the optical add/drop multiplexer transport device 180.

FIG. 22 shows an optical add/drop multiplexer 180 as a 17$^{th}$ embodiment of the present invention. The optical add/drop multiplexer 180 comprises wavelength division multiplexers 181, 182, 183, 184, variable optical attenuator 185, 186, an optical add/drop multiplexing device 187, a dispersion compensation device 188, optical amplifiers 189a, 189b, optical switches 192a, 192b, 192c, and 192c. The optical add/drop multiplexer 180 comprises two optical input/output ports 195 and 196.

The optical amplifiers 189a and 189b are two-stage EDFAs (Erbium Doped Fiber Amplifiers). The optical amplifier 189a comprises 1$^{st}$ stage EDFA 190a and 2$^{nd}$ stage EDFA 191a. The optical amplifier 189a comprises a gain flattening means which is not shown in FIG. 22. The optical amplifier 189b comprises 1$^{st}$ stage EDFA 190b and 2$^{nd}$ stage EDFA 191b. The optical amplifier 189b comprises a gain flattening means which is not shown in FIG. 22.

One of two optical amplifiers 189a and 189b, the optical amplifier 189b is for back up use. In normal case, the optical amplifier 189a is on duty. When the optical amplifier 189a fails the optical amplifier 189b will take over. The optical switches 192a, 192b, 192c, and 192d select the optical amplifier 189a in normal case, and turn to select the optical amplifier 189b if some malfunction happens. The optical switches 192a, 192b, 192c, and 192d are 1×2 optical switches. Optical signals 194, shown as a dashed arrow in FIG. 22, inputted from a 1$^{st}$ optical input/output port 195 is outputted to a 2$^{nd}$ optical input/output port 196 through the wavelength division multiplexer 181, the variable optical attenuator 185, the wavelength division multiplexer 182, the optical switch 192a, the 1$^{st}$ stage EDFA 190b, the optical switch 192c, the optical add/drop multiplexing device 187, the dispersion compensation device 188, the optical switch 192d, the 2$^{nd}$ EDFA 191a, the optical switch 192b, the wavelength division multiplexers 183, and 184.

Optical signals 193, shown as solid arrow in FIG. 22, inputted from a 2$^{nd}$ optical input/output port 196 is outputted to a 1$^{st}$ optical input/output port 195 through the wavelength division multiplexer 184, the variable optical attenuator 186, the wavelength division multiplexer 182, the optical switch 192a, the 1$^{st}$ stage EDFA 190b, the optical switch 192c, the optical add/drop multiplexing device 187, the dispersion compensation device 188, the optical switch 192d, the 2$^{nd}$ EDFA 191a, the optical switch 192b, the wavelength division multiplexers 183, and 181.

The variable optical attenuators 185 and 186 adjust optical signal levels. A transmission optical fiber connected to the 1$^{st}$ optical input/output port 195 and a transmission optical fiber connected to the 2$^{nd}$ optical input/output port 196 sometimes do not correspond. In such a case, optical input signal levels at the optical input/output ports 195 and 196 do not correspond.

The optical add/drop multiplexing device 187 comprises a port group 197. Optical transceivers which are not shown in FIG. 22 are connected to the port group 197. One of the selected wavelengths among the optical signals 193 and 194, is extract from the port group 197. One of the selected wavelengths is added to the transmission line through the port group 197.

Optical circulators may substitute for the wavelength division multiplexers 181 and 184. An optical fiber coupler substitutes for the wavelength division multiplexer 182. Interleavers may substitute for the wavelength division multiplexers 181, 182, 183, and 184. FIG. 23 shows the available device combination for the reference numbers 181, 182, 183, and 184. The combinations shown as B-1 through B-8 enables to work the optical system shown in FIG. 22.

If the optical add/drop multiplexing device 187 is eliminated from the optical multiplexer 180, it can act as a simple relay amplifier. In such a case, single stage optical amplifier may substitute for the optical amplifiers 189a and 189b. The optical switches 192c and 192d are also eliminated for the simple relay amplifier.

The 18$^{th}$ Embodiment

FIG. 24 shows an optical relay amplifier 210 as a 18$^{th}$ embodiment of the present invention. The optical relay amplifier comprises two input/output ports 211, 212, wavelength division multiplexers 213, 214, 215, 216, optical switches 217, 218, 219, 220, optical amplifiers 221, 222, and 223. The reference number 223 showing as solid arrow in the FIG. 24 denotes an optical signal of wavelength λ1.

An optical signal 224 of wavelength λ1 which is shown as dashed arrow is inputted from the 1$^{st}$ input/output port 211, and outputted to the 2$^{nd}$ input/output port 212 through the wavelength division multiplexer 213, the optical switch 217, the optical amplifier 221, the optical switch 218, the wavelength division multiplexer 214. The optical switches 217 and 218 select the optical amplifier 221 in normal case.

The optical switch 217 has a 1×2 configuration. A common port of the optical switch 217 is connected to the wavelength division multiplexer 213. The rest of two ports of the optical switch 217 are connected to an input port of the optical amplifier 221 and the wavelength division multiplexer 215, respectively.

The optical switch 218 has a 1×2 configuration. A common port of the optical switch 218 is connected to the wavelength division multiplexer 214. The rest of two ports of the optical switch 218 are connected to an output port of the optical amplifier 221 and the wavelength division multiplexer 216, respectively. An optical signal 223 of wavelength λ2 which is shown as dashed arrow is inputted from the 2$^{nd}$ port 212 and outputted to the 1$^{st}$ port 211 through the wavelength division multiplexer 214, the optical switch 220, the optical amplifier 222, the optical switch 219, and the wavelength division multiplexer 213. The optical switches 219 and 220 select the optical amplifier 222 in normal case.

The optical switch 219 has a 1×2 configuration. A common port of the optical switch 219 is connected to the wavelength division multiplexer 213. The rest of two ports of the optical switch 219 are connected to an input port of the optical amplifier 222 and the wavelength division multiplexer 215, respectively.

The optical switch 220 has a 1×2 configuration. A common port of the optical switch 220 is connected to the wavelength division multiplexer 214. The rest of two ports of the optical switch 229 are connected to an output port of the optical amplifier 222 and the wavelength division multiplexer 216, respectively.

The optical amplifier 223 is for a back up use. When the optical amplifier 221 fails the optical switches 219 and 220 select the wavelength division multiplexers 215 and 216. Then the optical signal 224 is amplifier through the optical switch 217, the wavelength division multiplexer 215, the optical amplifier 223, the wavelength division multiplexer 216, and the optical switch 218.

When the optical amplifier 222 fails the optical switches 219 and 220 select the wavelength division multiplexers 215 and 216. Then the optical signal 223 is amplified through the optical switch 220, the wavelength division multiplexer 216, the optical amplifier 223, the wavelength division multiplexer 215, and the optical switch 219.

Accordingly, one the single optical amplifier 223 acts as back up for both of the optical amplifier 221 and 222. A typical redundant configuration requires a back up optical amplifier for each optical amplifier 221 or 222. As a result, total two optical amplifiers are required. In contrast, this configuration requires only one back up optical amplifier.

According to the present embodiment, if the simultaneous failure of both of the optical amplifiers 221 and 222 happens, the optical amplifier 223 can do back up operation. However, in such a circumstance, an optical power per channel reduced to half due to channel numbers to be amplified doubles. Because saturation output power of the optical amplifier 223 is constant.

Optical switches may substitute for the wavelength division multiplexers 215 and 216. Appropriate control of the optical switches enables back up operation for failure of the optical amplifier 221 or 222. However, in this configuration, the optical amplifier 223 cannot back up if the both of the optical amplifiers 221 and 222 fail simultaneously. In addition, the optical switch is more costly and less reliability due to its moving parts.

The 19$^{th}$ Embodiment

Figure 25:
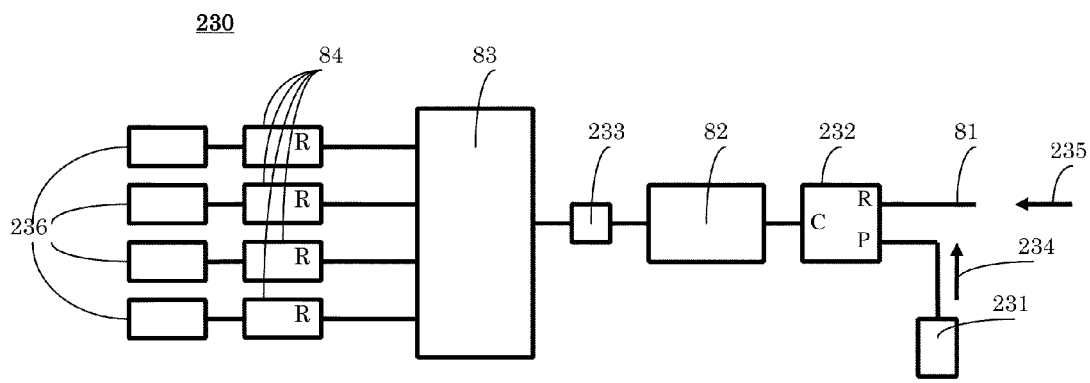
FIG. 25 is a schematic diagram of the 19th embodiment of the optical receiver 230.

FIG. 25 shows an optical receiver device 230 as a 19$^{th}$ embodiment of the present invention. This embodiment is derivative of the 8$^{th}$ embodiment. For the same components shown in FIG. 10, the same reference numbers are assigned. The major difference between the present embodiment and the 8$^{th}$ embodiment is that the present embodiment further comprises a dummy signal light source 231, a dummy signal light mixing means 232, and a dummy signal light elimination means 233. The present embodiment further comprises FEC (Forward Error Correction) decoder 236 with each optical receiver 84.

The wavelength of a dummy signal light 234 from the dummy signal light source 231 is different from the wavelength of an optical signal 235. The dummy signal light 234 are mixed with the optical signal 235 by the dummy signal light mixing means 232. The mixed signal lights are fed to the optical amplifier 82. The dummy signal light 234 is eliminated form the output of the optical amplifier 82 by the dummy signal light elimination means 233. The dummy signal light elimination means 233 may be omitted if the wavelength division multiplexer 82 has enough capability to eliminate the dummy signal light.

If a C-band EDFA is adopted as the optical amplifier 82, one of CWDM grids, 1570 nm, light source is applicable as the dummy signal light source 231. If a L-band EDFA is adopted as the optical amplifier 82, one of CWDM grids, 1550 nm, light source is applicable as the dummy signal light source 231. Another wavelength chosen from CWDM grids is also applicable. The wavelength of the dummy signal light should be chosen as an outside wavelength region against the optical signal light wavelength region.

As the dummy signal light mixing means 232 and the dummy signal light elimination means 233, dielectric thin film filters are applicable. The dummy signal light mixing means 232 preferably adopts three-port type filter device. The dielectric thin film filter three-port device comprises a common port, a reflection port, and a pass port. An insertion loss between the reflection port and the common port is smaller so that the optical signal 235 is preferably inputted to the reflection port. The common port is preferably connected to the optical amplifier 82. And the dummy signal light source 231 is preferably connected to the pass port of the dielectric thin film filter three-port device.

Figure 26:
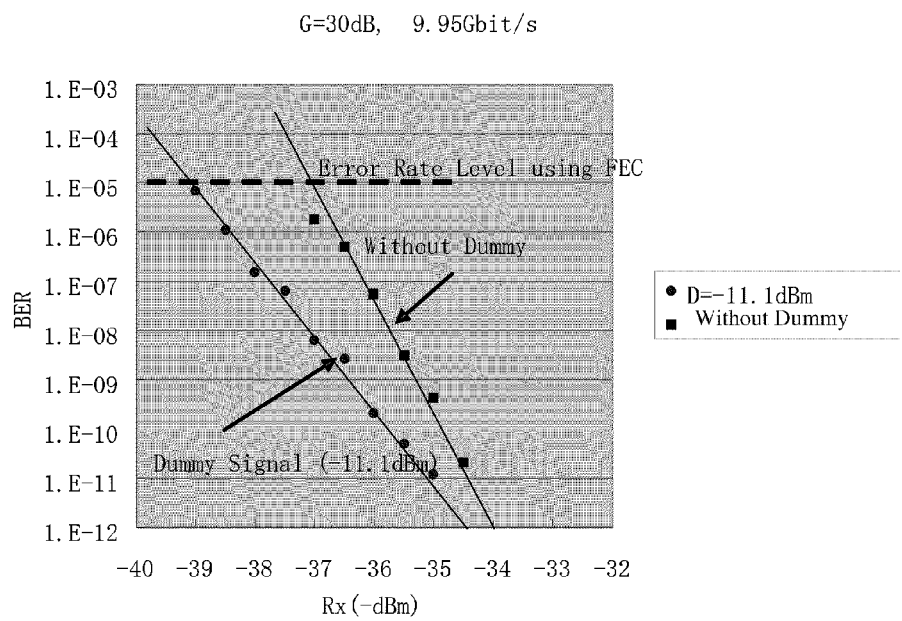
FIG. 26 shows the relation between received power and BER (Bit Error Rate) of the optical signal 235 received by the optical receiver 84.

FIG. 26 shows relationship between receiving power and bit error rate. An X-axis of the FIG. 26 denotes the optical power at the optical signal input port 8. The unit is dBm. The unit dBm is logarithm representation in which 1 mW is defined as 0 dBm. For example, −30 dBm represents 0.0001 mW (1 µW). A Y-axis of the FIG. 26 denotes the BER (Bit Error Rate) with logarithm representation. The optical signal for measurement is modulated at 9.95 Gbit/s with PRBS=$2^{23}$−1 pseudo random signal.

Figure 27:
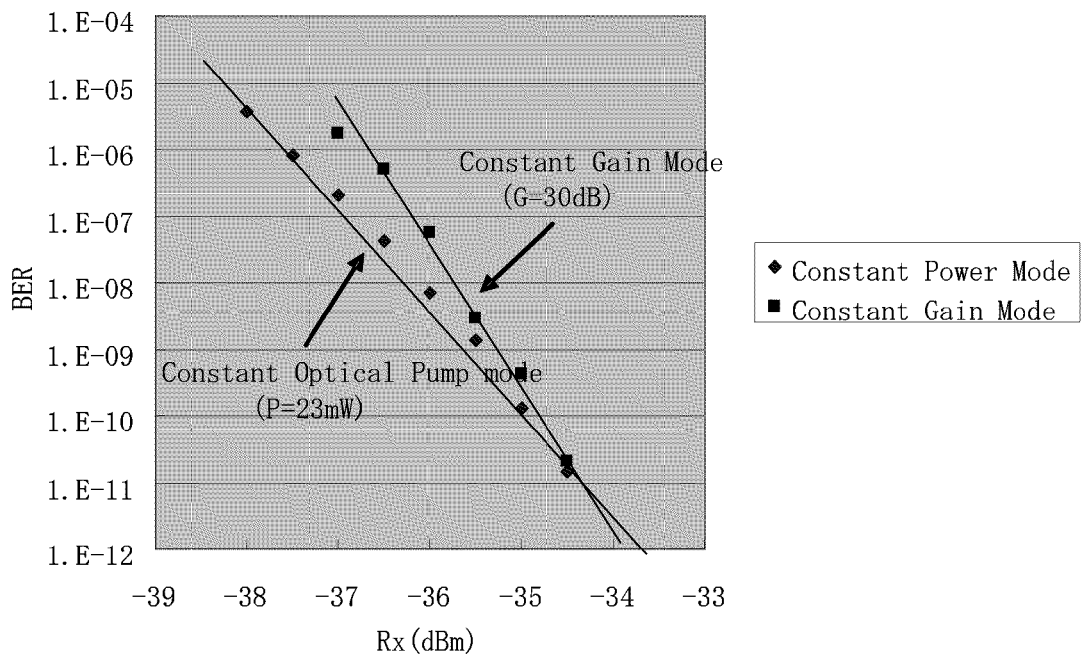
FIG. 27 shows BER performance of the optical amplifier 82 where the optical amplifier 82 is set as constant pump power mode (pump power=23 mW).

In FIG. 27 there are two lines. One of two lines is without the dummy signal light 234, and another is with the dummy signal light 234 of power of −11.1 dBm (0.078 mW). As shown in FIG. 27, the line with the dummy signal light 234 exists light region of this graph. This fact denotes that the higher sensitivity is obtained with the dummy signal light. The optical amplifier 82 is set at gain constant mode with 30 dB.

As shown in FIG. 26, the sensitivity without the dummy signal light 234 is −34 dBm (BER $10^{-12}$). In contrast, the sensitivity with the dummy signal light 234 of −11.1 dBm is −34.5 dBm. If sensitivities are defined at BER of $10^{-5}$, he sensitivity without the dummy signal light 234 is −37.0 dBm. In contrast, the sensitivity with the dummy signal light 234 of −11.1 dBm is −39.0 dBm (BER $10^{-5}$).

A FEC (Forward Error Correction) technology can reduce original BER of $10^{-5}$ to $10^{-15}$ after the correction. Thus the sensitivities defined at BER of $10^{-5}$ are rational where FECs are applied. As shown in FIG. 26, the line with dummy signal light 234 declines more and provide higher sensitivity at higher BER region. Thus the configuration comprises the dummy signal light and FEC is suited for high sensitivity receiver device.

In the cases of the $1^{st}$, $2^{nd}$, $3^{rd}$, $4^{th}$, $5^{th}$, $6^{th}$, and $7^{th}$ embodiments of the present invention, the transmission signal 7 act as the function of the dummy signal. Thus the receiver sensitivities with dummy signal are obtained by adjusting transmission signal level appropriately. The configurations the $1^{st}$, $2^{nd}$, $3^{rd}$, $4^{th}$, $5^{th}$, $6^{th}$, and $7^{th}$ embodiments further comprise FEC is advantageous to obtain higher receiver sensitivities. The 10G-PON OLT showing as the $13^{th}$ embodiment further comprises FEC is advantageous to obtain higher receiver sensitivity.

FIG. 27 shows BER performance of the optical amplifier 82 set at constant pump power mode (Pump power=23 mW). As a comparison, FIG. 27 also shows the BER performance of the optical amplifier 82 set at constant gain mode (Gain=30 dB). No dummy signal lights are added. As shown in FIG. 27, the line of constant pump power mode declines more. As a result, the sensitivity at $10^{-5}$ is much higher. The optical amplifier 82 with constant pump power mode further comprises FEC for receiver is advantageous to obtain higher sensitivity.

Figure 28:
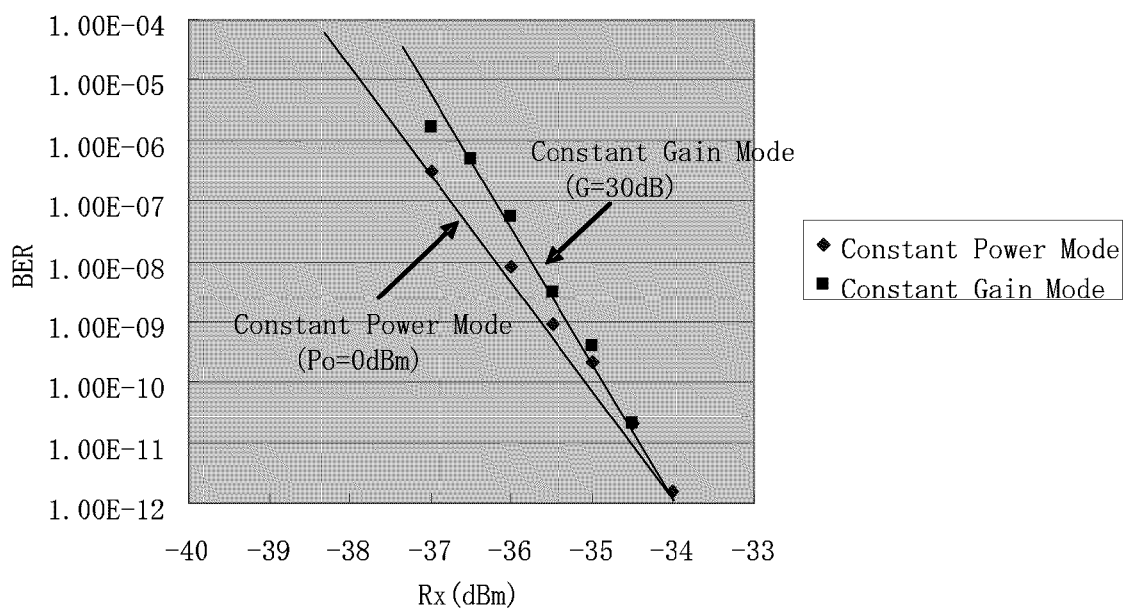
FIG. 28 shows BER performance of the optical amplifier 82 where the optical amplifier 82 is set as constant output power mode (Po=0 dBm).

FIG. 28 shows the BER performance of the optical amplifier 82 set at constant output power mode (Po=0 dBm). No dummy signal lights are added. As shown in FIG. 28, the line of constant output power mode declines more than constant gain mode. As a result, the sensitivity at $10^{-5}$ is much higher.

The optical amplifier 82 with constant output power mode further comprises FEC for receiver is advantageous to obtain higher sensitivity.

As the optical amplifier 82, a C-band EDFA is applied at the present embodiment. Any type of optical amplifier may be adopted. L-band EDFAs, Raman optical amplifiers, and Semiconductor optical amplifiers are applicable. The dummy light effect is valid for these types of optical amplifiers.

The $20^{th}$ Embodiment

Figure 29:
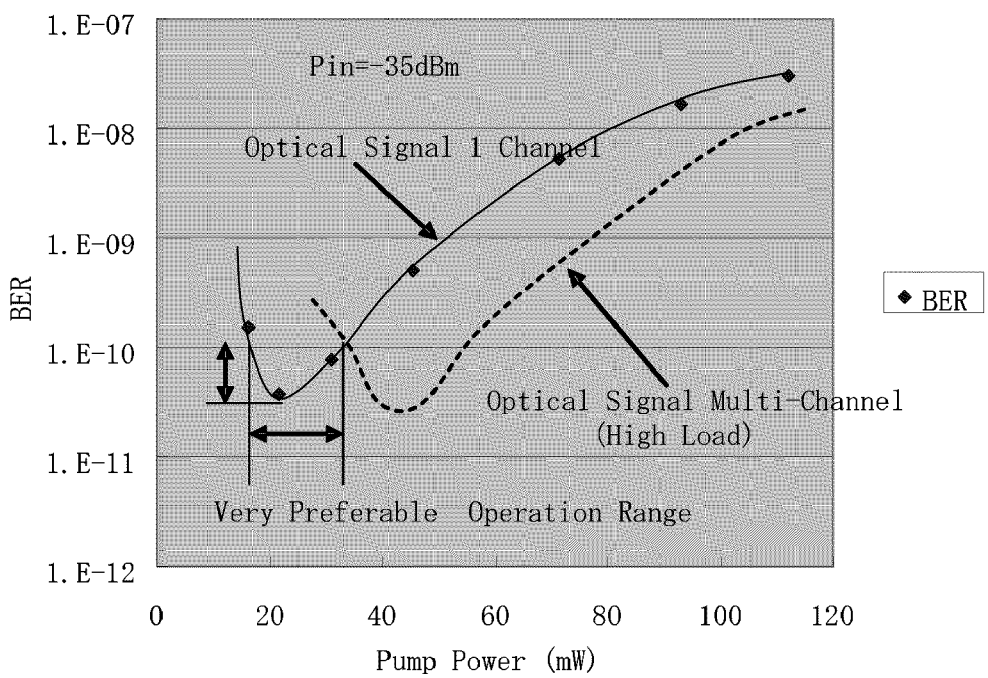
FIG. 29 shows BER performances versus pump power.
Figure 30:
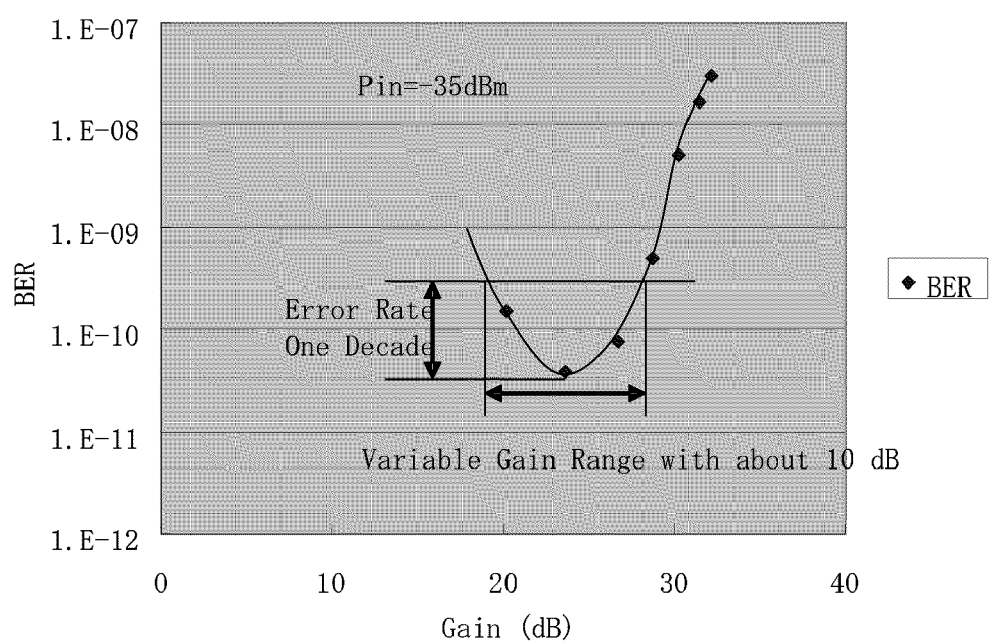
FIG. 30 shows BER performances versus gain (Conversion of FIG. 29).
Figure 31:
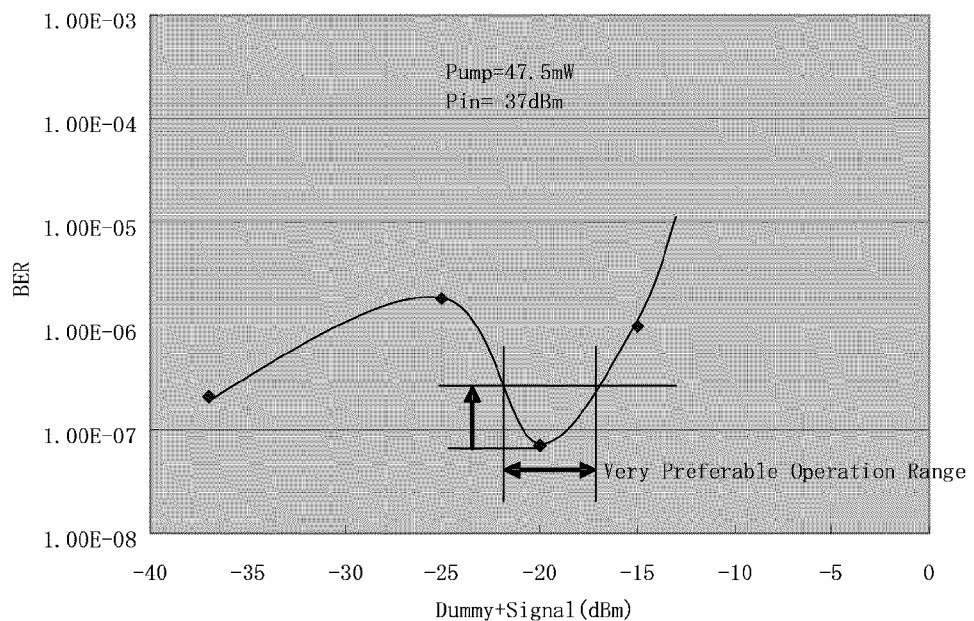
FIG. 31 shows BER performance versus dummy signal power.

FIG. 29, FIG. 30, and FIG. 31 show a method to set optical parameter for an optical amplifier a $20^{th}$ embodiment of the present invention. As described in the $19^{th}$ embodiment, the BER performance of the optical amplifier 82 depending on operation modes. The BER performance does not only depend on the operation modes but also depends on a variety of parameters such as gain, output power, intensity of the dummy signal light, and so on.

FIG. 29 shows BER performance of the optical receiver shown in FIG. 25 where the input optical signal set at −35 dBm and the pump power of the optical amplifier is changed. FIG. 29 exhibits the minimum BER at certain pump power (21.6 mW). The signal rate of the optical signal is 9.95 Gbit/s modulated with PRBS=223−1 pseudo random symbols. At the present embodiment, the signal data rate and modulation method follows this condition if there is no notice. In this case, the dummy optical light 234 is not applied.

It is practical that certain range of pump power is defined to achieve better receiving sensitivities. One of the ways is to constrain the pump power range within half decade degradation of the BER. According to FIG. 26, the BER increases 2 decades along with 1 dB decrease of the input optical signal. Thus, the receiving sensitivity degradation is less than 0.25 dB if the BER degradation is suppressed within half decade. The range defined as described above is shown in FIG. 29. This parameter setting method is suited to achieve the best receiving sensitivities.

Gains corresponding to the pump powers are easy to measure. Thus the FIG. 29 can be transformed into another type of graph which has an X-axis showing gain and a Y-axis showing BER. The transformed graph is shown as FIG. 30. There is a best value of gain which provides the best sensitivity.

The pump power range showing in FIG. 29, can achieves the best sensitivity; however the gain range is relatively narrow. FIG. 30 shows another gain range within one decade degradation of BER. This gain range is relatively wide of 10 dB, with small sensitivity penalty of 0.5 dB.

The gain of 23.6 dB which provides the best sensitivity in FIG. 30 is calculated from a measured value after narrow band filtration. As described in the $8^{th}$ embodiment, the ASE power without narrow band filter is 6 dB stronger than the optical signal. The output optical power monitor of the optical amplifier 82 detects summation of the ASE and the optical signal, therefore an error is brought. The gains which are set at 30 dB with constant gain mode showing in FIG. 26, FIG. 27, and FIG. 28 contain the errors.

Considering with 6 dB error due to ASE, the gain of 23.6 dB which provides the best sensitivity almost corresponds to apparent setting gain of 30 dB. Thus the gains which are set at 30 dB with constant gain mode showing in FIG. 26, FIG. 27, and FIG. 28 are composed from the best gain 23.6 dB and the ASE error 6 dB. The ASE error sometimes exceeds 10 dB depending on an operation condition of an optical amplifier.

FIG. 29 can explain the result of FIG. 27. As shown in FIG. 29, the error rate increase along with decrease of the pump power. In case of the constant gain mode, the pump power is decreased according to the decrease of the input optical power, therefore the error rate increases rapidly along with decrease of the input optical power. In contrast, constant pump power mode does not have such a situation, therefore the error rate increases slowly.

The ASE dominates the output power of the optical amplifier where the optical input signal decreases below certain value. Thus it is expected that the constant output power mode is equivalent to the constant pump power mode in such a condition. Therefore it is estimated that the BER performance shown in FIG. 28 is obtained.

The results shown in FIG. 28 also can explain the results of shown in FIG. 26. The graphs shown in FIG. 29 mean the receiving sensitivities vary according to the pump power, excitation status of the optical amplifier, and the load, intensity of the input optical signals. In the 19$^{th}$ embodiment, the load varies by applying the dummy optical signal. Due to this, the better receiver performances are obtained. The experimental results imply that the better sensitivities are obtained where the high pump power with heavy load.

The above results are based on single channel with optical input power of −35 dB. The BER properties with multi-channel signals are different from the single channel's one as shown in FIG. 29. They also depend on the input optical signal intensities.

The load condition of multi-channel can be simulated using the configuration shown in FIG. 25 with varying the intensity of the dummy optical signal 234. The level of the optical signal 234 is required to set certain value, for example, −35 dBm. If the dummy optical signal is set at −25 dBm, it is equivalent to apply 10 optical signals to the optical amplifier 82.

FIG. 31 shows relationship between BER and dummy signal light power. The X-axis of FIG. 31 denotes summation power of the dummy optical signal 234 and the optical signal 235. The Y-axis of FIG. 31 denotes BER of the optical signal 235. A pump power is fixed at 47.5 mW. A power of the optical signal 235 is fixed at −37 dBm. As shown in FIG. 31, the BER is minimized at −20 dBm of the dummy signal power. Load conditions within one decade degradation of BER against the best point are preferable. The load conditions within half decade degradation of BER against the best point are more preferable.

As described above, the BER measurement against pump power with given optical load to an optical amplifier provides the operation point which shows the lowest error rate. In other words, the measurement provides the operation point with the best sensitivity.

A gain and an output power at the pump power which provides the best sensitivity are easy to measure where no dummy signal is applied. Thus a setting gain for constant gain mode or a setting output power for constant output power mode is determined. The gain or the output power may have range within half decade degradation of BER for the most preferable operation. The gain or the output power may have range within a decade degradation of BER for preferable operation.

A gain and an output power at the pump power which provides the best sensitivity are easy to measure where certain dummy signal is applied. Thus a setting gain for a gain clamped optical amplifier described later is determined.

In the present embodiment, the best operation point is determined for the optical amplifier 82 as a C-band EDFA. The method to determine the best point which provides the best sensitivity is applicable for other types of optical amplifiers such as L-band EDFAs, Raman optical amplifiers, and Semiconductor optical amplifiers. The sensitivity dependence of excitation status and load is considered as general nature of optical amplifiers. In case of the semiconductor optical amplifier, for example, a driving current may be used instead of the pump power.

The 21$^{st}$ Embodiment

Figure 32:
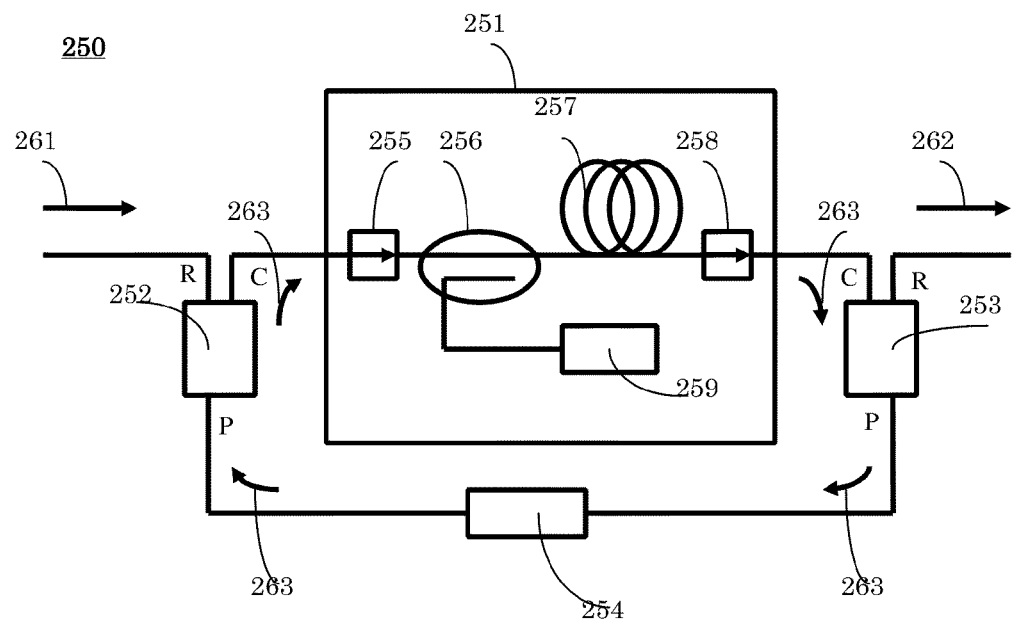
FIG. 32 is a schematic diagram of the 21$^{st}$ embodiment of the optical amplifier 250.

FIG. 32 shows an optical amplifier 250 as a 20$^{th}$ embodiment of the present invention. The optical amplifier 250 comprises dummy signal generating means to achieve good receiving sensitivity for pre-amplification. The optical amplifier 250 comprises an optical amplifier module 251, dielectric thin film filter three-port devices 252, 253, and an optical attenuator 254. The optical amplifier module 251 comprises an optical isolator 255, pump power combiner 256, an Erbium doped fiber, an optical isolator 258, and a pump light source 259.

Figure 33:
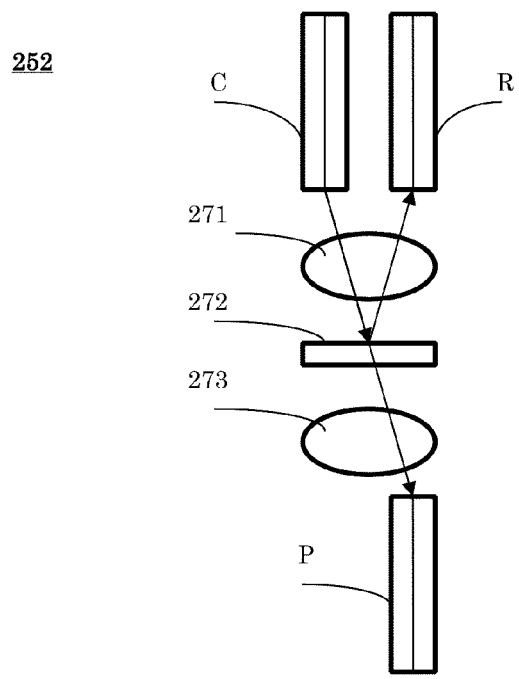
FIG. 33 is a schematic diagram showing structure of dielectric thin film three-port device 252.

FIG. 33 shows internal architecture of the three-port device 252. The three-port device 252 comprises a lens 271, a dielectric thin film filter 272, a lens 273, a common port (an optical fiber) C, a reflection port (an optical fiber) R, and a pass port (an optical fiber) P. A light of a specified wavelength from the common port C is directed to the pass port P through the lens 271 and the dielectric thin film filter 272. Other wavelengths are reflected by the dielectric thin film filter 272 and directed to the reflection port R. The dielectric thin film filter three-port device 253 has a same structure.

The dielectric thin film filter three-port device 252 shown in FIG. 33 has insertion losses as described below. An insertion loss from the common port C to the pass port P is between 0.6 dB and 0.8 dB. An insertion loss from the common port C to the reflection port R is between 0.2 dB and 0.3 dB. The insertion loss from the common port C to the reflection port R is smaller then the insertion loss from the common port C to the pass port P.

In FIG. 32, an input optical signal 261 is inputted to the optical amplifier module 251 through the reflection port and the common port of the dielectric thin film filter three-port device 252. The pass (specified) wavelength of the dielectric thin film filter three-port device 252 corresponds to a dummy optical signal 263 and is different from the input optical signal 261. An amplified optical signal is outputted from the optical amplifier module 251 as an output optical signal 262. The output optical signal 262 is outputted to the outside through the common port and the reflection port of the dielectric thin film filter three-port device 253. The pass (specified) wavelength of the dielectric thin film filter three-port device 253 corresponds to the ass (specified) wavelength of the dielectric thin film filter three-port device 252.

The dielectric thin film filter three-port devices 252 and 253 may adopt a wavelength chosen from L-band 100 GHz grids. The dielectric thin film filter three-port devices 252 and 253 pass single narrow band wavelength.

A closed loop is formed by the dielectric thin film filter three-port device 252, the optical amplifier module 251, the dielectric thin film filter three-port device 253, the optical attenuator 254. The closed loop generates the dummy optical signal 263 by oscillation. The specified wavelength is selected from ASE of the optical amplifier module 251 by the dielectric thin film filter three-port device 253, then directed to thin film filter three-port device 253 itself through the optical attenuator 254, the thin film filter three-port device 252, and the optical amplifier module 251. The selected wavelength circulates this closed loop with amplification, as a result the dummy optical signal 263 is generated.

On condition with a loop gain of the closed loop formed by the thin film filter three-port device 252, the optical amplifier module 251, the thin film filter three-port device 253, and the optical attenuator 254 is 1, the dummy optical signal 263 is generated. The power of the dummy optical signal 263 decreases where the power of the input optical signal 261 increases to maintain the loop gain at 1. The power of the dummy optical signal 263 increases where the power of the input optical signal 261 decreases to maintain the loop gain at 1.

As a result, the gain of the optical amplifier module 251 is clamped where the loop gain of the closed loop is 1. Thus the gain of the optical amplifier module 251 is almost equivalent to reciprocal number of the attenuation of the optical attenuator 254. In general, an optical amplifier with oscillator to maintain the gain is called as gain-clamped optical amplifier.

As the optical attenuator 254, both of a fixed type optical attenuator and variable optical attenuator (VOA) are available to adopt. Also electrically controllable variable optical attenuator (EVOA) is applicable. The gain of the optical amplifier 250 is controllable by using VOAs.

As a reference number 253, an optical fiber coupler may be adopted instead of the dielectric thin film filter three-port device. In such a configuration, the output optical signal 262 and the dummy optical signal 262 are mixed and inputted to the optical attenuator 254, however the dielectric thin film filter three-port device 252 filters the wavelength so that a behavior does not change in essential. The optical fiber is less expensive.

It is required to dispose an elimination means for the dummy optical signal 263 after the optical amplifier 250 where the optical fiber coupler is adopted as device specified as the reference number 253. As will become apparent below, the optical receiver 280 comprises, for example, a wavelength division multiplexer 83 which acts as the elimination means of the dummy optical signal.

Figure 34:
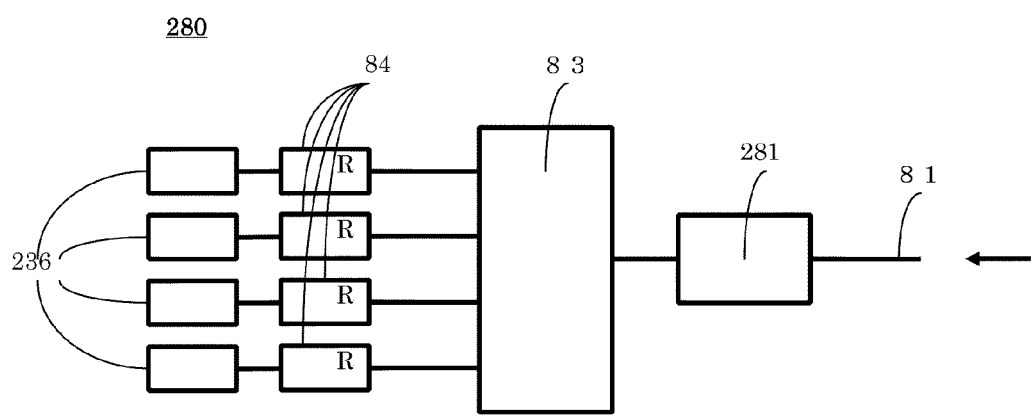
FIG. 34 is a schematic diagram showing structure of the optical receiver 280.

FIG. 34 shows an optical receiver 280. The optical receiver 280 is bases on the optical receiver 230 shown in FIG. 25, with replacing the dummy signal light source 231, dummy signal mixing means 232, the optical amplifier 82, and the dummy signal elimination means 232 to an gain-clamped optical amplifier 281. The optical receiver 280 comprises the gain-clamped optical amplifier 281, a wavelength division multiplexer 83, an optical transceiver 84, and FEC (Forward Error Correction) decoder. As the gain-clamped optical amplifier 281, the gain-clamped optical amplifier 250 shown in FIG. 32 may be adopted.

The optical receiver 280 adopts the gain-clamped optical amplifier 281 as a pre-amplifier so that the dummy signal is internally generated. As a result, load condition for the optical amplifier is adjustable to achieve the best receiving sensitivity. It has been described in the 20$^{th}$ embodiment that the excitation status and load of the optical amplifier influence the receiving sensitivity for pre-amplification.

As the gain-clamped optical amplifier 281, the optical amplifier 250 generates the dummy optical signal and feeds appropriate load to the optical amplifier module 251, thus the best receiving sensitivity is obtained. In contrast, the optical receiver 230 must further comprises control means for the power of the dummy signal 231.

The method to set optical parameter for an optical amplifier described in the 20$^{th}$ embodiment is applicable to the optical amplifier 250. The optical attenuator 254 is variable where the pump power of the optical amplifier module 251 and the input optical signal 261 are maintained constant, respectively. The gain of the optical amplifier 251 is variable by varying the optical attenuation of the optical attenuator 254. As a result, a graph in which X-axis denotes the gain and Y axis denotes BER is obtained. This graph corresponds to FIG. 30. It is more preferable that plural graphs depending on various pump power are drawn and determined the optimal operation condition.

In FIG. 34, the gain-clamped optical amplifier 250 is applied as the gain-clamped optical amplifier 281. Other types of gain-clamped optical amplifiers are applicable. The gain-clamped optical amplifier 250 comprises external ring-shaped optical circuit, whereas another type such as FBG based resonator is also applicable.

The 22$^{nd}$ Embodiment

Figure 35:
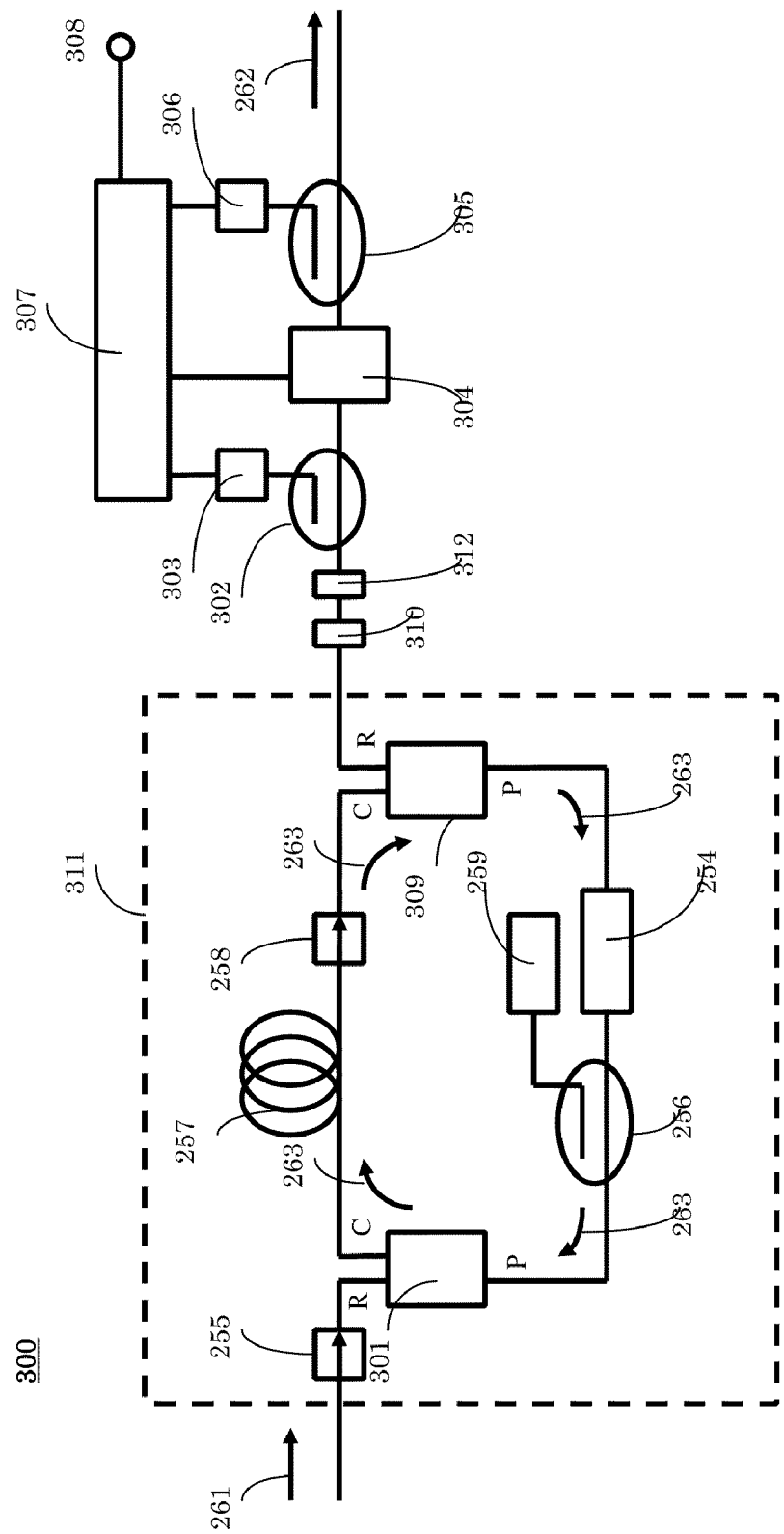
FIG. 35 is a schematic diagram of the 22$^{nd}$ embodiment of the optical amplifier 300.

FIG. 35 shows an optical amplifier 300 as a 22$^{nd}$ embodiment of the present invention. The gain-clamped optical amplifier 250 of the 22$^{nd}$ embodiment comprises the optical amplifier module 251 with the external optical circuit formed by the dielectric thin film filter three-port device 252, 253, and the optical attenuator 254. In contrast, the optical amplifier 300 comprises a dielectric thin film filter three-port device 301 between an optical isolator 255 and an Erbium doped fiber 257. The dielectric thin film filter three-port device is based on edge filter type which passes longer or shorter wavelengths against certain wavelength. A pump light combiner 256 is disposed between the optical attenuator 254 and the dielectric thin film filter three-port device 301.

The dielectric thin film filter 301 passes, for example, passes shorter wavelength than 1525 nm and reflects longer wavelengths than 1525 nm. Thus the dielectric thin film filter three-port device 301 passes pump lights for EDFA of wavelengths 980 nm or 1490 nm. Provided that a dielectric thin film filter three-port device 309 employs wavelength chosen from S-band (1460-1530 nm) DWDM grids, a dummy optical signal around 1520 nm may be produced. The dielectric thin film filter three-port device 309 narrow band pass filter.

As shown in FIG. 35, the dielectric thin film filter three-port device 301, the Erbium doped fiber 257, the optical isolator 258, the dielectric thin film filter three-port device 308, and the optical attenuator 254 form a closed loop which generates a dummy optical signal 263. The dummy optical signal 262 was chosen from L-band girds in the 21$^{st}$ embodiment, whereas it is chosen from the S-band grid in the present embodiment.

A pump light from a pump light source 259 is fed to the Erbium doped fiber through the pump light combiner 256, and the dielectric thin film fitter three-port device 301. The excited Erbium doped fiber amplifies an input optical signal 261 and outputs an output optical signal 262. At the same moment, the dummy optical signal is generated by the oscillation.

In the optical amplifier 250 shown in FIG. 32, the dielectric thin film three-port device 252, the optical isolator 255, and the pump light combiner 256 are disposed before the Erbium doped fiber 257. In the optical amplifier 300 shown in FIG. 34, whereas only the optical isolator 255 and the dielectric thin film three-port device 301 are disposed. Thus input optical signal is less attenuated due to elimination of the pump light combiner 256. Therefore the receiving sensitivity is improved.

The amplified optical signal is outputted as the output optical signal 262 through an optical signal filter 310, a gain flattening filter 312, a power monitor tap 302, a variable optical attenuator 304, and a power monitor tap 305. Power monitors 303 and 306 are disposed at the power monitor taps 302 and 305, respectively. The power monitors 303 and 306 are connected to a control mechanism 307. The optical attenuator 304 is connected to the control mechanism 307. A control port 308 is connected to the control mechanism 307 to communicate with outside.

The optical signal filter 310 eliminates the pump light and the dummy optical signal and only passes the optical signals to the power monitor tap 302. The gain flattening filter 312 makes the optical signals almost same intensity. The dielectric thin film filter three-port device 309 can eliminate the dummy signal until certain degree. Therefore the optical signal filter 310 may be omitted in some cases. Providing that the wavelengths of the optical signals are small enough, the gain flattening filter 312 may be omitted.

The power monitor 303 measures intensities of the amplified optical signals. The measurement results are transmitted to the control mechanism 307. Due to the gain-clamped optical amplifier 311 is maintained at certain constant gain, the intensity of the optical input signal 261 can be calculated from the measurement results of the power monitor 302. The control mechanism reports the calculated value of the input optical powers to outside through the control port 308. Conventional optical amplifiers employ both of input and output optical power monitors. However, in this conventional configuration, the tap of the optical power monitor losses input optical power, as a result, the receiving sensitivities degrade. In contrast the present embodiment utilizes output optical power to calculate input optical signal using the gain-clamped optical amplifier has a fixed gain. Thus the degradation of the receiving sensitivity is avoided.

The control mechanism 307 controls the optical attenuator 304 for varying output optical signal 261. The optical attenuator 304 controls the optical output power at targeted value using measurement data from the power monitor 307. As described previously, the condition which provides the best sensitivity is limited. Thus the gain control method to change pump power provides degradation of the receiving sensitivity. In present embodiment, therefore the operation condition of the gain-clamped optical amplifier 311 is fixed at the best point, and the output power control is done by the optical attenuator 304. The above configuration enables to avoid excess power input to optical transceivers with maintaining the best sensitivity.

A variable attenuator is applicable as the optical attenuator 254. The control mechanism 307 may have function to control the pump light source 259 and the optical attenuator 254. By adopting the above configuration, parameters of the gain-clamped optical amplifier 311 are controlled with flexibility.

The optical amplifier 300 is applicable for the gain-clamped optical amplifier 281 shown in FIG. 34. A post-amplifier type optical amplifier may be cascaded after the optical amplifier 300. The post amplifier may be both of the standard optical amplifier or the gain-clamped optical amplifier. The optical amplifier 300 is suited for optical pre-amplifier.

The 23$^{rd}$ Embodiment

Figure 36:
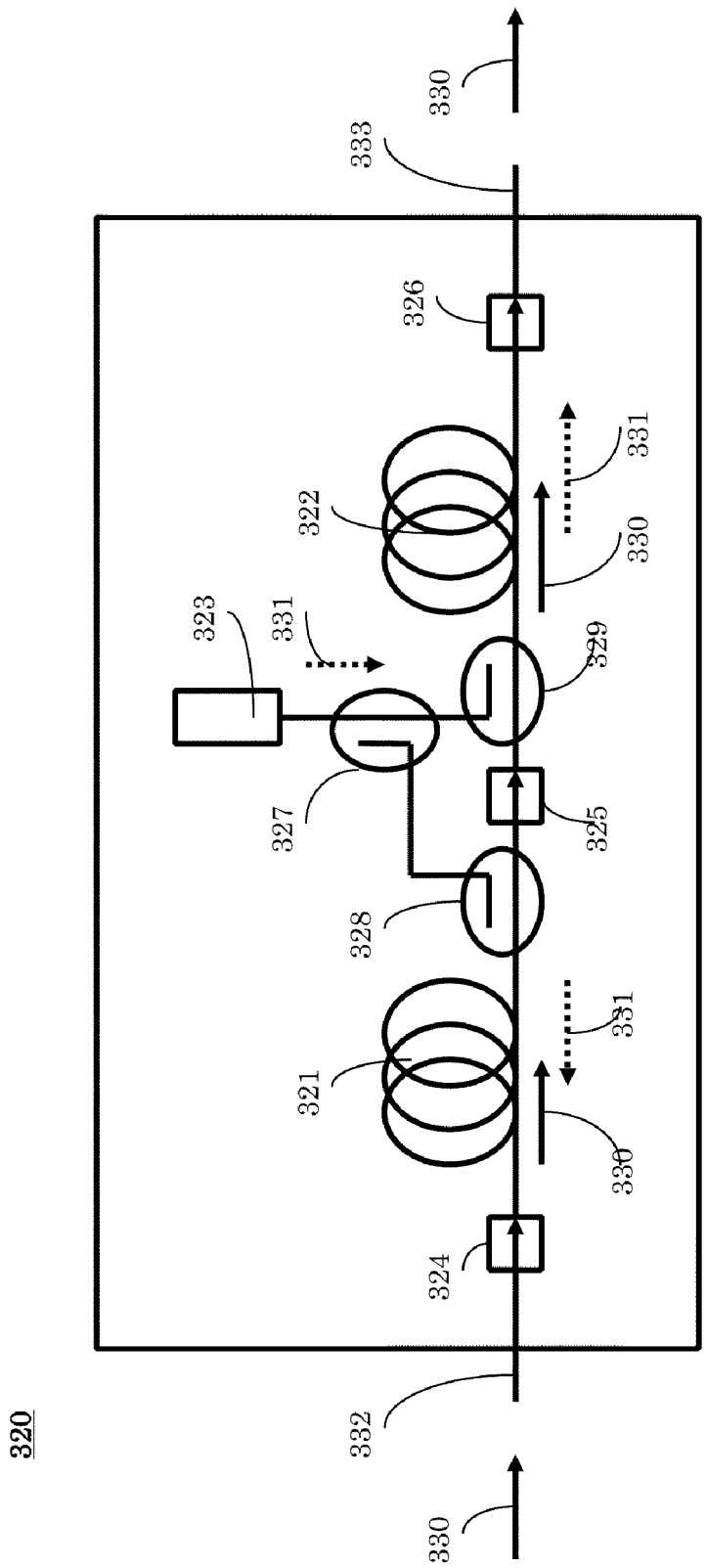
FIG. 36 is a schematic diagram of the 23$^{rd}$ embodiment of the optical amplifier 320.

FIG. 36 shows an optical amplifier 320 as a 23$^{rd}$ embodiment of the present invention. The optical amplifier 320 comprises Erbium doped fibers 321, 322, a pump light source 323, an optical isolators 324, 325, 326, an optical fiber coupler 327, a WDM type optical fiber couplers 328, and 328. The optical amplifier 320 comprises an input port 332, and an output port 333.

An optical signal 330 is shown as a solid arrow in FIG. 36. A pump light 331 is shown as a dashed arrow in FIG. 36. The pump light 333 is branched at the optical fiber 327, fed to the Erbium doped fiber 321 through the WDM fiber coupler 328. Another pump light branched at the optical fiber 327 is fed to the Erbium doped fiber 322 through the WDM fiber coupler 329.

In the Erbium doped fiber 321, directions of the optical signal 330 and the pump light 331 are opposite each another. In contrast, in the Erbium doped fiber coupler 322, directions of the optical signal 330 and the pump light 331 are same.

The optical isolator 324 is disposed between the input port 322 and the Erbium doped fiber 321. The optical isolator 325 is disposed between the WDM fiber couplers 328 and 329. The optical isolator 326 is disposed the Erbium doped fiber 322 and the output port 333.

The EDFA (Erbium Doped Fiber Amplifier) in which a pump light and an optical signal propagate same direction is called as a forward pumping type EDFA. The EDFA in which a pump light and an optical signal propagate opposite directions is called as a backward pumping type EDFA. In general, the forward pumping EDFA has lower NF (Noise Figure). The pump light intensity is strong at region near input port so that gain per unit length of fiber is higher in the forward pumping. In contrast, in case of the backward pumping, the pump light decays until reaching to the region near input port. As a result, the NF is relatively high due to small gain per unit length of fiber. On the other hand, in case of forward pumping, a pump combiner such as WDM fiber coupler is disposed in front of the optical amplifier to combine the pump light to the Erbium doped fiber. As a result, the insertion loss of the pump combiner degrades the NF.

In the optical amplifier 320 shown in FIG. 36, the Erbium doped fiber 321 is pumped by backward pumping. Due to low Erbium concentration of the Erbium doped fiber 321, decay of pump light is avoided. In this configuration, the Erbium doped fiber 321 cannot provide large gain, therefore the Erbium doped fiber 322 is provided to achieve appropriate gain. The Erbium concentration of the Erbium doped fiber 322 is higher than the Erbium doped fiber 321. The above configuration avoids degrading NF due to pump combiner disposed at input region of the optical amplifier. At the same moment, NF degrading due to the backward pumping is also avoided.

The concentration of the Erbium doped fiber 321 is between 0.5 dB/m and 2.0 dB/m as converted to peak absorption ratio at 1530 nm. The value of 1.0 dB/m±0.3 dB/m is preferable. The length of the Erbium doped fiber 321 is between 10 m and 30 m. The concentration of the Erbium doped fiber 322 is preferably between 2.2 dB/m and 4.5 dB/m as converted to peak absorption ratio at 1530 nm. The length of the Erbium doped fiber 322 is preferably between 10 m and 30 m. The wavelength of the pump light source 323 is preferably 980 nm.

As another configuration of the optical amplifier 320 shown in FIG. 36, the Erbium doped fiber 321 is shorten to avoid degrading of NF due to the pump combiner or the backward pumping. The concentration of the Erbium doped fiber 321 is between 2.2 B/m and 4.5 dB/m as converted to peak absorption ratio at 1530 nm with the length of the Erbium doped fiber 321 is between 2 m and 10 m. The length between 3 m and 7 m is more preferable. The length of the Erbium doped fiber 322 is preferably between 10 m and 30 m. The concentration of the Erbium doped fiber 322 is preferably between 2.2 dB/m and 4.5 dB/m as converted to peak absorption ratio at 1530 nm.

The optical amplifier 320 is suited for optical pre-amplifier. The optical amplifier 320 is applicable for the optical amplifier 82 of the optical receiver device 80 shown in FIG. 10, the optical amplifier 82 of the optical receiver device 230 shown in FIG. 25, and the optical amplifier module 251 of the gain-clamped optical amplifier 250 shown in FIG. 32.

Figure 37:
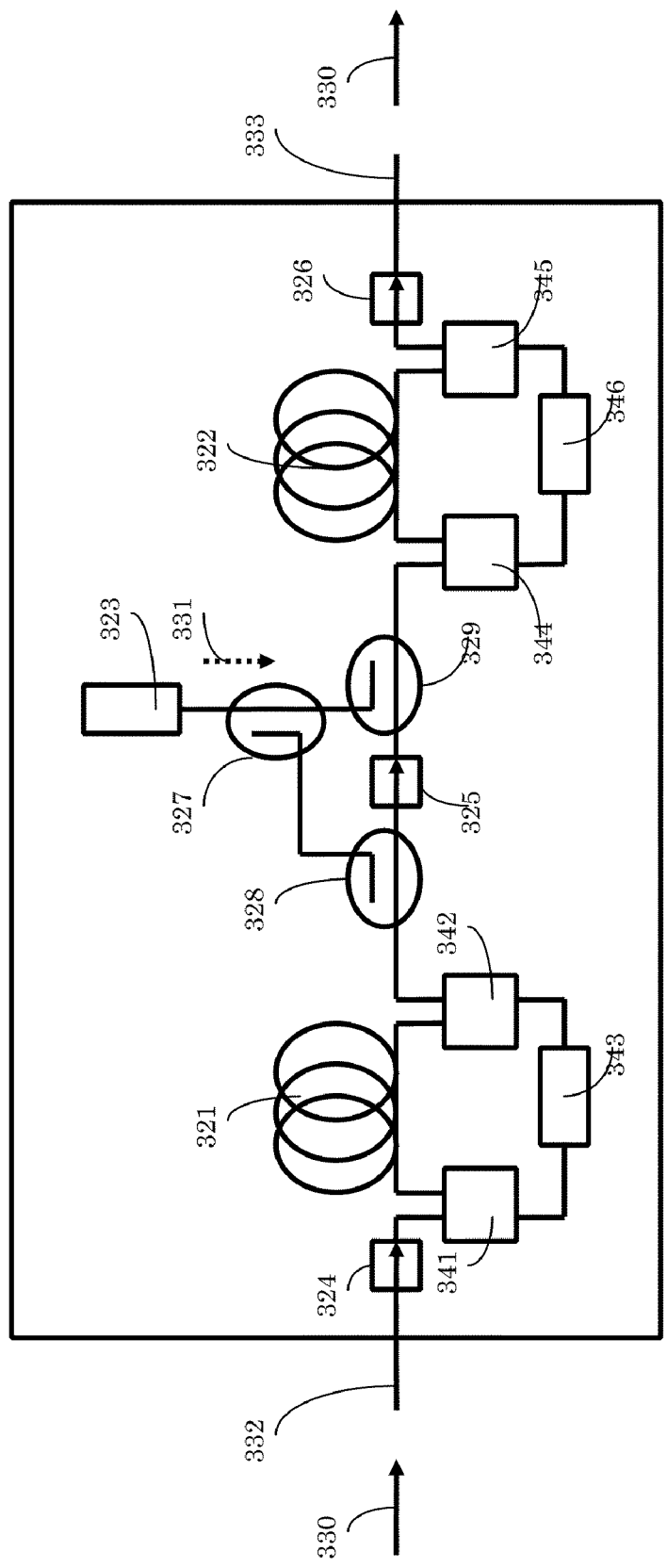
FIG. 37 is as schematic diagram showing structure of the optical amplifier 340 which is a derivation of the optical amplifier 320.

FIG. 37 shows the optical amplifier 340 which is derivative of the optical amplifier 320. A dielectric thin film filters three-port device 341 is disposed between Erbium doped fiber 321 and the optical isolator 324. A dielectric thin film filters three-port device 342 is disposed between Erbium doped fiber 321 and the WDM optical fiber coupler 328. An optical attenuator 343 is disposed between the dielectric thin film filter three-port device 341 and 342. The Erbium doped fiber 321, the dielectric thin film filters three-port device 341, 342, and the optical attenuator 343 forms a closed loop. The closed loop provides the gain clamping described previously.

A dielectric thin film filters three-port device 344 is disposed between the Erbium doped fiber 322 and the WDM fiber coupler 329. A dielectric thin film filters three-port device 345 is disposed between the Erbium doped fiber 322 and the optical isolator 326. An optical attenuator 346 is disposed between the dielectric thin film filters three-port devices 344 and 345. The Erbium doped fiber 322, the dielectric thin film filters three-port device 344, 345, and the optical attenuator 346 forms a closed loop. The closed loop provides the gain clamping described previously.

The optical amplifier 340 is based on two-stage optical amplifier. Both of first and second stages optical amplifiers are gain-clamped. Thus receiving sensitivity is maintained at good condition against change of the input power intensity or channel number.

The 24$^{th}$ Embodiment

Figure 38:
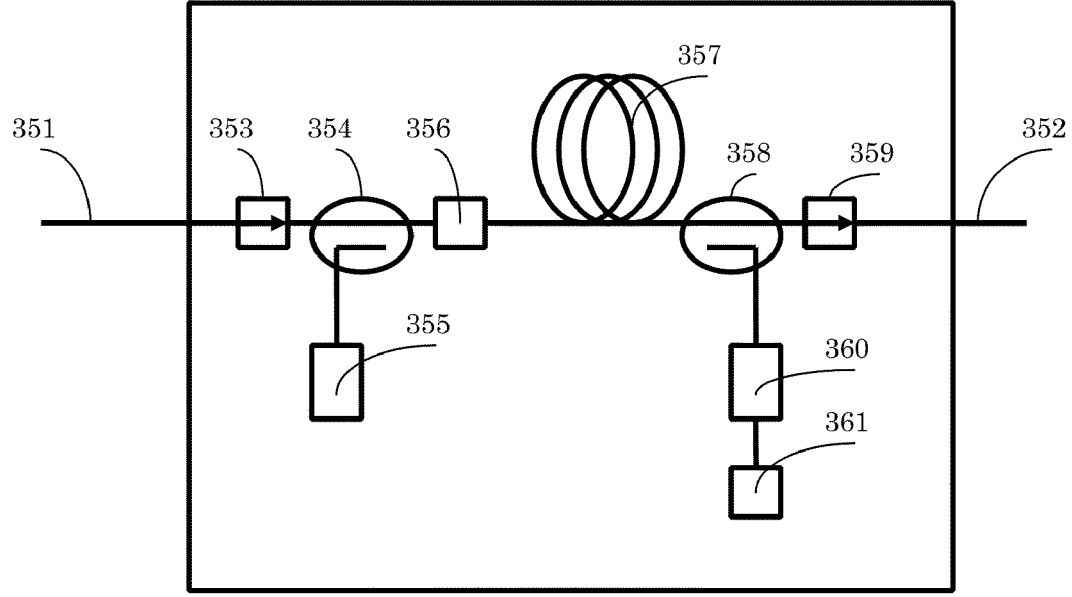
FIG. 38 is a schematic diagram of the 24$^{th}$ embodiment of the optical amplifier 370.

FIG. 38 shows an optical amplifier 370 as a 24$^{th}$ embodiment of the present invention. In this embodiment, a FBG (Fiber Bragg Grating) is adopted to realize the gain clamping.

The optical amplifier 370 comprises an optical isolator 353, WDM optical fiber coupler, a pump light source 355, a FBG 356, an Erbium doped fiber 357, an optical fiber coupler 358, an optical isolator 359, an optical attenuator 360, and a FBG 361.

The pump light from the pump light source 255 is combined to the Erbium doped fiber 357 by the WDM optical fiber coupler 254. An optical input signal inputted from an input port 351 of the optical amplifier 370 is fed to the Erbium doped fiber 357 through the optical isolator 353, the WDM optical fiber coupler 254, and the FBG 356. The optical signal is amplified by the Erbium doped fiber 357 is outputted to an output port 352 through the optical fiber coupler 358 and the optical isolator 359.

The FBG 356 and 361 pass the optical signal and reflect certain wavelength for dummy signal. Thus an optical circuit which comprises the FBG 356, the Erbium doped fiber 357, the optical fiber coupler 358, the optical attenuator 360, and the FBG 361 forms an oscillation circuit. As a result the gain clamping is realized. In this embodiment, the dummy signal is branched by the optical fiber coupler 258. This provides loop gain control by the optical attenuator 360.

The 25$^{th}$ Embodiment

Figure 39:
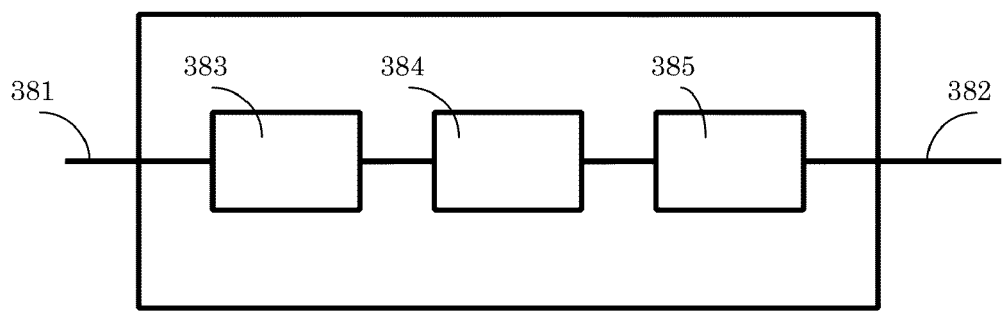
FIG. 39 is a schematic diagram of the 25$^{th}$ embodiment of the optical amplifier 380.

FIG. 39 shows an optical relay amplifier 380 as a 25$^{th}$ embodiment of the present invention. The optical amplifier 380 comprises an input port 381, an optical pre-amplifier 383, a filter 384, an optical post-amplifier 385, and an output port 382. An Inputted optical signal from the input port 381 is amplified by the optical pre-amplifier 383, filtered by the filter 384, amplified by the optical post-amplifier 385, and outputted to the output port 382.

The optical pre-amplifier 383 internally comprises a dummy signal generation means. As the dummy signal generation means, independent dummy signal source shown in the optical receiver device 230 shown in the 19$^{th}$ embodiment is applicable. Also the dummy signal oscillation mechanism of gain clamped optical amplifier described in the 21$^{st}$, 22$^{nd}$, 23$^{rd}$, and 24$^{th}$ embodiments are applicable.

As the optical pre-amplifier 383, the optical amplifier comprising dummy signal generation means is adopted; the receiving sensitivity of the optical relay amplifier 380 is improved. In addition, the sensitivities do not change against variation of channel number.

In case of single channel pre-amplification, the output power of the pre-amplifier is, as described previously, dominated by ASE. For example, the ASE and the optical signal powers are 0 dBm, and −10 dBm, respectively. If the ASE and optical signal are fed to the post-amplifier, the output power of the post-amplifier is also dominated by the ASE. Thus the filter 384 is disposed in the present embodiment to extract the optical signal. According to this configuration, the ASE is eliminated and the output power of the post-amplifier is dominated by the optical signal. This configuration is effective where the channel number is smaller.

The 26$^{th}$ Embodiment

Figure 40:
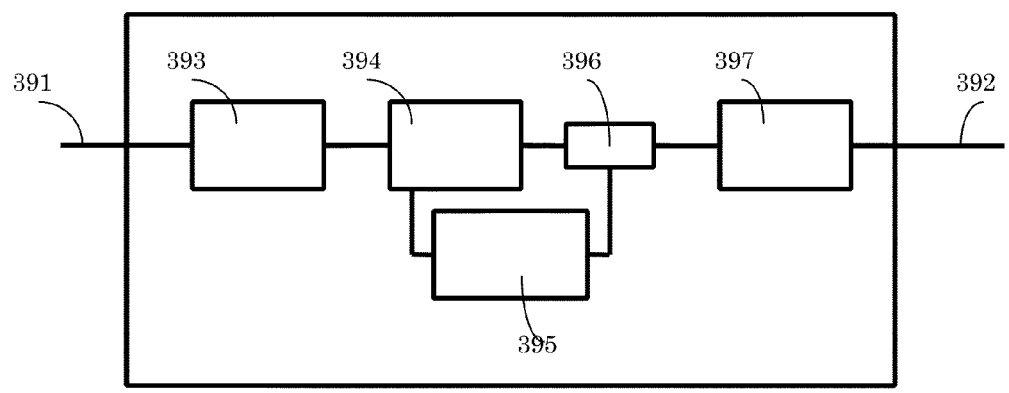
FIG. 40 is a schematic diagram of the 26$^{th}$ embodiment of the Reconfigurable Optical Add Drop Multiplexer (ROADM) 390.

FIG. 40 shows an reconfigurable optical add/drop multiplexer (ROADM) 390 as a 26$^{th}$ embodiment of the present invention. The optical add/drop multiplexer (ROADM) 390 comprises an input port 391, an optical pre-amplifier 383, a wavelength selection switch (WSS) 394, tunable line card 395, optical signal combining means 396, an optical post-amplifier 397, and an output port 392. In FIG. 40, the single tunable line card is shown, whereas plural tunable line cards may be disposed.

Plural optical signals of different wavelengths are inputted to the input port. The optical signals are amplified by the optical pre-amplifier 383, then fed to the output port 382 through the WSS 394, optical signal combining means 396, the optical post-amplifier 397. Certain wavelength of selected by the WSS 394 is fed to the line card 395. A transmission optical signal from the line card 395 is combined by the optical signal combining means 396, and then fed to the output port 392 through the optical post-amplifier 397. By using this configuration, the WSS 394 can select the wavelength to be added and dropped. As a result ROADM function is realized.

The optical pre-amplifier 393 comprises the dummy signal generating means. The dummy signal generating means may be independent dummy signal source as shown in the optical receiver device 230 of the 19$^{th}$ embodiment. The dummy signal generating means may be the gain-clamped optical amplifier shown as the 21$^{st}$, 22$^{nd}$, 23$^{rd}$, and 24$^{th}$ embodiments which comprises oscillator of the dummy signal.

The optical pre-amplifier 393 comprising the dummy signal generating means is adopted so that the sensitivity of the ROADM 390 is improved. Also sensitivity is maintained against channel number change.

The WSS 394 has a function to pass specific wavelength so that the WSS 394 can also act as filter as same as the filter 384 of the 25$^{th}$ embodiment. Thus the ASE of the optical pre-amplifier 393 is eliminated. As a result, the optical post-amplifier can be operated with high efficiency.

The 27$^{th}$ Embodiment

FIG. 41, FIG. 42, FIG. 43, FIG. 44, FIG. 45, and FIG. 46 show a method to set optical parameter for an optical amplifier as a 27th embodiment of the present invention. This embodiment is derivative of the method to set optical parameter described in the 20th embodiment.

In the 20th embodiment, the bit error rate (BER) is measured where the receiving optical signal power is fixed. The graph whose X-axis and Y-axis denote pump power and BER respectively is drawn to set the optical parameters. In contrast, the method of the present embodiment measures BER performance against each fixed pump power. Sensitivities determined at certain error rate such as $10^{-12}$ are calculated. Then a graph whose X-axis and Y-axis denote pump power and the receiving sensitivities are drawn to set the optical parameters.

The method of the present embodiment provides finer parameter setting. However there is disadvantage that the measurements take more effort. Thus the method for parameter setting in the present embodiment is suited for design status of the optical amplifiers. In contrast, the method described in the 20th embodiment is suited for production status to adjust individual products.

Figure 41:
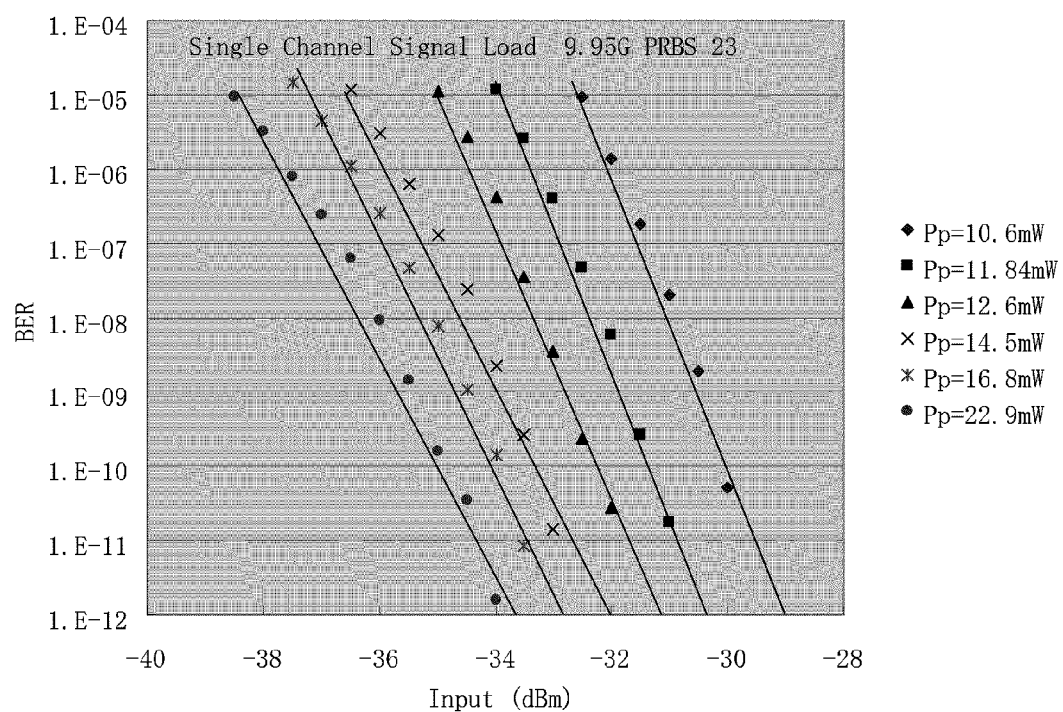
FIG. 41 shows BER curves against various pump powers among 10.6 mW and 22.9 mW.
Figure 42:
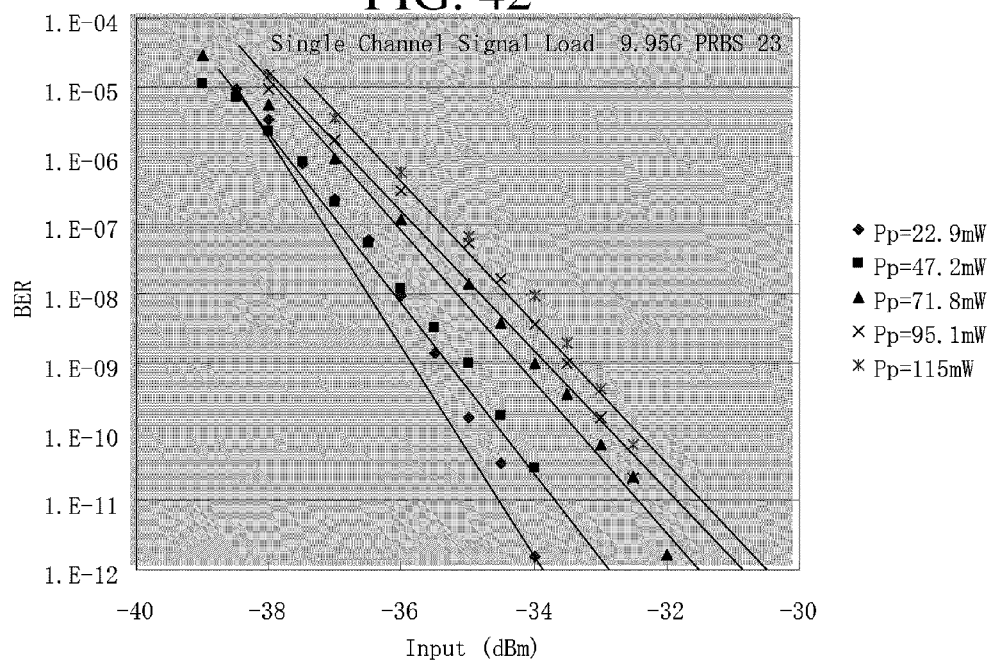
FIG. 42 shows BER curves against various pump powers among 22.9 mW and 115 mW.

BER curves measured by varying the optical signal 234 of the optical receiver device of FIG. 25 are shown in FIG. 41 and FIG. 42. No dummy signal 234 is applied. The optical amplifier 82 is operated at constant pump power mode. FIG. 41 shows the BER curves of pump powers among 0.6 mW and 22.0 mW. FIG. 42 shows the BER curves of pump powers among 22.9 mW and 115 mW. The receiving sensitivities defined at $10^{-12}$ are obtained from FIG. 41 and FIG. 42. Data rate of the optical signal is 9.95 Gbit/s with a PRBS=$2^{23}$–1 pseudo random symbol.

Figure 43:
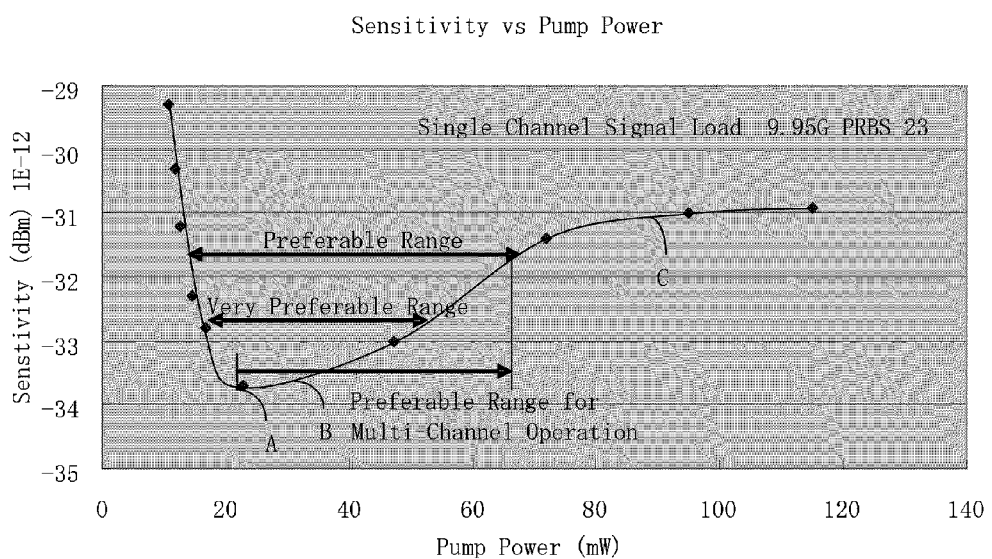
FIG. 43 shows receiver sensitivity (defined at BER=10$^{-12}$) versus pump power.

FIG. 43 is a graph whose X-axis and Y-axis are pump power and sensitivity (BER: $10^{-12}$), respectively. The sensitivity is a function of pump power which shows optimal point against certain pump power. The optical amplifier 82 is preferably set at within 2 dB from the optimal sensitivity shown in FIG. 43. By using this region, pump power can be varied relatively wide range with maintaining relatively good value. Thus the gain of the constant gain mode or the power of the constant power mode is able to chosen relatively wide range. The constant pump power mode is also available.

Another sensitivity defined at different BER is also available, in contrast to the above description using the sensitivity defined at $10^{-12}$. In case of FEC (Forward Error Correction), for example, it is more rational to utilize $10^{-5}$. Sensitivities may be defined according to the system design of optical transport systems.

Figure 44:
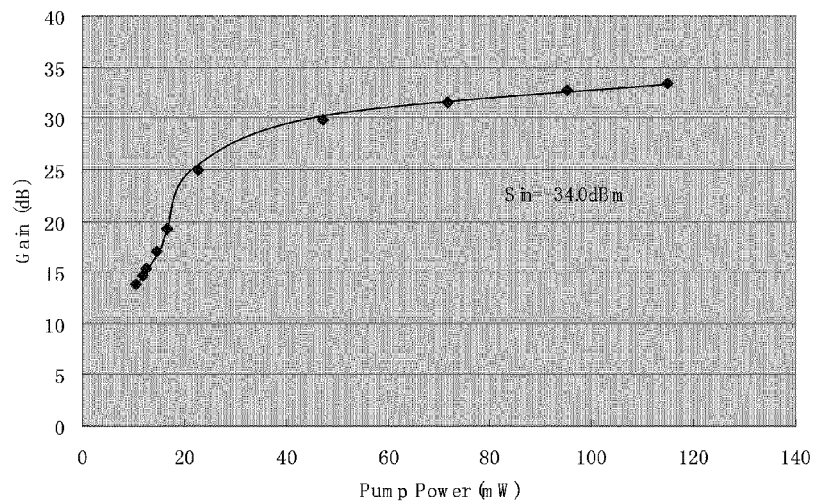
FIG. 44 shows small signal gain versus pump power.
Figure 45:
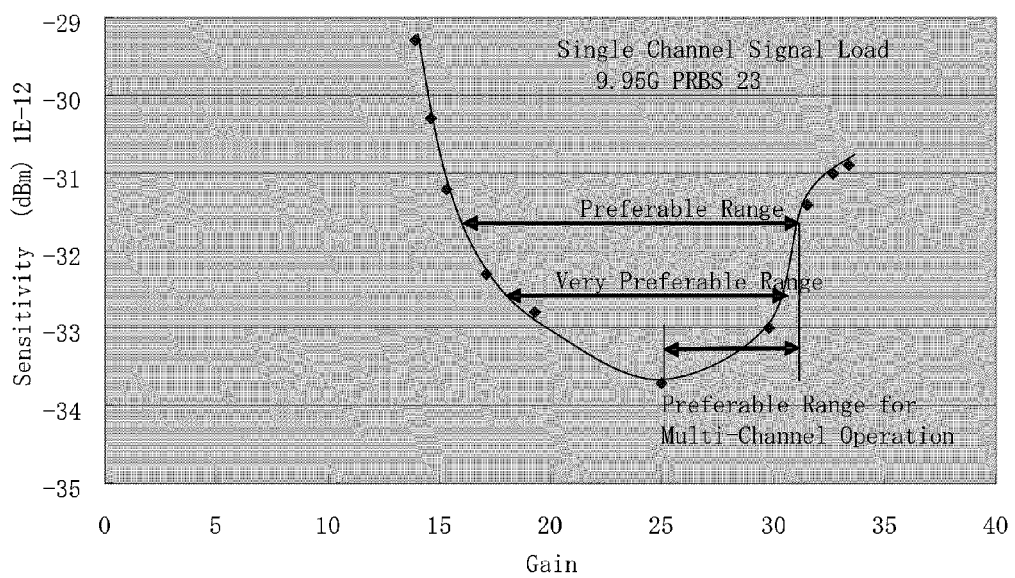
FIG. 45 shows receiver sensitivity (defined at BER=10$^{-12}$) versus small signal gain.

As described previously, small signal gains are measurable against each pump power. Thus the graph shown in FIG. 43 can be transformed into the graph with X-axis showing the gain. FIG. 44 is a graph whose X-axis and Y-axis are pump power and gain at input power of –34 dBm, respectively. By using the graph shown in FIG. 44, the graph whose X-axis and Y-axis are small signal gain and sensitivity is obtained as shown in FIG. 45.

The optical amplifier 82 is preferably set within 2 dB in sensitivity from optimal small signal gain. The optical amplifier 82 is more preferably set within 1 dB in sensitivity from optimal small signal gain. FIG. 45 is useful to parameter setting for the constant gain mode.

Figure 46:
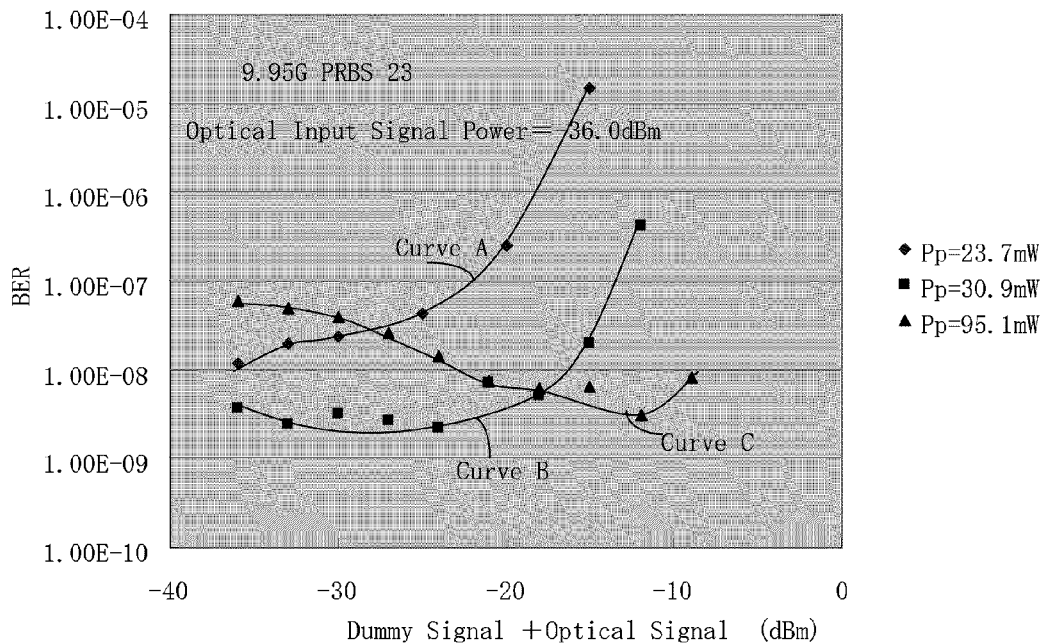
FIG. 46 shows BER performances versus total power of signal and dummy signal. BER curves of three different level of pump power are shown.

FIG. 46 shows BER performance against dummy optical signal 234 while the optical signal 235 is maintained at –36 dBm. An X-axis of the FIG. 46 denotes summation of the powers of the optical signal 235 and the dummy optical signal 234. A Y-axis of the FIG. 46 denotes BER of the amplified optical signal 235. Curves A, B, and C denote Pp=23.7 mW, Pp=30.9 mW, and Pp=95.1 mW, respectively.

As shown in FIG. 46, BER variations are different among the pump powers. In case of Pp=23.7 mW, the curve-A, BER increase along with dummy optical signal power. In case of the Pp=95.1 mw, the curve-C, BER contrary decrease along with dummy optical signal power. In case of the Pp=30.9 mW, the curve-B, BER is maintained against relatively wide range between –36 dBm and –20 dBm.

Corresponding operation conditions to the curves A, B, and C are plotted in FIG. 43 as reference character A, B, and C. In comparison between FIG. 43 and FIG. 46, The operation condition-A provides relatively high sensitivity whereas the sensitivity is easy to degrade against increase of the dummy signal power. The operation condition-B is stable against the variation of the dummy signal power. The operation condition-C shows high BER against light load while low BER against heavy load.

Thus it is preferred to choose slightly higher pump power than that shows best sensitivity in simultaneous amplification of plural wavelengths channels. In FIG. 43 and FIG. 46, the operation condition suited for multiple channels operation is shown. The operation condition suited for multiple channels operation is between the pump power which provides the best sensitivity and the pump power which is higher than 1 dB or 2 dB than the pump power of the best sensitivity.

The above method for setting the operation condition is applicable to the optical amplifier 82 shown in FIG. 10. The optical amplifier 82 may be set at the pump powers within the preferred range, the most preferred range, or the range suited for multiple channels operations show in FIG. 43.

Provided that the optical amplifier 82 is operated at the constant pump power mode, the pump power is set within the ranges shown in FIG. 43. Provided that the optical amplifier 82 is operated at the constant gain mode, the gain may be set with in ranges shown in FIG. 45. It must be noted that ASE error must be corrected in the constant gain mode. Provided that the optical amplifier 82 is operated at the constant output power mode, the output power is calculated from pump power shown in FIG. 43.

An output power of an optical amplifier is dominated by the ASE while there is no optical input signal. Thus the pump power of the optical amplifier operating at the constant output power mode becomes maximum where the input power is zero. The setting output power is determined by measuring an output optical power where input optical signal is zero. In this circumstance, the pump power should be chosen from the ranged determined in FIG. 43.

Otherwise, certain input optical signal range such as between –34 dB and –10 dBm is pre-defined. Then set the pump power at the determined value, Pp=30 mw for example, from FIG. 43. An output power of the optical amplifier is measured where the minimum input power, –34 dBm, is applied. The measured output power is the value to be set for the constant output power mode The optical relay amplifier 380 shown in FIG. 39 comprises the optical pre-amplifier 383 with dummy signal generating means. Provided that a plane optical amplifier is adopted instead of the optical pre-amplifier 383, the above method is applicable for the plane optical amplifier.

The ROADM 390 shown in FIG. 40 comprises the optical pre-amplifier 393 with dummy signal generating means. Provided that a plane optical amplifier is adopted instead of the optical pre-amplifier 393, the above method is applicable for the plane optical amplifier.

The 28th Embodiment

FIG. 47, FIG. 48, FIG. 49, and FIG. 59 show a method to set optical parameter for an optical amplifier as a 28th embodiment of the present invention. This embodiment is derivative of the method to set optical parameter described in the 27$^{th}$ embodiment which is applicable for gain-clamped optical amplifiers.

Figure 47:
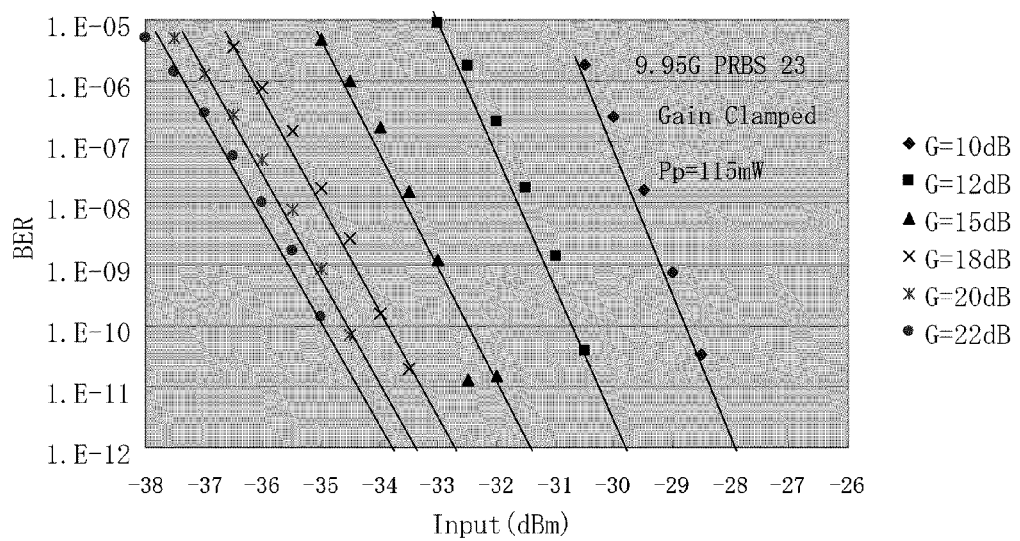
FIG. 47 shows BER performance versus input signal power where the gain clamped optical amplifier's gain is set among 10 dB and 22 dB.
Figure 48:
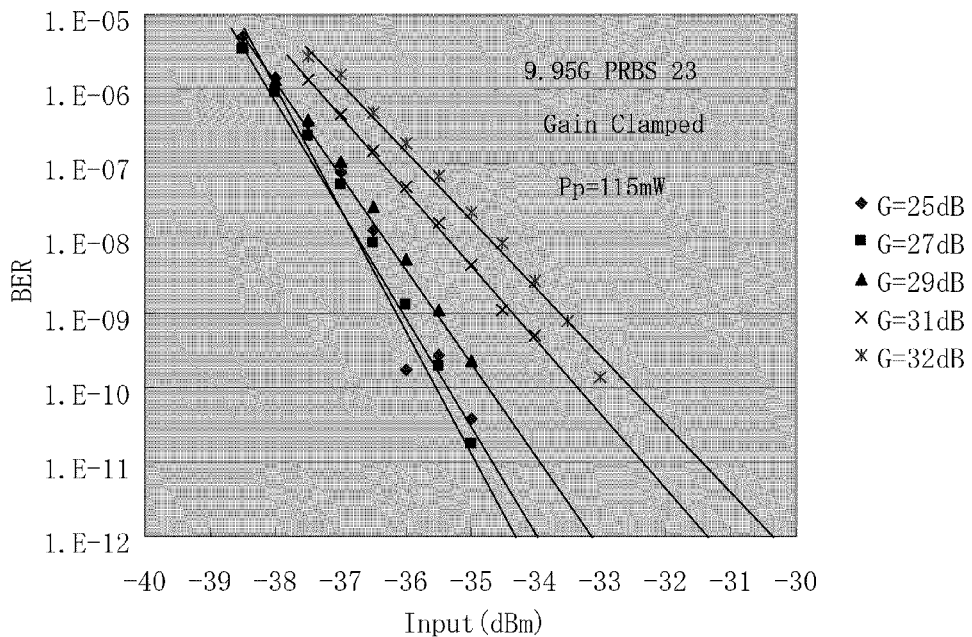
FIG. 48 shows BER performance versus input signal power where the gain clamped optical amplifier's gain is set among 25 dB and 32 dB.

FIG. 47 and FIG. 48 show BER performances measured on optical receiver device shown if FIG. 25 in which the gain-clamped optical amplifier 250 is applied instead of the optical amplifier 82. The pump power is fixed at 115 mW. The gain of the gain-clamped optical amplifier 250 is varied by the attenuation of the optical attenuator 254. FIG. 47 shows BER performances at gains G=10 dB, 12 dB, 15 dB, 18 dB, 20 dB, and 22 dB. FIG. 48 shows BER performances at gains G=25 dB, 27 dB, 29 dB, 31 dB, and 32 dB. No dummy signal is applied. Only the optical signal 235 is applied.

Figure 49:
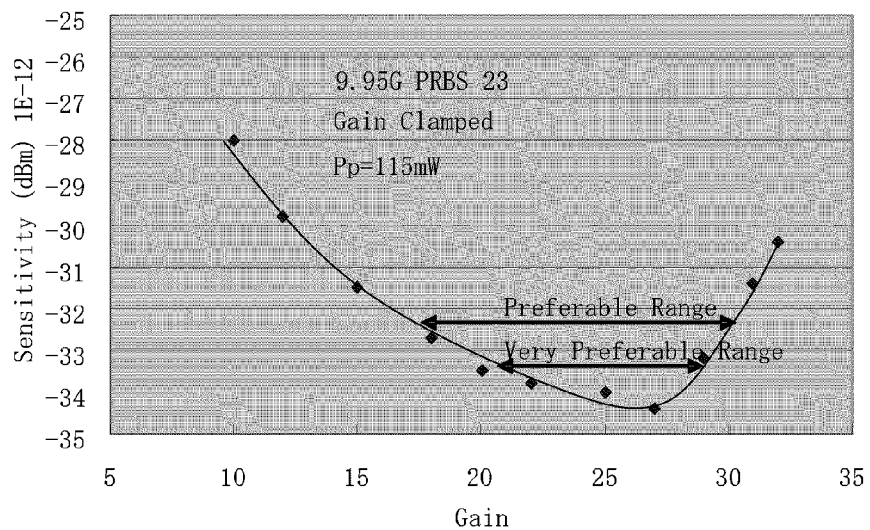
FIG. 49 shows receiving sensitivity versus small signal gain of the gain clamped optical amplifier.

According to FIG. 47 and FIG. 48, sensitivities defined at BER=$10^{-12}$ are obtained. FIG. 49 shows a graph whose X-axis and Y-axis are gain and sensitivity, respectively. As shown in FIG. 49, there is optimal value of gain which provides the best sensitivity. The value is around G=27 dB. The sensitivity depends on the pump power therefore the best sensitivity is also determined by drawing similar graph shown in FIG. 49 by varying the pump power.

The gain-clamped optical amplifier 250 is preferably set within a gain range shown in FIG. 42. The gain range avoids to degradation of sensitivity less than 2 dB against the best sensitivity. Another gain region in which sensitivity degradation is less than 1 dB, is more preferable.

Figure 50:
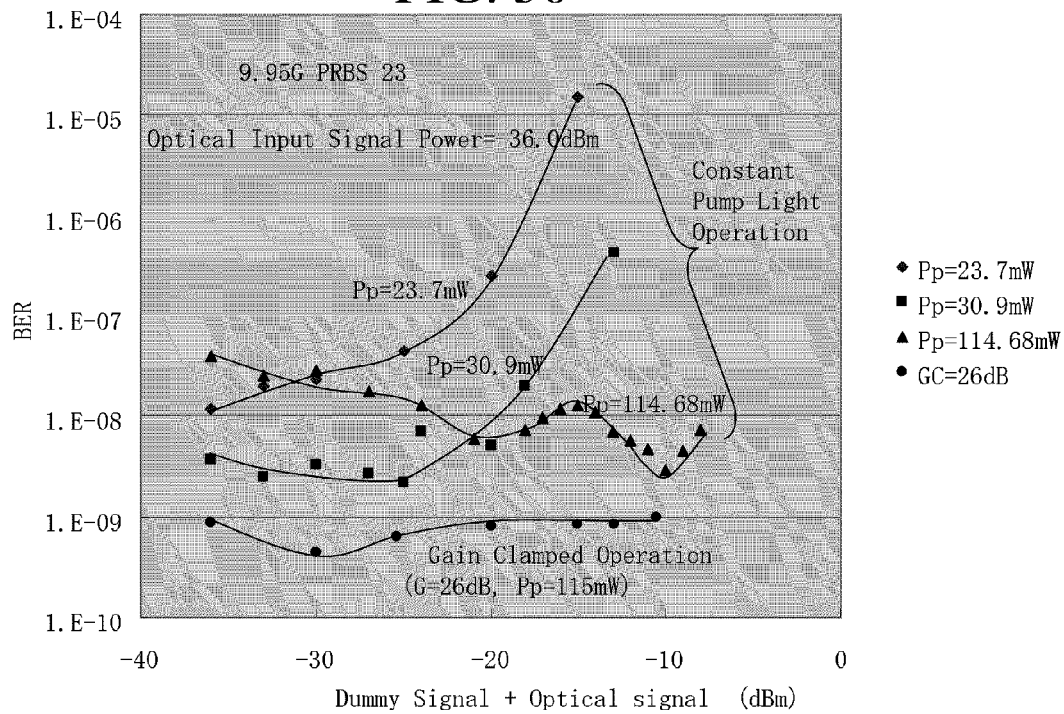
FIG. 50 shows BER performances versus total power of the signal and dummy signal. Comparison of the gain clamped optical amplifier and constant pump power optical amplifier.

FIG. 50 shows BER performances in which the dummy optical signal 234 is further applied to the gain-clamped optical amplifier 250. An X-axis of FIG. 50 denotes summation powers of the dummy optical signal and the optical signal. A Y-axis of FIG. 50 denotes BER of the optical signal 235. In case of the gain-clamped optical amplifier, the BER is not almost influenced by the optical load. FIG. 50 also shows the BER curve of the optical amplifier operating at constant pump power mode for comparison. The BER performance of the gain-clamped optical amplifier is more stable than the optical amplifier operating at constant pump power mode. As a secondary data, BER varies in very complicated fashion in case of the pump power Pp=114 mW.

The method for parameter setting described above is applicable the optical amplifier 281 of the optical receiver device shown in FIG. 34. The method is applicable to the optical pre-amplifier 383 of the optical relay amplifier 380. The method is also applicable to the optical pre-amplifier 393 of the ROADM 390 shown in FIG. 40.

The gain-clamped optical amplifier 250 is applicable to the optical transport device shown in FIG. 1 instead of the optical amplifier 4. Furthermore the gain-clamped optical amplifier 250 is adjustable by using the method for parameter setting described previously.

The 29$^{th}$ Embodiment

Figure 51:
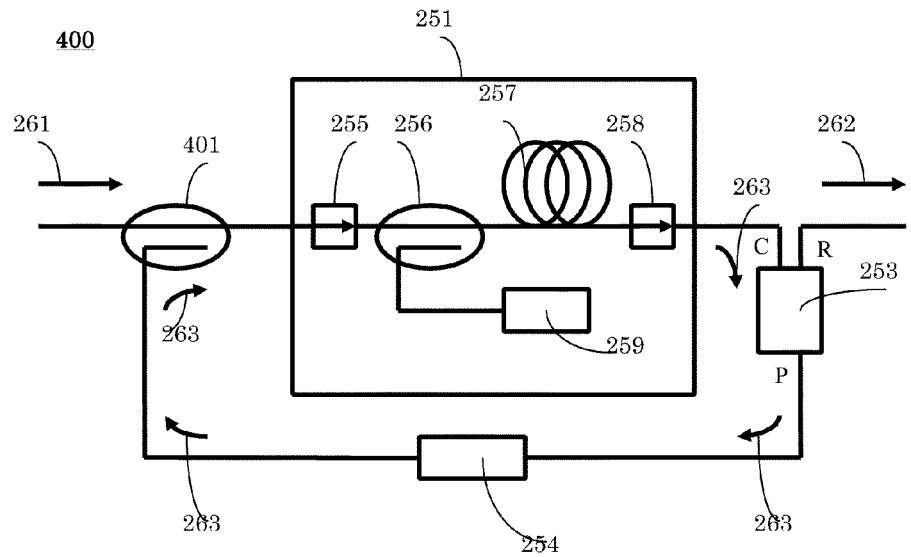
FIG. 51 is a schematic diagram of the 29$^{th}$ embodiment of the optical amplifier 400.

FIG. 51 shows an optical amplifier 400 as a 29$^{th}$ embodiment of the present invention. This is a derivative of the optical amplifier 250 shown in FIG. 32. An optical fiber coupler 401 is adopted instead of the dielectric thin film filter three-port device 252. The branch ratio of the optical coupler 401 is grater than 50:1. In practically, the branch ratio of 100:1 is adopted.

An excess loss of the optical fiber coupler 401 is less than 0.08 dB. In contrast the dielectric thin film filter three-port device 252 has an excess loss around 0.2-0.3 dB. The optical fiber coupler of branch ratio 100:1 brings a split loss of 0.08 dB; as a result total insertion loss is less than 0.15 dB. Thus the total insertion loss of the optical fiber coupler is smaller than the dielectric thin film filter three-port device. In addition, the cost of the optical fiber coupler is less expensive than the dielectric thin film filter three-port device. Thus the optical amplifier 400 provides better sensitivity with less expensive cost. Other optical branch means such as planar waveguides are applicable.

The 30$^{th}$ Embodiment

Figure 52:
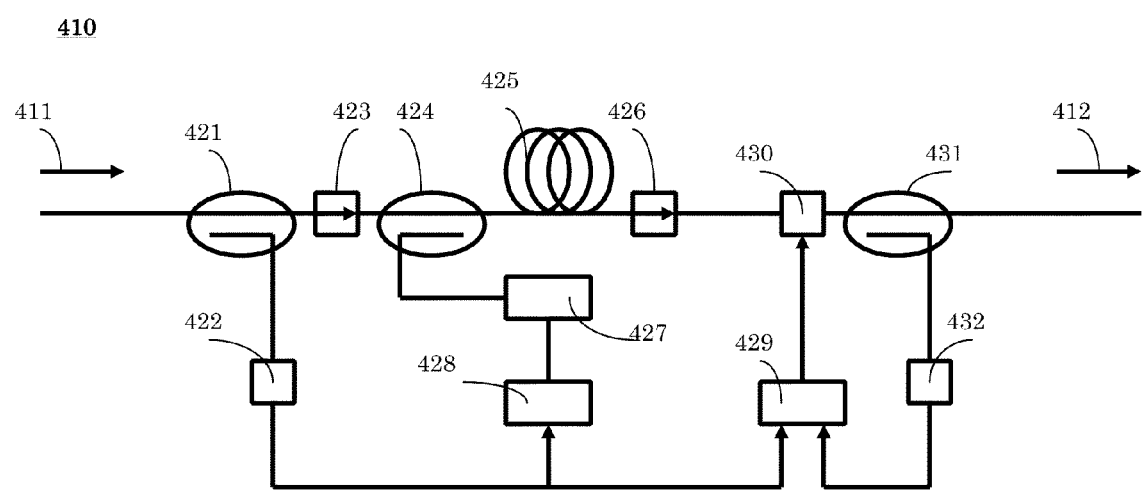
FIG. 52 is a schematic diagram of the 30$^{th}$ embodiment of the optical amplifier 410.
Figure 53:
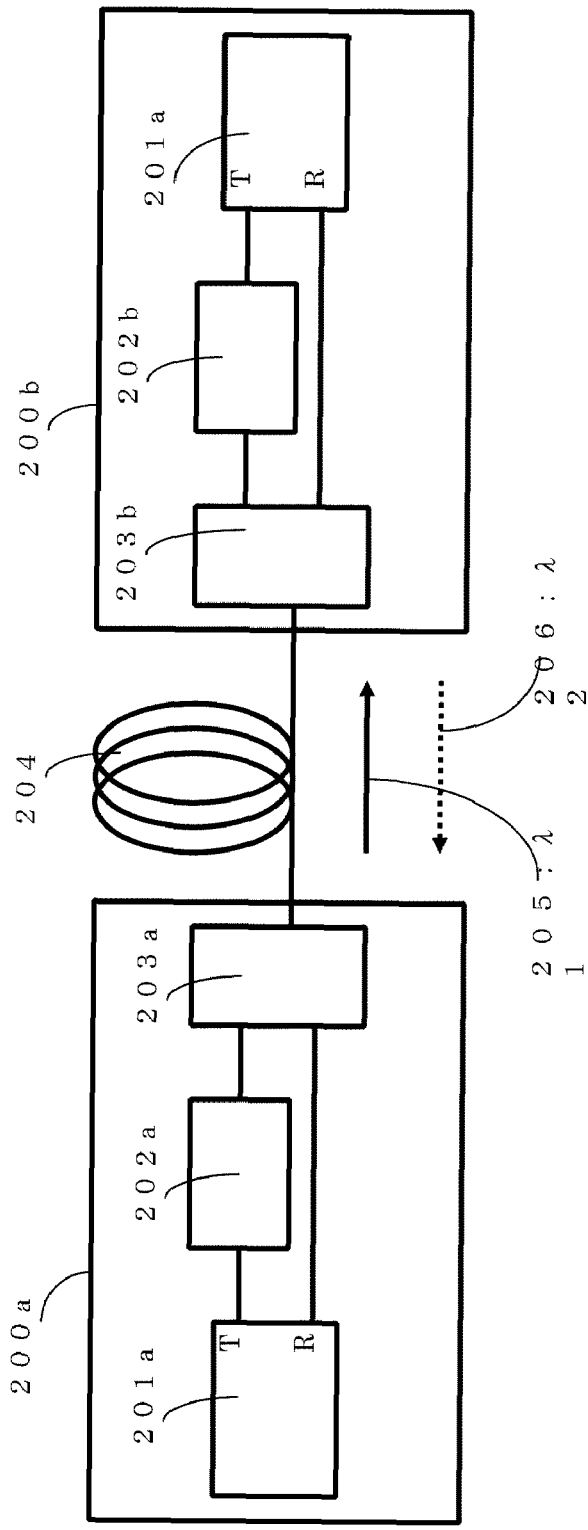
FIG. 53 is a schematic diagram of prior art of optical transport devices 200a and 200b.

FIG. 52 shows an optical amplifier 410 as a 30$^{th}$ embodiment of the present invention. The optical amplifier 410 comprises an optical fiber coupler 421, an input optical power monitor 422, an optical isolator 423, a pump light combiner 424, an Erbium doped fiber 425, an optical isolator 426, a pump light combiner 427, a pump light source driver 428, a variable attenuator driver 428, a variable attenuator 430, an optical fiber coupler 431, and an output optical power monitor 432. Reference numbers 411 and 412 denotes input optical signal and output optical signal, respectively.

The pump light source driver 428 varies pump power according to the measured input optical power by the input optical power monitor 422. As shown in FIG. 46, provided that an input optical signal is small, a BER is smaller where a pump power is smaller. In contrast, provided that an input optical signal is larger, a BER is smaller where a pump power is larger. The pump light source driver has a table which represents operation conditions obtained by the method described in the 27$^{th}$ embodiment. By varying the pump power, the pump light source driver 428 controls receiving sensitivity.

For example, provided that input optical power is below −24 dBm, the pump power is set at 30.9 mW. Provided that the input optical signal is grater than −24 dBm, the pump power is set at 95.1 mW. Continuous control against the input power is much more preferred. The pump power of the best sensitivity in FIG. 43 is set at minimal pump power and the pump power is controlled to increase along with increase of the input optical power.

Conventional gain constant modes in optical amplifier control pump power in comparison with an input optical power and an output optical power. Conventional gain constant mode in optical amplifiers control pump power according to an output power. In contrast, according to the present embodiment, the pump power is controlled by the pre-determined table.

The optical attenuator driver 429 controls the optical attenuator 430 thorough the measured data of the input optical power monitor 433 and output optical power monitor 432. Accordingly, the gain constant mode or the constant output power modes are realized. A gain flattening means may be disposed before or after the optical attenuator 430.

A variable gain optical amplifier is disposed instead of the optical attenuator 430. In such a configuration, the optical attenuator driver 429 may be converted to a gain control means of the variable gain optical amplifier.

What is claimed is:
1. An optical receiver device comprising:
 a dummy signal light source for generating a dummy optical signal;
 a dummy signal mixing means for mixing an input optical signal with the dummy optical signal to form a mixed optical signal;
 an optical amplifier for amplifying the mixed optical signal;

a dummy signal elimination means for eliminating a dummy signal component from the amplified mixed optical signal to form a dummy signal eliminated optical signal; and an optical receiver for receiving the dummy signal eliminated optical signal;

wherein the optical amplifier has a pump power setting, and wherein the optical receiver device is adapted so that said pump power setting is determined by:

maintaining an input optical signal power level at a constant value;

varying a pump power for said optical amplifier;

measuring an error rate of an output optical signal from said optical amplifier at a plurality of different pump power levels;

comparing said plurality of pump power levels and the resulting output optical signal error rates;

determining the pump power levels such that the resulting output optical signal error rates are degraded by no more than a half decade from a minimal error rate, wherein the pump power levels satisfying that condition are used to define a pump power range; and selecting a pump power setting falling within said pump power range for use with said optical amplifier.

2. An optical receiver device comprising:

a dummy signal light source for generating a dummy optical signal;

a dummy signal mixer for mixing an input optical signal with the dummy optical signal to form a mixed optical signal;

an optical amplifier for amplifying the mixed optical signal;

a dummy signal eliminator for eliminating a dummy signal component from the amplified mixed optical signal to form a dummy signal eliminated optical signal; and an optical receiver for receiving the dummy signal eliminated optical signal;

wherein the optical amplifier has a signal gain setting, and wherein the optical receiver device is adapted so that said signal gain setting of said optical amplifier is determined by:

maintaining an input optical signal power level at a constant value;

varying a pump power for said optical amplifier;

measuring an error rate of an output optical signal from said optical amplifier at a plurality of different pump power levels;

measuring signal gains for said plurality of different pump powers;

comparing the signal gains, and the corresponding output optical signal error rates, at each of said plurality of pump power levels;

determining a signal gain range such that the output optical signal error rates produced by signal gains within the signal gain range are degraded by no more than a decade from a minimal error rate; and selecting a signal gain setting falling within said signal gain range for use with said optical amplifier.

3. An optical receiver device comprising:

a dummy signal light source for generating a dummy optical signal;

a dummy signal mixer for mixing an input optical signal with the dummy optical signal to form a mixed optical signal;

an optical amplifier for amplifying the mixed optical signal;

a dummy signal eliminator for eliminating a dummy signal component from the amplified mixed optical signal to form a dummy signal eliminated optical signal; and an optical receiver for receiving the dummy signal eliminated optical signal; and a forward error correction decoder for receiving said dummy signal eliminated optical signal from the optical receiver and for decoding the dummy signal eliminated optical signal.

4. The optical receiver device of claim 1, wherein the pump power levels are plotted against the corresponding output optical signal error rates, and wherein the plotted values are used to compare the pump power levels, and the resulting output optical signal error rates, to determine the pump power range.

5. The optical receiver device of claim 2, wherein the signal gains are plotted against the corresponding output optical signal error rates, and wherein the plotted values are used to compare the signal gains, and the resulting output optical signal error rates, to determine the signal gain range.

6. The optical receiver device of claim 3, wherein the dummy signal light source comprises a coarse wavelength division multiplexing grid.

7. The optical receiver device of claim 3, wherein the dummy signal mixer comprises a dielectric thin film filter.

8. The optical receiver device of claim 3, wherein the dummy signal eliminator comprises a dielectric thin film filter.

9. The optical receiver device of claim 3, wherein the optical receiver comprises a photodiode.

10. The optical receiver device of claim 3, wherein the optical receiver comprises an avalanche photodiode (APD).

11. The optical receiver device of claim 3, wherein the optical receiver comprises a PIN photodiode.

* * * * *